United States Patent
Hochstetter et al.

(10) Patent No.: US 11,938,656 B2
(45) Date of Patent: Mar. 26, 2024

(54) METHOD FOR MANUFACTURING A FIBROUS MATERIAL IMPREGNATED WITH THERMOPLASTIC POLYMER

(71) Applicant: Arkema France, Colombes (FR)

(72) Inventors: Gilles Hochstetter, L'Hay les Roses (FR); Mathieu Capelot, Bernay (FR); Thibaut Savart, Sauvagnon (FR); Arthur Pierre Babeau, Pau (FR); Denis Huze, Fontaine sous Jouy (FR); François Tanguy, Mantes-la-Jolie (FR); Patrice Gaillard, Hagetaubin (FR)

(73) Assignee: ARKEMA FRANCE, Colombes (FR)

( * ) Notice: Subject to any disclaimer, the term of this patent is extended or adjusted under 35 U.S.C. 154(b) by 469 days.

(21) Appl. No.: 16/623,946

(22) PCT Filed: Jun. 21, 2018

(86) PCT No.: PCT/EP2018/066564
§ 371 (c)(1),
(2) Date: Dec. 18, 2019

(87) PCT Pub. No.: WO2018/234439
PCT Pub. Date: Dec. 27, 2018

(65) Prior Publication Data
US 2020/0223102 A1 Jul. 16, 2020

(30) Foreign Application Priority Data

Jun. 22, 2017 (FR) ........................................ 1755705

(51) Int. Cl.
*B29B 15/12* (2006.01)
*B29C 35/08* (2006.01)
(Continued)

(52) U.S. Cl.
CPC ........ *B29B 15/125* (2013.01); *B29C 35/0805* (2013.01); *B29C 70/506* (2013.01);
(Continued)

(58) Field of Classification Search
CPC ....... B29B 15/10; B29B 15/12; B29B 15/122; B29B 15/125; B29B 15/127; B29B 15/14;
(Continued)

(56) References Cited

U.S. PATENT DOCUMENTS 3,742,106 A * 6/1973 Price ......................... B29B 9/14
427/180
3,940,464 A * 2/1976 Davis ...................... B29B 15/12
264/DIG. 51
(Continued)

FOREIGN PATENT DOCUMENTS

CN   106414554 A   2/2017
DE   1629830 A1   1/1971
(Continued)

OTHER PUBLICATIONS

International Search Report (PCT/ISA/210) dated Oct. 4, 2018, by the European Patent Office as the International Searching Authority for International Application No. PCT/EP2018/066561.
(Continued)

*Primary Examiner* — Michael A Tolin
(74) *Attorney, Agent, or Firm* — Boone IP Law

(57) ABSTRACT

A method of manufacturing an impregnated fibrous material including a fibrous material made of continuous fibers and at least one thermoplastic polymer matrix, the method including pre-impregnating the fibrous material while it is in the form of a roving or several parallel rovings with the thermoplastic material and heating the thermoplastic matrix for melting, or maintaining in the molten state, the thermoplastic polymer after pre-impregnation, the at least one heating
(Continued)

step being carried out by means of at least one heat-conducting spreading part (E) and at least one heating system, with the exception of a heated calendar, the roving or the rovings being in contact with part or all of the surface of the at least one spreading part (E) and partially or wholly passing over the surface of the at least one spreading part (E) at the level of the heating system.

27 Claims, 19 Drawing Sheets

(51) Int. Cl.
    *B29C 70/50*     (2006.01)
    *B29K 77/00*     (2006.01)
    *B29K 307/04*     (2006.01)
    *B29K 507/04*     (2006.01)

(52) U.S. Cl.
    CPC .. *B29C 2035/0822* (2013.01); *B29K 2077/00* (2013.01); *B29K 2307/04* (2013.01); *B29K 2507/04* (2013.01)

(58) Field of Classification Search
    CPC ......... B29C 35/0805; B29C 2035/0811; B29C 2035/0822; B29C 2035/0855; B29C 70/504; B29C 70/506; B29C 70/52; B29C 70/521; B29C 70/523; B29C 70/525; B29C 70/528; B29K 2027/16; B29K 2027/18; B29K 2031/04; B29K 2033/12; B29K 2067/046; B29K 2071/00; B29K 2077/00; B29K 2079/085; B29K 2081/04; B29K 2101/12; B29K 2307/04; B29K 2507/04; C08J 5/24
    See application file for complete search history.

(56) References Cited

U.S. PATENT DOCUMENTS

| | | | |
|---|---|---|---|
| 4,541,884 A | | 9/1985 | Cogswell et al. |
| 4,549,920 A | * | 10/1985 | Cogswell .............. B29C 70/521 |
| | | | 156/181 |
| 4,743,187 A | * | 5/1988 | Schermutzki ........... B29B 15/12 |
| | | | 425/371 |
| 4,883,625 A | | 11/1989 | Glemet et al. |
| 5,006,373 A | * | 4/1991 | Woodmansee .......... B29B 15/12 |
| | | | 427/398.1 |
| 5,171,630 A | | 12/1992 | Muzzy et al. |
| 5,374,385 A | | 12/1994 | Binse et al. |
| 6,011,111 A | | 1/2000 | Brennan et al. |
| 10,023,737 B2 | | 7/2018 | Imai et al. |
| 2001/0032696 A1 | | 10/2001 | Debalme et al. |
| 2002/0107318 A1 | | 8/2002 | Yamada et al. |
| 2002/0197397 A1 | | 12/2002 | Staheli |
| 2008/0274355 A1 | | 11/2008 | Hewel |
| 2009/0065130 A1 | | 3/2009 | Fram |
| 2009/0246468 A1 | * | 10/2009 | Schubiger ................ C08J 5/246 |
| | | | 427/195 |
| 2010/0068518 A1 | | 3/2010 | Honma et al. |
| 2014/0005331 A1 | | 1/2014 | Johnson et al. |
| 2014/0155540 A1 | | 6/2014 | Imai et al. |
| 2015/0126646 A1 | | 5/2015 | Hochstetter et al. |
| 2015/0258742 A1 | | 9/2015 | Hochstetter et al. |
| 2015/0267050 A1 | | 9/2015 | Briffaud et al. |
| 2016/0326323 A1 | | 11/2016 | Hayashi et al. |
| 2016/0346966 A1 | | 12/2016 | Gaillard et al. |
| 2016/0347009 A1 | | 12/2016 | Gaillard et al. |
| 2017/0044317 A1 | | 2/2017 | Briffaud et al. |
| 2017/0165875 A1 | | 6/2017 | Gaillard et al. |
| 2017/0247500 A1 | | 8/2017 | Tan et al. |
| 2020/0130234 A1 | | 4/2020 | Hochstetter et al. |
| 2020/0139586 A1 | | 5/2020 | Hochstetter et al. |
| 2020/0216627 A1 | | 7/2020 | Hochstetter et al. |

FOREIGN PATENT DOCUMENTS

| | | | |
|---|---|---|---|
| EP | 0201367 A1 | 11/1986 | |
| EP | 0287427 A1 | 10/1988 | |
| EP | 0324680 A2 | 7/1989 | |
| EP | 0335186 A2 | 10/1989 | |
| EP | 0406067 A1 | 1/1991 | |
| EP | 0425341 A1 | 5/1991 | |
| EP | 0581641 A1 | 2/1994 | |
| EP | 0581642 A1 | 2/1994 | |
| EP | 0739924 A1 | 10/1996 | |
| EP | 1505099 A2 | 2/2005 | |
| EP | 2586585 A1 | 5/2013 | |
| EP | 2725055 A1 | 4/2014 | |
| FR | 2991331 A1 | 12/2013 | |
| FR | 2997035 A1 | 4/2014 | |
| FR | 2997036 A1 | 4/2014 | |
| FR | 2997089 A1 | 4/2014 | |
| FR | 3017329 A1 | 8/2015 | |
| FR | 3017330 A1 | 8/2015 | |
| FR | 3019825 A1 | 10/2015 | |
| FR | 3037962 A1 | 12/2016 | |
| FR | 3039554 A1 | 2/2017 | |
| JP | S63-264326 A | 11/1988 | |
| JP | H5-309751 A | 11/1993 | |
| JP | H8-294918 A | 11/1996 | |
| JP | 2013-006353 A | 1/2013 | |
| JP | 2013132890 A | 7/2013 | |
| JP | 2017-507045 A | 3/2017 | |
| WO | 8700387 A1 | 1/1987 | |
| WO | 9220521 A1 | 11/1992 | |
| WO | 9628258 A1 | 9/1996 | |
| WO | 2008135663 A2 | 11/2008 | |
| WO | 2012066241 A2 | 5/2012 | |
| WO | 2014064375 A1 | 5/2014 | |
| WO | 2015/046290 A1 | 4/2015 | |
| WO | 2015121583 A2 | 8/2015 | |
| WO | 2015121586 A2 | 8/2015 | |
| WO | WO-2015121584 A2 * | 8/2015 | ............... B05D 1/18 |
| WO | 2015159016 A1 | 10/2015 | |
| WO | 2016/053465 A | 4/2016 | |
| WO | 2016062896 A1 | 4/2016 | |
| WO | 2017017388 A1 | 2/2017 | |
| WO | 2018115736 A1 | 6/2018 | |
| WO | 2018115737 A1 | 6/2018 | |
| WO | 2018115738 A1 | 6/2018 | |
| WO | 2018115739 A1 | 6/2018 | |

OTHER PUBLICATIONS

Miller, A. et al., "Impregnation Techniques for Thermoplastic Matrix Composites", Polymers and Polymer Composites, pp. 459-481, vol. 4, No. 1, Jan. 1, 1996, XP000658227.
Written Opinion (PCT/ISA/237) dated Oct. 4, 2018, by the European Patent Office as the International Searching Authority for International Application No. PCT/EP2018/066561.
"International Search Report (with English Translation) and Written Opinion issued in corresponding International Patent Application No. PCT/EP2018/066555, 13 pages (dated Jan. 10, 2018)."
"International Search Report (with English Translation) and Written Opinion issued in corresponding International Patent Application No. PCT/EP2018/066567, 21 pages (dated Sep. 26, 2018)."
International Search Report (PCT/ISA/210) dated Oct. 1, 2018, by the European Patent Office as the International Searching Authority for International Application No. PCT/EP2018/066564.
Written Opinion (PCT/ISA/237) dated Oct. 1, 2018, by the European Patent Office as the International Searching Authority for International Application No. PCT/EP2018/066564.
Office Action (Notice of Reasons for Refusal) dated Mar. 10, 2021, by the Japanese Patent Office in corresponding Japanese Patent Application No. 2019-569770, and an English Translation of the Office Action. (8 pages).
Office Action (Notice of Reasons for Refusal) dated May 11, 2021, by the Japanese Patent Office in Japanese Patent Application No.

(56) References Cited

OTHER PUBLICATIONS 2019-569771, and an English Translation of the Office Action. (6 pages).

\* cited by examiner

METHOD FOR MANUFACTURING A FIBROUS MATERIAL IMPREGNATED WITH THERMOPLASTIC POLYMER

FIELD OF THE INVENTION

The present invention relates to a method of manufacturing a fibrous material impregnated with thermoplastic polymer.

More particularly, the invention relates to a method for manufacturing an impregnated fibrous material comprising a step for pre-impregnating a fibrous material with a thermoplastic polymer for the preparation of an impregnated fibrous material, and a step for heating the thermoplastic matrix in order to obtain ribbons of fibrous material impregnated homogeneously, in particular in the core, with reduced and controlled porosity, calibrated dimensions, usable directly to manufacture three-dimensional composite parts.

In the present invention, "fibrous material" refers to an assembly of reinforcing fibers. Before it is shaped, it assumes the form of rovings. After it is shaped, it assumes the form of strips (tapes), or plies. When the reinforcing fibers are continuous, their assembly constitutes a unidirectional reinforcement or a fabric or a nonwoven fabric (NCF). When the fibers are short, their assembly constitutes a felt or a fiber mat.

Such impregnated fibrous materials are in particular suitable for producing light composite materials for manufacturing mechanical parts having a three-dimensional structure and having good mechanical and thermal properties. When the fibers are made from carbon or the resin is filled with suitable additives, these fibrous materials are capable of discharging electrostatic charges. The use of flame-retardant resins or flame-retardant additives in resins that are not flame retardant allows the impregnated fibrous materials to withstand fires. They therefore have properties compatible with the manufacture of parts in particular in the mechanical, aeronautics, naval, automotive, oil and gas, in particular offshore, gas storage, energy, health and medical, sports and recreation, and electronics fields.

Such impregnated fibrous materials are also called composite materials. They comprise the fibrous material made up of reinforcing fibers, and matrix made up of the polymer impregnating the fibers. The first role of this matrix is to keep the reinforcing fibers in a compact shape and to give the desired shape to the final product. This matrix also ensures the charge transfer between the fibers, and therefore conditions the mechanical strength of the composite. Such a matrix also serves to protect the reinforcing fibers against abrasion and an aggressive environment, to control the surface appearance and to disperse any charges between the fibers. The role of this matrix is important for the long-term holding of the composite material, in particular regarding fatigue and creep.

BACKGROUND ARTS

Good quality in three-dimensional composite parts manufactured from impregnated fibrous materials in particular involves mastery of the method for impregnating reinforcing fibers with the thermoplastic polymer.

In the present description, the term "strip" is used to refer to strips of fibrous material having a width greater than or equal to 400 mm. The term "ribbon" is used to refer to ribbons with a calibrated width smaller than or equal to 400 mm.

The term "roving" is used to refer to the fibrous material.

To date, the manufacture of strips of fibrous material reinforced by impregnation with thermoplastic polymer or thermosetting polymer was done using several methods that in particular depend on the nature of the polymer, the desired type of final composite material and its field of applications, some of these methods being constituted by an impregnation step followed by a step for hot rolling of the impregnated fibrous material or a drying step optionally followed by a step for melting of the thermoplastic polymer.

Thus, wet impregnation technologies or those using a liquid precursor or a precursor with a very low viscosity, polymerizing in situ, are often used to impregnate the reinforcing fibers with thermosetting polymers, such as epoxy resins for example, as described in patent WO2012/066241A2. These technologies are generally not directly applicable to impregnation by thermoplastic polymers, since these rarely have liquid precursors.

Impregnation methods by crosshead-die extrusion of a molten polymer are suitable for the use of low viscosity thermoplastic polymers only. Thermoplastic polymers, in particular those with a high glass transition temperature, have a viscosity in the molten state that is too high to allow a satisfactory impregnation of the fibers and semi-finished or finished products of good quality. Application US 2014/0005331A1 describes a method for preparing fibers impregnated with a polymer resin, the obtained strip being asymmetrical, that is to say, it has one face that is rich in polymer and an opposite face that is rich in fibers.

The method is done by molten route with a device only allowing majority impregnation on one of its faces.

Another known pre-impregnation method is the continuous passage of the fibers in an aqueous dispersion of polymer powder or aqueous dispersion of polymer particles or aqueous polymer emulsion or suspension. Reference may for example be made to document EP0324680. In this method, a dispersion of micrometric powders is used (about 20 µm). After quenching in the aqueous solution, the fibers are impregnated by the polymer powder. The method then involves a drying step consisting of passing the impregnated fibers in a first furnace in order to evaporate the water absorbed during the quenching. A heat-treatment step consisting of passing the impregnated and dried fibers in a second heating zone, at a high temperature, is next necessary to melt the polymer so that it adheres, is distributed and covers the fibers.

The main drawback of this method is the homogeneity of the deposition, which is sometimes imperfect, coating done only on the surface. Furthermore, the particle size of the powders used is usually fine (typically 20 µm of D50 by volume), and this also increases the final cost of the impregnated ribbon or ply.

Moreover, the drying step of this method causes a porosity in the impregnated fibers by evaporation of the water.

The impregnated fibrous material must next be shaped in the form of ribbons, for example.

Companies market strips of fibrous materials obtained using a method for impregnating unidirectional fibers by continuous passage of the fibers in a bath containing an organic solvent such as benzophenone, in which the thermoplastic polymer is dissolved. Reference may for example be made to document U.S. Pat. No. 4,541,884 by Imperial Chemical Industries. The presence of the organic solvent in particular makes it possible to adapt the viscosity of the polymer and ensure good coating of the fibers. The fibers thus impregnated are next shaped. They can for example be cut into strips of different widths, then positioned below a press, then heated to a temperature above the melting temperature of the polymer to ensure the cohesion of the material, and in particular the adherence of the polymer on the fibers. This impregnation and shaping method makes it possible to produce parts with a structure having a high mechanical strength.

One of the drawbacks of this technique lies in the heating temperature necessary to obtain these materials. The melting temperature of the polymers in particular depends on their chemical nature. It may be relatively high for polymers such as polyamide 6, or even very high for polymers such as polyphenylene sulfide (PPS), HT polyamide, polyether ether ketone (PEEK) or polyether ketone ketone (PEKK), for example. The heating temperature can therefore rise to temperatures above 250° C., and even above 350° C., temperatures which are much higher than the boiling temperature and the flash point of the solvent, and which are respectively 305° C. and 150° C. for benzophenone. In this case, the solvent disappears quickly, causing a strong porosity within the fibers and therefore causing flaws to appear within the composite material. The method is therefore difficult to reproduce and incurs fire risks, endangering operators. Lastly, the use of organic solvents should be avoided for environmental reasons, as well as operator health and safety reasons.

Document EP 0,406,067, filed in the joint names of Atochem and the French State, as well as document EP 0,201,367, describe a polymer powder impregnation technique on fluidized bed. The fibers penetrate a closed fluidization tank where, as concerns EP 0,406,067, they are optionally separated from one another using ribbed rollers or cylinders, the fibers being electrostatically charged, by friction against these rollers or cylinders. This electrostatic charge allows the polymer powder to stick on the surface of the fibers and thus to impregnate them.

International application WO 2016/062896 describes a roving powdering by an electrostatic method with deliberate charge, by grounding of the roving and applying a potential difference between the tip of a spray gun or powdering nozzles and the roving.

Document WO2008/135663 describes, in a third variant, the production of a ribbon impregnated with fibers. In this document, the fiber ribbon is already preformed before the impregnation step, in the form of a ribbon formed by fibers held together by means of support. The ribbon thus preformed is charged beforehand with static electricity and submerged in an enclosure containing a fluidized bed of fine polymer particles in suspension in compressed air, so as to coat the ribbon with a polymer coating layer. Such a document does not make it possible to perform an impregnation of one or more fiber rovings simultaneously, or to perform continuous shaping of the impregnated rovings in the form of ribbons.

Document EP2586585 also describes the principle of impregnating fibers by passing them in a fluidized bed of polymer particles. However, it does not describe the continuous shaping of one or more rovings thus impregnated, in the form of one or more unidirectional parallel ribbons.

Application US 2002/1097397 describes a method for impregnating fibers by mixing polymer powders, said mixing being done directly in a fluidized bed, without compounding.

International application WO 2015/121583 describes a method for manufacturing a fibrous material impregnated by impregnation of said material in a fluidized bed, then hot rolling said roving, allowing shaping of said roving(s) parallel to said material.

The hot rolling is done downstream from the impregnation device and makes it possible to homogenize the distribution of the polymer and to impregnate the fibers, but does not make it possible to obtain a ribbon impregnated homogeneously. The porosity obtained is not quantified. Document EP0335186 describes the possibility of using a calendar or press to compact a composite comprising impregnated metallic fibers, used to manufacture a molded body for shielding against electromagnetic radiation. It does not describe impregnating one or more fiber rovings and shaping them continuously, in the form of one or more unidirectional parallel ribbons by heating after impregnation using a supporting part conducting heat and at least one heating system.

Document DE1629830 describes a method for impregnating yarns by a multitude of strands reinforced by a fabric made from synthetic thermoplastic material comprising the following steps:

1) Passage of the yarns through a liquid phase of thermoplastic synthetic material,
2) Passage through a scraper nozzle,
3) Passage through a channel heated to the temperature necessary for gelling or drying and plasticizing of the synthetic material driven by the yarns,
4) Guiding through heated cylinders after leaving the heating channel and rolling of the rovings. Document EP 2,725,055 describes a method for impregnation of a fibrous reinforcement by PEEK comprising the following steps:

1) Continuously supplying a fibrous reinforcement,
2) Combining the fibrous reinforcement and a PEEK oligomer to form a composite,
3) Polymerizing the oligomer into poly PEEK,
4) Cooling and recovering the composite comprising the fibrous reinforcement and the poly PEEK. Document EP 0,287,427 describes an impregnation method by molten route with a spreading of the rovings with supporters.

A first spreading area with supporters makes it possible to spread the fibers before impregnating them by the molten route, then a second heated supporting area is present.

Document JP 2013 132890 describes a method for producing plastic tapes reinforced by fibers, characterized in that the fibers pass through a machine for covering with thermoplastic resin, in particular a crosshead-die extruder, then impregnated fibers pass through a guide to comprising an upper part and a lower part, the lower part being able to comprise rollers and the guide being able to be heated.

WO 96/28258 describes a method not comprising spreading of the roving.

The fibers are introduced into a chamber for covering with powder in which the electrostatically charged particles of powder are deposited on the fibers, then the rovings are introduced into a furnace in which the particles are partially melted on the fibers and the impregnated fibers are next passed around a cooling roller.

Regarding the shaping of the impregnated fibers in the form of calibrated ribbons, suitable for manufacturing three-dimensional composite parts by automatic deposition using a robot, this is generally done in post-treatment.

Thus, document WO92/20521 describes the possibility of impregnating a fiber roving by passing it in a fluidized bed of thermoplastic powder particles. The fibers thus covered with polymer particles are heated in a furnace, or a heating device, so that the polymer penetrates well and covers the fibers. Post-treatment of the impregnated fibrous reinforcement obtained can consist of passing it in a set of calendar rollers making it possible to improve the impregnation by the still-liquid matrix. Such a document does not make it possible to perform an impregnation of one or more fiber rovings and to perform continuous shaping of the impregnated rovings in the form of one or more unidirectional parallel ribbons.

The quality of the ribbons of impregnated fibrous material, and therefore the quality of the final composite material, depends not only on the homogeneity of the impregnation of the fibers and therefore the control and reproducibility of the porosity of the impregnated fibrous material, but also the size and more particularly the width and thickness of the final ribbons. A regularity and control of these two-dimensional parameters indeed makes it possible to improve the mechanical strength of the obtained composite materials (from the ribbons).

Currently, irrespective of the method used for the impregnation of the fibrous materials, the manufacture of thin ribbons, that is to say, with a width smaller than 400 mm, generally requires slitting (that is to say, cutting) strips with a width greater than 400 mm, also called plies. The ribbons thus sized are next taken back to be deposited by a robot using a head.

Furthermore, rolls of plies not exceeding a length in the order of 1 km, the ribbons obtained after cutting are generally not long enough to manufacture certain large composite parts during deposition by robot. The ribbons must therefore be spliced in order to obtain a greater length, then creating excess thicknesses. These excess thicknesses lead to the appearance of heterogeneities that are detrimental to obtaining good-quality composite materials constituting said composite parts. Additionally, these excess thicknesses require machine stoppages and restarts of the robot, and therefore cause lost time and productivity.

The current techniques for impregnating fibrous materials and shaping such impregnated fibrous materials in the form of calibrated ribbons therefore have several drawbacks. It is for example difficult to heat a molten mixture of thermoplastic polymers homogeneously in a die and at the outlet of a die, to the core of the material, which alters the quality of the impregnation. Furthermore, the temperature difference existing between the fibers and molten mixture of polymers at the impregnation die also alters the quality and homogeneity of the impregnation. Furthermore, this impregnation mode by the molten route does not make it possible to obtain a high level of fibers or high production speeds due to the high viscosity of the thermoplastic resins, in particular when they have high glass transition temperatures, which is necessary to obtain high-performance composite materials.

The use of organic solvents generally involves the appearance of flaws in the material as well as environmental, health and safety risks in general.

The shaping, by post-treatment at high temperatures, of the impregnated fibrous material in the form of strips, remains difficult because it does not always allow a homogeneous distribution of the polymer within the fibers, which causes the obtainment of a lower quality material, with a poorly controlled porosity.

The slitting of plies in order to obtain calibrated ribbons and the splicing of these ribbons causes an additional manufacturing cost. Slitting further generates significant problems with dust that pollutes the ribbons of impregnated fibrous materials used for robot deposition and can cause malfunctions of the robots and/or imperfections on the composites. This potentially incurs repair costs for the robots, production stoppages and the discarding of non-compliant products. Lastly, during the slitting step, a non-negligible quantity of fibers is damaged, causing loss of property, and in particular a reduction in the mechanical strength and conductivity, of the ribbons of impregnated fibrous material.

Aside from the excess cost and the damage to the ribbons caused by the slitting, another drawback of slitting plies with a width greater than 400 mm in particular is the maximum length of the ribbons obtained. Indeed, the length of these wide plies rarely exceeds 1000-1200 linear meters, in particular due to the final weight of the obtained plies, which must be compatible with the slitting process. Yet to produce many composite parts by depositing calibrated ribbons, in particular for large parts, a coil of 1000 m is too short to avoid having to resupply the robot during production of the part, here again incurring an excess cost. In order to increase the size of the slitted ribbons, it is possible to splice several coils; this method consists of superimposing and hot welding two ribbons, incurring an excess thickness in the final ribbon, and therefore future defects during deposition with an excess thickness placed randomly in the final part.

Furthermore, the various methods described above do not allow a homogeneous impregnation of the roving, which is detrimental to the applications listed above.

The impregnation is not always done in the core, and while said documents cited above indicate an impregnation to the core, the obtained porosity may prove too substantial, in particular for the applications listed above.

The invention therefore aims to address at least one of the shortcomings of the background art. The invention in particular aims to propose a method of manufacturing an impregnated fibrous material, by a high-speed pre-impregnation technique followed by at least one step for heating the thermoplastic matrix for melting, or maintaining in the molten state, the thermoplastic polymer after pre-impregnation, using at least one heat-conducting supporting part (E) and at least one heating system, with the exception of a heated calendar, and obtaining an impregnated fibrous material having a homogeneous impregnation of the fibers, in particular to the core, and controlled dimensions, with a reduced, controlled and reproducible porosity on which the performance of the final composite part depends.

BRIEF DESCRIPTION OF THE INVENTION

To that end, the invention relates to a method of manufacturing an impregnated fibrous material comprising a fibrous material made of continuous fibers and at least one thermoplastic polymer matrix, characterized in that said impregnated fibrous matrix is produced as a single unidirectional ribbon or a plurality of unidirectional parallel ribbons and characterized in that said method comprises a step of pre-impregnating said fibrous material while it is in the form of a roving or several parallel rovings with the thermoplastic material and at least one step of heating the thermoplastic matrix for melting, or maintaining in the molten state, the thermoplastic polymer after pre-impregnation, the at least one heating step being carried out by means of at least one heat-conducting supporting part (E) and at least one heating system, with the exception of a heated calendar, said roving or rovings being in contact with all or part of the surface of said at least one supporting part (E) and partially or wholly passing over the surface of the at least one supporting part (E) at the level of the heating system.

Advantageously, said method excludes any electrostatic method with deliberate charge.

Advantageously, said impregnated fibrous material is non-flexible.

The impregnation being done to the core in the inventive method, this makes the impregnated fibrous material non-flexible, as opposed to the impregnated fibrous materials of the art in which the impregnation is partial, which leads to obtaining a flexible fibrous material.

Advantageously, said ribbon is impregnated with a high rate of fibers by volume, between 45 to 65% by volume, preferably from 50 to 60% by volume, in particular from 54 to 60%.

Advantageously, the rate of fibers by volume is constant in at least 70% of the volume of the strip or ribbon, in particular in at least 80% of the volume of the strip or ribbon, in particular in at least 90% of the volume of the strip or ribbon, more particularly in at least 95% of the volume of the strip or ribbon. Advantageously, the distribution of the fibers is homogeneous in at least 95% of the volume of the strip or ribbon.

The term "homogeneous" means that the impregnation is uniform and that there are no dry, that is to say, non-impregnated, fibers in at least 95% of the volume of the strip or ribbon of impregnated fibrous material.

The fiber rate by volume is measured locally on a representative elementary volume (REV).

The term "constant" means that the fiber rate by volume is constant to within any measurement uncertainty, which is plus or minus 1%.

The pre-impregnation step of the inventive method can be done using techniques well known by those skilled in the art, and in particular chosen from among those described above as long as the technology does not have any problems related to the use of organic solvents or for environmental and operator hygiene and safety reasons.

It can thus be done using a pre-impregnation technique by crosshead-die extrusion of molten polymer, by continuous passage of the fibers in an aqueous dispersion of polymer powder or aqueous dispersion of polymer powders or aqueous emulsion or suspension of polymer, by a dry polymer powder, or by deposition of this powder, either in a fluidized bed, or by spraying of this powder through a nozzle or gun by dry route in a tank.

The expression "supporting part (E)" refers to any system on which the roving can pass. The supporting part (E) can have any shape as long as the roving can pass over it. It can be stationary or rotating.

The heating system is any system giving off heat or emitting radiation capable of heating the supporting part (E). The supporting part (E) is therefore conductive or absorbs the radiation emitted by the heat.

The expression "heat-conducting supporting part (E)" means that the supporting part (E) is made from a material capable of absorbing and conducting heat.

Said at least one supporting part (E) is located or comprised in the environment of the heating system, that is to say, it is not outside the heating system.

Said at least one supporting part (E) is therefore wholly inside the heating system. Advantageously, said heating system tops said at least one supporting part (E). The heating system is at a sufficient height for the polymer present on the roving to be able to melt or to remain in the molten state, depending on the technology used for the pre-impregnation, but without damaging said polymer.

Nevertheless, said heating system comprises either only said at least one supporting part (E), or may also comprise a portion of the roving, outside said supporting system (E), said roving portion being located before and/or after said supporting system (E).

The height between the heating system and the supporters is between 1 and 100 cm, preferably from 2 to 30 cm, and in particular from 2 to 10 cm.

An illustration of a heating system and three supporters (E), corresponding to R'1, R'2 and R'3, is shown in FIG. 1, but is in no way limited thereto.

Of course, a second heating system can be present below the supporters, thus allowing uniform melting of said polymer on the two surfaces of the roving.

The heating system shown in FIG. 1 is a horizontal system. However, the heating system(s) can be positioned vertically also with vertical passage of the roving through the supporters.

The Inventors have therefore surprisingly found that the heating step as described above performed after the pre-impregnation step made it possible, due to the partial or complete passage of said roving over said supporting part(s) (E), to obtain a contact surface with said roving much larger than a calendar and thus to exert pressure on said roving during a greater time than with a calendar, which results in causing a spreading of said roving at the level of the roller(s).

In parallel with this, the heating system also allows the heating of the supporting part (E) and the roving pre-impregnated with the thermoplastic material, which can cause the melting of the thermoplastic polymer on said roving even before its spreading and when the roving comes into contact with the first supporter (E or R'$_1$ in FIG. 1), its spreading then allowing the homogeneous impregnation to the core thereof by the molten thermoplastic polymer with a very low porosity level thus leading to a high fiber rate by volume, in particular constant in at least 70% of the volume of the strip or ribbon, in particular in at least 80% of the volume of the strip or ribbon, in particular in at least 90% of the volume of the strip or ribbon, more particularly in at least 95% of the volume of the strip or ribbon.

The term "homogeneous" means that the impregnation is uniform and that there are no dry fibers in the impregnated fibrous material.

"Dry fiber" refers to a fiber devoid of polymer or not completely surrounded by polymer.

As a result, this heating step makes it possible to perfect the impregnation of the roving done beforehand during the pre-impregnation step, and in particular to obtain a homogeneous impregnation to the core.

It would not be beyond the scope of the invention if the supporting part (E) was not topped by a heating system, but directly connected to or in contact with a heating system such as a heat source or equipped with a resistance making it possible to heat said supporting part (E).

A heating calendar is precluded from the scope of the invention relative to said heating system.

A heating calendar refers to a system of superimposed smooth or notched cylinders between which the roving may circulate, said cylinders exerting a pressure on said roving to smooth and shape it.

There is therefore no shaping of said roving in said pre-impregnation step and said heating step, in particular no precise control of the width and thickness of the ribbon in this stage of the method. The expression "deliberately charged" means that a difference in potential is applied between the fibrous material and the powder. The charge is in particular controlled and amplified. The grains of powder then impregnate the fibrous material by attraction of the powder charged opposite the fiber. It is possible to charge the powder electrically, negatively or positively, by different means (difference in potential between two metallic electrodes, mechanical friction on metallic parts, etc.), and to charge the fiber inversely (positively or negatively).

The inventive method does not preclude the presence of electrostatic charges that may appear by friction of the fibrous material on the elements of the implementation unit before or at the tank but that are in any case involuntary charges.

Polymer Matrix

Thermoplastic, or thermoplastic polymer, refers to a material that is generally solid at ambient temperature, which may be semi-crystalline or amorphous, and that softens during a temperature increase, in particular after passage by its glass transition temperature (Tg) and flows at a higher temperature when it is amorphous, or that may exhibit a sharp transition upon passing its so-called melting temperature (Tm) when it is semi-crystalline, and become solid again when the temperature decreases below its crystallization temperature (for semi-crystalline) and below its glass transition temperature (for an amorphous).

The Tg and Tm are determined by differential scanning calorimetry (DSC) according to standard 11357-2:2013 and 11357-3:2013, respectively.

Regarding the polymer making up the pre-impregnation matrix of the fibrous material, it is advantageously a thermoplastic polymer or a mixture of thermoplastic polymers. This polymer or mixture of thermoplastic polymers can be ground in powder form, so that it can be used in a device such as a tank, in particular in a fluidized bed or aqueous dispersion.

The device in tank form, in particular in a fluidized bed, can be open or closed.

Optionally, the thermoplastic polymer or blend of thermoplastic polymers further comprises carbon-based fillers, in particular carbon black or carbon-based nanofillers, preferably selected from among carbon nanofillers, in particular graphenes and/or carbon nanotubes and/or carbon nanofibrils or their blends. These fillers make it possible to conduct electricity and heat, and therefore to facilitate the melting of the polymer matrix when it is heated.

Optionally, said thermoplastic polymer comprises at least one additive, in particular chosen from among a catalyst, an antioxidant, a heat stabilizer, a UV stabilizer, a light stabilizer, a lubricant, a filler, a plasticizer, a flame retardant, a nucleating agent, a chain extender and a dye, an electrical conductor, a heat conductor or a mixture thereof.

Advantageously, said additive is chosen from among a flame retardant, an electrical conductor and a heat conductor.

According to another variant, the thermoplastic polymer or mixture of thermoplastic polymers can further comprise liquid crystal polymers or cyclized polybutylene terephthalate, or mixtures containing the latter, such as the CBT100 resin marketed by the company CYCLICS CORPORATION. These compounds in particular make it possible to fluidify the polymer matrix in molten state, for better penetration to the core of the fibers. Depending on the nature of the polymer, or mixture of thermoplastic polymers, used to make the pre-impregnation matrix, in particular its melting temperature, one or the other of these compounds will be chosen. The thermoplastic polymers included in the composition of the pre-impregnation matrix of the fibrous material can be chosen from among:

the polymers and copolymers from the family of aliphatic, cycloaliphatic or semi-aromatic polyamides (PA) (also called polyphthalamides (PPA)), polyureas, in particular aromatic polyureas, polymers and copolymers from the family of acrylics such as polyacrylates, and more particularly polymethyl methacrylate (PMMA) or derivatives thereof, polymers and copolymers from the family of poly(aryletherketones) (PAEK) such as polyether ether ketone (PEEK), or poly(aryletherketonesketones) (PAEKK) such as poly(etherketoneketone) (PEKK) or derivatives thereof, aromatic polyether-imides (PEI), polyarylsulfides, in particular polyphenyl sulfides (PPS), polyarylsulfides, in particular polyphenylene sulfones (PPSU), polyolefins, in particular polypropylene (PP);

polylactic acid (PLA), polyvinyl alcohol (PVA), fluorinated polymers, in particular polyvinylidene fluoride (PVDF), polytetrafluoroethylene (PTFE) or polychlorotrifluoroethylene (PCTFE), and mixtures thereof.

Advantageously, when said polymer is a mixture of two polymers P1 and P2, the proportion by weight of polymer P1 and P2 is between 1-99% and 99-1%.

Advantageously, when said thermoplastic polymer is a mixture, and the pre-impregnation method uses a dry powder, this mixture assumes the form of a powder obtained by dry blend before introduction into the pre-impregnation tank or by dry blend done directly in the tank, or by grinding a compound made beforehand in an extruder.

Advantageously, this mixture is made up of a powder obtained by dry blend, before introduction into the tank or directly in the tank, and this mixture of two polymers P1 and P2 is a mixture of PEKK and PEI.

Advantageously, the PEKK/PEI mixture is from 90-10% to 60-40% by weight, in particular from 90-10% to 70-30% by weight.

The thermoplastic polymer can correspond to the final non-reactive polymer that will impregnate the fibrous material or to a reactive pre-polymer, which will also impregnate the fibrous material, but which may react with itself or with another pre-polymer, depending on the chain end carried by said pre-polymer, after pre-impregnation, or with a chain extender and in particular during heating at a heating calendar.

The expression "non-reactive polymer" means that the molecular weight is no longer likely to change significantly, i.e. that its number-average molecular weight (Mn) changes by less than 50% when it is used and therefore corresponds to the final polyamide polymer of the thermoplastic matrix.

On the contrary, the expression "reactive polymer" means that the molecular weight of said reactive polymer will change during its implementation because of the reaction of reactive prepolymers together by condensation, substitution or with a chain extender by polyaddition and without the elimination of volatile by-products to lead to the final (non-reactive) polyamide polymer of the thermoplastic matrix.

According to a first possibility, said pre-polymer can comprise or be constituted of at least one carrier reactive pre-polymer (polyamide) on the same chain (that is to say, on the same pre-polymer), with two terminal functions X' and Y' that are respectively co-reactive functions relative to one another by condensation, more specifically with X' and Y' being amine and carboxy or carboxy and amine, respectively. According to a second possibility, said pre-polymer can comprise or be constituted of at least two polyamide pre-polymers that are reactive relative to one another and each respectively carry two identical terminal functions X' or Y' (identical for same pre-polymer and different between the two pre-polymers), said function X' of a pre-polymer being able to react only with said function Y' of the other pre-polymer, in particular by condensation, more specifically with X' and Y' being amine and carboxy or carboxy end amine, respectively.

According to a third possibility, said pre-polymer can comprise or be constituted of at least one pre-polymer of said thermoplastic polyamide polymer, carrying n terminal reactive functions X, chosen from among: —NH2, —CO2H and —OH, preferably NH2 and —CO2H with n being 1 to 3, preferably from 1 to 2, more preferably 1 or 2, more particularly 2 and at least one chain extender Y-A'-Y, with A' being a hydrocarbon bisubstituent, bearing 2 identical terminal reactive functions Y, reactive by polyaddition with at least one function X of said prepolymer a1), preferably having a molecular mass less than 500, more preferably less than 400.

The number-average molecular weight Mn of said final polymer of the thermoplastic matrix is preferably in a range from 10000 to 40000, preferably from 12000 to 30000. These Mn values may correspond to inherent viscosities greater than or equal to 0.8, as determined in m-cresol according to standard ISO 307:2007 but by changing the solvent (use of m-cresol instead of sulfuric acid and the temperature being 20° C.).

Said reactive prepolymers according to the two options given above, have a number-average molecular weight Mn ranging from 500 to 10000, preferably from 1000 to 6000, in particular from 2500 to 6000.

The Mn are determined in particular by calculation from the rate of the terminal functions determined by potentiometric titration in solution and the functionality of said pre-polymers. The masses Mn can also be determined by stearic exclusion chromatography or by NMR.

The nomenclature used to define the polyamides is described in ISO standard 1874-1:2011 "Plastiques—Materiaux polyamides (PA) pour moulage and extrusion—Partie 1: Designation", in particular on page 3 (Tables 1 and 2) and is well known to the person skilled in the art.

The polyamide can be a homopolyamide or a co-polyamide or a mixture thereof.

Advantageously, the pre-polymers making up the matrix are chosen from among polyamides (PA), in particular chosen from among aliphatic polyamides, cycloaliphatic polyamides, and semi-aromatic polyamides (polyphthalamides) optionally modified by urea units, and copolymers thereof, polymethyl methacrylate (PPMA) and copolymers thereof, polyether imides (PEI), polyphenylene sulfide (PPS), polyphenylene sulfone (PPSU), PVDF, polyether ketone ketone (PEKK), polyether either ketone (PEEK), fluorinated polymers such as polyvinylidene fluoride (PVDF).

For the fluorinated polymers, it is possible to use a homopolymer of vinylidene fluoride (VDF with formula $CH_2=CF_2$) or a copolymer of VDF comprising, by weight, at least 50% by mass of VDF and at least one other monomer copolymerizable with VDF. The VDF content must be greater than 80% by mass, or better still 90% by mass, in order to ensure good mechanical and chemical resistance of the structural part, especially when it is subject to thermal and chemical stresses. The co-monomer must be a fluorinated monomer, for example vinyl fluoride.

For structural parts having to withstand high temperatures, aside from fluorinated polymers, according to the invention PAEK (polyaryletherketone) such as poly(ether ketones) PEK, poly(ether ether ketone) PEEK, poly(ether ketone ketone) PEKK, Poly(ether ketone ether ketone ketone) PEKEKK or PA with a high glass transition temperature Tg) are advantageously used.

Advantageously, said thermoplastic polymer is a polymer whose glass transition temperature is such that Tg 80° C., in particular 100° C., particularly 120° C., in particular 140° C., or a semi-crystalline polymer whose melting temperature Tm 150° C.

Advantageously, said at least one thermoplastic prepolymer is selected from among polyamides, PEKK, PEI and a mixture of PEKK and PEI.

Advantageously, said polyamide is selected from aliphatic polyamides, cycloaliphatic polyamides and semi-aromatic polyamides (polyphthalamides).

Advantageously, said aliphatic polyamide pre-polymer selected from:

polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), polyamide 11/1010 and polyamide 12/1010, or a mixture thereof or a copolyamide thereof, and the block copolymers, in particular polyamide/polyether (PEBA), and said semi-aromatic polyamide, is a semi-aromatic polyamide, optionally modified with urea units, in particular a PA MXD6 and a PA MXD10 or a semi-aromatic polyamide of formula X/YAr, as described in EP1505099, in particular a semi-aromatic polyamide of formula A/XT in which A is selected from a unit obtained from an amino acid, a unit obtained from a lactam and a unit corresponding to the formula (Ca diamine, Cb diacid), with "a" representing the number of carbon atoms of the diamine and "b" representing the number of carbon atoms of the diacid, "a" and "b" each being between 4 and 36, advantageously between 9 and 18, the unit (Ca diamine) being selected from aliphatic diamines, linear or branched, cycloaliphatic diamines and alkylaromatic diamines and the unit (Cb diacid) being chosen from aliphatic, linear or branched diacids, cycloaliphatic diacids and aromatic diacids;

X.T denotes a unit obtained from the polycondensation of the Cx diamine and terephthalic acid, with x representing the number of carbon atoms of the Cx diamine, x being between 6 and 36, advantageously between 9 and 18, in particular a polyamide with formula A/6T, A/9T, A/10T or A/11T, A being as defined above, in particular a polyamide PA 6/6T, a PA 66/6T, a PA 61/6T, a PA MPMDT/6T, a PA PA11/10T, a PA 11/6T/10T, a PA MXDT/10T, a PA MPMDT/10T, a PA BACT/10T, a PA BACT/6T, a PA BACT/10T/6T.

T corresponds to terephthalic acid, MXD corresponds to m-xylylene diamine, MPMD corresponds to methylpentamethylene diamine and BAC corresponds to bis(aminomethyl)cyclohexane.

Fibrous Material:

The fibers making up said fibrous material are in particular mineral, organic or plant fibers. The mineral fibers include carbon fibers, glass fibers, basalt fibers, silica fibers, or silicon carbide fibers, for example. The organic fibers include thermoplastic or thermosetting polymer-based fibers, such as semi-aromatic polyamide fibers, aramid fibers or polyolefin fibers, for example. Preferably, they have a base of an amorphous thermoplastic polymer and have a glass transition temperature Tg higher than the Tg of the polymer or thermoplastic polymer mixture making up the pre-impregnation matrix when the latter is amorphous, or higher than the Tm of the polymer or thermoplastic polymer matrix making up the pre-impregnation matrix when the latter is semi-crystalline. Advantageously, they have a base of a semi-crystalline thermoplastic polymer and have a melting temperature Tm higher than the Tg of the polymer or thermoplastic polymer mixture making up the pre-impregnation matrix when the latter is amorphous, or higher than the Tm of the polymer or thermoplastic polymer matrix making up the pre-impregnation matrix when the latter is semi-crystalline. Thus, there is no melting risk for the organic fibers making up the fibrous material during the impregnation by the thermoplastic matrix of the final composite. The plant fibers include natural linen, hemp, lignin, bamboo, silk, in particular spider silk, sisal, and other cellulose fibers, in particular viscose. These plant fibers can be used pure, treated or coated with a coating layer, in order to facilitate the adherence and impregnation of the thermoplastic polymer matrix.

The fibrous material can also be a fabric, a braid or woven with fibers.

It can also correspond to fibers with maintaining yarns.

These component fibers can be used alone or in mixtures. Thus, organic fibers can be mixed with the mineral fibers to be pre-impregnated with thermoplastic polymer and to form the pre-impregnated fibrous material.

The organic fiber rovings can have several grammages. They can further have several geometries. The fibers can assume the form of cut fibers, which then make up the felts or mats able to take the form of strips, plies, or pieces, or the form of continuous fibers, which make up the 2D fabrics, nonwovens (NCF), braids or rovings of unidirectional (UD) or nonwoven fibers. The component fibers of the fibrous material can further assume the form of a mixture of these reinforcing fibers with different geometries. Preferably, the fibers are continuous.

Preferably, the fibrous material is made up of continuous carbon, glass or silicon carbide fibers or mixtures thereof, in particular carbon fibers. It is used in the form of a roving or several rovings.

In the impregnated materials, also called "ready to use", the polymer or mixture of thermoplastic impregnation polymers is distributed uniformly and homogeneously around the fibers. In this type of material, the thermoplastic impregnation polymer must be distributed as homogeneously as possible within the fibers in order to obtain minimal porosities, that is to say, minimal empty spaces between the fibers. Indeed, the presence of porosities in this type of material can act as stress concentration spots, during mechanical tensile stressing, for example, and which then form crack initiation points of the impregnated fibrous material and mechanically compromise it. A homogeneous distribution of the polymer or mixture of polymers therefore improves the mechanical strength and homogeneity of the composite material formed from these impregnated fibrous materials.

Thus, in the case of so-called "ready to use" impregnated materials, the fiber rate in said pre-impregnated fibrous material is between 45 to 65% by volume, preferably from 50 to 60% by volume, in particular from 54 to 60% by volume.

The impregnation rate can be measured by image analysis (using a microscope or photo or digital camera device, for example), of a cross-section of the ribbon, by dividing the surface area of the ribbon impregnated by the polymer by the total surface area of the product (impregnated surface plus surface of the porosities). In order to obtain a good quality image, it is preferable to coat the ribbon cut in its transverse direction with a standard polishing resin and to polish with a standard protocol allowing the observation of the sample under a microscope with at least 6× magnification. Advantageously, the porosity level of said impregnated fibrous material is less than 10%, in particular less than 5%, particularly less than 2%.

It must be noted that a nil porosity level is difficult to achieve and that as a result, advantageously the porosity level is greater than 0% but less than the levels cited above.

The porosity level corresponds to the closed porosity level and can be determined either by electron microscopy, or as being the relative deviation between the theoretical density and the experimental density of said impregnated fibrous material as described in the examples section of the present invention.

Pre-Impregnation Step:

The pre-impregnation step, as already indicated above, can be done using techniques well known by those skilled in the art and in particular chosen from those described above.

In one advantageous embodiment, the pre-impregnation step is done with a system chosen from among a fluidized bed, a spray gun and the molten route, in particular at a high speed, particularly the impregnation is done in a fluidized bed.

Advantageously, the pre-impregnation is done with a system chosen from among the fluidized bed, a spray gun and the molten route, in particular at a high speed, particularly the impregnation is done in a fluidized bed and one or more supporting part(s) (E") is (are) present upstream from said system.

It should be noted that the supporting parts (E) and (E") can be identical or different whether in terms of the material or shape and its characteristics (diameter, length, width, height, etc. as a function of the shape).

Molten Route:

Advantageously, the pre-impregnation step is done by the molten route, particularly by pultrusion. Pre-impregnation techniques by molten route are known by those skilled in the art and are described in the references above.

The pre-impregnation step is in particular done by crosshead-die extrusion of the polymer matrix and passage of said roving(s) in this crosshead die, then passage in a heated nozzle, the crosshead die optionally being provided with stationary or rotary supporters on which the roving passes, thus causing a spreading of said roving allowing a pre-impregnation of said roving.

The pre-impregnation can in particular be done as described in US 2014/0005331A1, with the difference that the resin supply is done on two sides of said roving and there is no contact surface eliminating a portion of the resin on one of the two surfaces.

Advantageously, the pre-impregnation step is done by molten route at a high speed, that is to say, with a passage speed of said roving(s) greater than or equal to 5 m/min, in particular greater than 9 m/min.

One of the other advantages of the invention in combining a pre-impregnation step and a heating step in the context of a pre-impregnation by molten route is that the level of pre-impregnation fibers after the heating step is from 45% to 64% by volume, preferably from 50 to 60% by volume, in particular from 54 to 60% by volume, said fiber level not being able to be achieved by the conventional molten route techniques. This further makes it possible to work with high passage speeds and thus to decrease the production costs.

Fluidized Bed:

Advantageously, the pre-impregnation step is carried out in a fluidized bed.

An example unit for carrying out a manufacturing method without the heating step using at least one supporting part is described in international application WO 2015/121583.

This system describes the use of a tank comprising a fluidized bed for performing the pre-impregnation step and can be used in the context of the invention.

Advantageously, the tank comprising the fluidized bed is provided with at least one supporting part (E') (FIG. 2), which can be a compression roller (FIG. 3)).

It should be noted that the supporting parts (E) and (E') can be identical or different whether in terms of the material or shape and its characteristics (diameter, length, width, height, etc. as a function of the shape).

However, the supporting part (E') is not heating or heated.

The step for pre-impregnation of the fibrous material is carried out by passage of one or more rovings in a continuous pre-impregnation device, comprising a tank (10) provided with at least one supporting part (E') and comprising a fluidized powder bed (12) of said polymer matrix.

The powder of said polymer matrix or polymer is suspended in a gas G (air, for example) introduced into the tank and circulating in the tank (10) through a hopper (11). The roving(s) are circulated in this fluidized bed (12).

The tank can have any shape, in particular cylindrical or parallelepiped, particularly a rectangular parallelepiped or a cube, advantageously a rectangular parallelepiped.

The tank (10) can be an open or closed tank. Advantageously, it is open.

In the event the tank is closed, it is then equipped with a sealing system so that the powder of said polymer matrix cannot leave said tank.

This pre-impregnation step is therefore done by a dry route, that is to say, the thermoplastic polymer matrix is in powder form, in particular suspended in a gas, particularly air, but cannot be dispersed in a solvent or water.

Each roving to be pre-impregnated is unwound from a device with reels under the traction created by cylinders (not shown). Preferably, the reel device comprises a plurality of reels, each reel making it possible to unwind a roving to be pre-impregnated. Thus, it is possible to pre-impregnate several fiber rovings at once. Each reel is provided with a brake (not shown) so as to apply tension on each fiber roving. In this case, an alignment module makes it possible to position the fiber rovings parallel to one another. In this way, the fiber rovings cannot be in contact with one another, which makes it possible to avoid mechanical damage to the fibers by friction relative to one another.

The fiber roving or the parallel fiber rovings then enter a tank (10), in particular comprising a fluidized bed (12), provided with a supporting part (E') that is a compression roller (24) in the case of FIG. 3. The fiber roving or the parallel fiber rovings next leave(s) the tank after pre-impregnation after optionally checking the residence time in the powder.

The expression "residence time in the powder" means the time during which the roving is in contact with said powder in the fluidized bed.

The method according to the invention therefore comprises a first spreading during the pre-impregnation step.

The use of at least one supporter (E') in the pre-impregnation step therefore allows an improved pre-impregnation relative to the methods of the background art.

"Supporting part (E')" refers to any system on which the roving can pass in the tank. The supporting part (E') can have any shape as long as the roving can pass over it.

An example supporting part (E'), without restricting the invention thereto, is described in detail in FIG. 2.

This pre-impregnation is done in order to allow the powder of said polymer matrix to penetrate the fiber roving and to adhere to the fibers enough to support the transport of the powdered roving outside the tank.

If the fibrous material, such as the glass or carbon fiber rovings, has a sizing an optional de-sizing step can be carried out before the passage of the fibrous material in the tank. The term "sizing" refers to the surface treatments applied to the reinforcing fibers leaving the nozzle (textile sizing) and on the fabrics (plastic sizing).

"Textile" sizing applied on the fibers leaving the nozzle consists of depositing a bonding agent ensuring the cohesion of the fibers relative to one another, decreasing abrasion and facilitating subsequent handling (weaving, draping, knitting) and preventing the formation of electrostatic charges.

"Plastic" sizing or "finish" applied on fabrics consists of depositing a bonding agent, the roles of which are to ensure a physicochemical bond between the fibers and the resin and to protect the fiber from its environment.

Advantageously, the pre-impregnation step is carried out in a fluidized bed while checking that checking the residence time in the powder is from 0.01 s to 10 s, preferably from 0.1 to 5 s, and in particular from 0.1 s to 3 s.

The residence time of the fibrous material in the powder is essential to the pre-impregnation of the fibrous material.

Below 0.1 s, the pre-impregnation is not good.

Beyond 10 s, the polymer matrix level pre-impregnating the fibrous material is too high and mechanical properties of the pre-impregnated fibrous material will be poor.

Advantageously, the tank used in the inventive method comprises a fluidized bed and said pre-impregnation step is carried out with simultaneous spreading of said roving(s) between the inlet and the outlet of the tank comprising said fluidized bed.

The expression "inlet of the tank" corresponds to the vertical tangent of the edge of the tank that comprises the fluidized bed.

The expression "outlet of the tank" corresponds to the vertical tangent of the other edge of the tank that comprises the fluidized bed.

Based on the geometry of the tank, the distance between the inlet and the outlet thereof therefore corresponds to the diameter in the case of a cylindrical tank, to the side in the case of a cubic tank or to the width or length in the case of a paralleliped-shaped tank. The spreading consists of singularizing each fiber as much as possible constituting said roving from the other fibers that surround it in its most immediate environment. It corresponds to the transverse spreading of the roving.

In other words, the transverse spreading or the width of the roving increases between the inlet of the fluidized bed (or the tank comprising the fluidized bed) and the outlet of the fluidized bed (or the tank comprising the fluidized bed) and thus allows an improved pre-impregnation of the fibrous material.

The fluidized bed can be open or closed, in particular it is open.

Advantageously, the fluidized bed comprises at least one supporting part (E'), said roving(s) being in contact with part or all of the surface of said at least one supporting part (E').

FIG. 2 describes a tank (10) comprising a fluidized bed (12) with a supporting part (E'), the height (22) of which is adjustable.

The roving (21a) corresponds to the roving before pre-impregnation that is in contact with part or all of the surface of said at least one supporting part (E') and therefore passes at least partially or wholly over the surface of the supporting part (E') (22), said system (22) being submerged in the fluidized bed where the pre-impregnation is done. Said roving leaves the tank (21b) after checking the residence time in the powder.

Said roving (21a) may or may not be in contact with the edge of the tank (23a), which can be a rotating or stationary roller, or a parallelepiped edge.

Advantageously, said roving (21a) may or may not be in contact with the inlet edge of the tank (23a). Advantageously, the outlet edge of the tank (23b) is a roller, in particular cylindrical and rotating. Said roving (21b) may or may not be in contact with the outlet edge of the tank (23b), which can be a roller, in particular cylindrical and rotating or stationary, or a parallelepiped edge.

Advantageously, said roving (21b) is in contact with the outlet edge of the tank (23b).

Advantageously, the outlet edge of the tank (23b) is a roller, in particular cylindrical and rotating. Advantageously, said roving (21a) is in contact with the inlet edge of the tank (23a) and the outlet edge of the tank (23b) is a roller, in particular cylindrical and rotating, and said roving (21b) is in contact with the outlet edge of the tank (23b), and the outlet edge of the tank (23b) is a roller, in particular cylindrical and rotating.

Advantageously, said supporting part (E') is perpendicular to the direction of said roving(s).

Said supporting part (E') can be stationary or rotating.

Advantageously, said spreading of said roving(s) is done at least at said at least one supporting part (E').

The spreading of the roving is therefore done primarily at the supporting part (E'), but can also be done at the edge(s) of the tank if there is contact between the roving and said edge.

In another embodiment, said at least one supporting part (E') is a compression roller with a convex, concave or cylindrical shape, preferably cylindrical.

The convex shape is favorable to the spreading, while the concave shape is unfavorable to the spreading, although it nevertheless occurs.

The expression "compression roller" means that the roving that passes bears partially or wholly on the surface of said compression roller, which causes the spreading of said roving.

Advantageously, said at least one compression roller is cylindrical and the spreading percentage of said roving(s) between the inlet and the outlet of the tank of said fluidized bed is between 1% and 1000%, preferably from 100% to 800%, preferably from 200% to 800%, preferably from 400% to 800%.

The percentage of spreading is equal to the ratio of the final width of the roving to the initial width of the roving multiplied by 100.

The spreading depends on the fibrous material used. For example, the spreading of a material made from carbon fiber is much greater than that of a linen fiber.

The spreading also depends on the number of fibers in the roving, their average diameter and their cohesion due to the sizing.

The diameter of said at least one compression roller is from 3 mm to 500 mm, preferably from 10 mm to 100 mm, in particular from 20 mm to 60 mm.

Below 3 mm, the deformation of the fiber caused by the compression roller is too great.

Advantageously, the compression roller is cylindrical and not ribbed, and is in particular metallic.

When the supporting part (E') is at least one compression roller, according to a first variant, a single compression roller is present in the fluidized bed and said pre-impregnation is done at the angle $\alpha_1$ formed by said roving(s) between the inlet of said compression roller and the vertical tangent at said compression roller.

The angle $\alpha_1$ formed by said roving(s) between the inlet of said compression roller and the vertical tangent to said compression roller allows the formation of an area in which the powder will concentrate, thus leading to a "corner effect" that, with the simultaneous spreading of the roving by said compression roller, allows a pre-impregnation over a greater roving width and therefore an improved pre-impregnation compared to the techniques of the improved background art.

Throughout the description, all of the provided angle values are expressed in absolute value.

Advantageously, the angle $\alpha_1$ is from 0 to 89°, preferably 5° to 85°, preferably from 5° to 45°, preferably from 5° to 30°. Nevertheless, an angle $\alpha_1$ from 0 to 5° can cause risks of mechanical stress, which will lead to breaking of the fibers, and an angle $\alpha_1$ from 85° to 89° does not create enough mechanical force to create the "corner effect". A value of the angle $\alpha_1$ equal to 0° therefore corresponds to a vertical fiber. It is clear that the height of the cylindrical compression roller is adjustable, thus making it possible to position the fiber vertically. It would not be outside the scope of the invention if the wall of the tank was pierced so as to be allow the exit of the roving. Advantageously, the inlet edge of the tank (23a) is equipped with a roller, in particular cylindrical and rotating, on which said roving(s) pass(es), thus leading to spreading prior to the pre-impregnation.

In one embodiment, the spreading is initiated at the inlet edge of the tank (23a) and continues at said supporter(s) (E') defined hereinabove. In another embodiment, one or more supporters (E") are present upstream from the tank comprising the fluidized bed at which the spreading is initiated. The supporters (E") are as defined for (E) as regards the material, the shape and its characteristics (diameter, length, width, height, etc. based on the shape).

Advantageously, the supporters (E") are cylindrical and non-ribbed rollers, and in particular metallic.

Advantageously, the diameter of said at least one compression roller is from 3 mm to 500 mm, preferably from 10 mm to 100 mm, in particular from 20 mm to 60 mm.

Below 3 mm, the deformation of the fiber caused by the compression roller is too great.

Advantageously, said at least one supporting part (E") is made up of 1 to 15 cylindrical compression rollers ($R'''_1$ to $R'''_{15}$), preferably 3 to 15 compression rollers ($R'''_3$ to $R'''_{15}$), in particular 3 to 6 compression rollers ($R'''_3$ to $R'''_6$).

Advantageously, said roving(s) form(s) an angle of 0.1 to 89°, in particular of 5 to 75°, in particular of 10 to 45° with a first compression roller $R'''_1$ and the horizontal tangent to said compression roller $R'''_1$, said roving(s) expanding in contact with said compression roller $R'''_1$. It would not be outside the scope of the invention if the roving were to form an angle with said horizontal tangent to said compression roller $R'''_1$ of more than 89° to 360° (modulo 360°).

In the event the roving forms an angle of at least 360° with said horizontal tangent to said compression roller $R'''_1$, this means that the roving has performed at least one complete revolution of said roller.

According to a second variant, said at least one supporting part (E) is made up of two compression rollers, in particular cylindrical.

Advantageously, said roving(s) form(s) an angle $\alpha'''_1$ of 0 to 180°, in particular of 5 to 75°, in particular of 10 to 45° with a first compression roller $R'''_1$ and the horizontal tangent to said compression roller $R'''_1$, said roving(s) expanding in contact with said compression roller $R'''_1$.

It would not be outside the scope of the invention if the roving were to form an angle with said horizontal tangent to said compression roller $R'''_1$ of more than 180° to 360° (modulo 360°).

In the event the roving forms an angle of at least 360° with said horizontal tangent to said compression roller $R'''_1$, this means that the roving has performed at least one complete revolution of said roller.

Advantageously, said roving(s) form an angle $\alpha'''_2$ of 0 to 180°, in particular of 5 to 75°, in particular of 10 to 45° with the second compression roller $R'_2$ and the horizontal tangent to said compression roller $R'_2$, said roving(s) expanding in contact with said compression roller.

It would not be outside the scope of the invention if the roving were to form an angle with said horizontal tangent to said compression roller $R'_2$ of more than 180° to 360° (modulo 360°).

In the event the roving forms an angle of at least 360° with said horizontal tangent to said compression roller $R'_2$, this means that the roving has performed at least one complete revolution of said roller.

In general, the angle(s) $\alpha'''_{3-i}$ (i being from 3 to 15) formed by said roving(s) with the rollers $R'''_{3-1}$ is(are) from 0 to 180°, in particular from 5 to 75°, particularly from 10 to 45°.

It would not be outside the scope of the invention if the roving were to form an angle with said horizontal tangent to said compression roller $R'''_{3-i}$ of more than 180° to 360° (modulo 360°).

In the event the roving forms an angle of at least 360° with said horizontal tangent to said compression roller $R'_{3-i}$, this means that the roving has performed at least one complete revolution of said roller.

In general, the height difference between each roller $R'''_i$ and between the lowest roller and the highest roller is greater than or equal to 0.

Advantageously, the height difference between each of the rollers $R'''_i$ is from 1 to 20 cm, preferably from 2 to 15 cm.

In general, the distance between each of the rollers $R'_i$ is greater than 0, and in particular is from 1 to 50 cm, preferably from 2 to 30 cm, in particular from 3 to 20 cm.

Advantageously, the spreading is initiated at the supporter(s) (E") defined hereinabove and optionally continues at the inlet edge of the tank, then at said supporter(s) (E') defined hereinabove. The spreading is then maximal after passage at the compression roller(s) (E').

Advantageously, the spreading percentage of said roving(s) between the inlet of the supporters (E") and the outlet of the tank of said fluidized bed is between 1% and 1000%, preferably from 100% to 800%, preferably from 200% to 800%, preferably from 400% to 800%.

FIG. 3 describes, but is not limited to, an embodiment with a single compression roller (24) or ($R_1$), with a tank (10) comprising a fluidized bed (12) in which a single cylindrical compression roller is present and showing the angle $\alpha_1$.

The arrows at the fiber indicate the passage direction of the fiber.

Advantageously, the level of said powder in said fluidized bed is at least located at mid-height of said compression roller.

It is clear that the "corner effect" caused by the angle $\alpha_1$ favors the impregnation on one face, but the spreading of said roving obtained owing to the compression roller also makes it possible to have pre-impregnation on the other face of said roving. In other words, said pre-impregnation is favored on one face of said roving(s) at the angle $\alpha_1$ formed by said roving(s) between the inlet of said at least one compression roller $R_1$ and the vertical tangent at said compression roller $R_1$, but the spreading also makes it possible to impregnate the other face.

The angle $\alpha_1$ is as defined above.

According to a second variant, when the supporting part (E') is at least one compression roller, then two compression rollers $R_1$ and $R_2$ are in said fluidized bed and said pre-impregnation is done at the angle $\alpha_1$ formed by said roving(s) between the inlet of said compression roller $R_1$ and the vertical tangent to said compression roller $R_1$ and/or at the angle $\alpha_2$ formed by said roving(s) between the inlet of said compression roller $R_2$ and the vertical tangent to said compression roller $R_2$, said compression roller $R_1$ preceding said compression roller $R_2$ and said roving(s) being able to pass above (FIGS. 4 and 5) or below (FIGS. 6 and 7) the compression roller $R_2$.

Advantageously, the two compression rollers have identical or different shapes and are chosen from among a convex, concave or cylindrical shape.

Advantageously, the two compression rollers are identical and cylindrical, non-ribbed, and in particular metallic.

The diameter of the two compression rollers can also be identical or different and is as defined above.

Advantageously, the diameter of the two compression rollers is identical.

The two compression rollers $R_1$ and $R_2$ can be at the same level relative to one another and relative to the bottom of the tank (FIGS. 5 and 6) or offset relative to one another and relative to the bottom of the tank, the height of the compression roller $R_1$ being higher or lower than that of the compression roller $R_2$ relative to the bottom of the tank (FIGS. 4 and 7).

Advantageously, when the two rollers are at different heights and the roving passes above the roller $R_2$, $\alpha_2$ is then from 0 to 90°.

Advantageously, said pre-impregnation is then done at the angle $\alpha_1$ formed by said roving(s) between the inlet of said compression roller $R_1$ in the vertical tangent to said compression roller on a face of said roving and the angle $\alpha_2$ formed by said roving(s) between the inlet of said compression roller $R_2$ and the vertical tangent to said compression roller $R_2$ on the opposite face of said roving, which is obtained by passing above the roller $R_2$.

Advantageously, said roving in this embodiment is subject to spreading at each angle $\alpha_1$ and $\alpha_2$.

FIG. 5 describes, but is not limited to, an embodiment with two compression rollers $R_1$ and $R_2$, $R_1$ preceding $R_2$, with a tank (10) comprising a fluidized bed (12) in which the two cylindrical compression rollers, at the same level and side by side, are present and showing the case where said roving(s) come out between said compression rollers $R_1$ and $R_2$.

In this case, the angle $\alpha_2$ is equal to 0 and said roving(s) pass above the roller $R_2$.

The arrows at the fiber indicate the passage direction of the fiber.

Alternatively, said roving(s) pass(es) at the inlet between said compression rollers $R_1$ and $R_2$ and come(s) out after having been in contact with part or all of the surface of said compression roller R2. Advantageously, said roving(s) is (are) in contact at the inlet with part or all of the surface of said compression roller $R_1$ and come(s) out outside the compression roller $R_2$ after having been in contact with part or all of the surface of said compression roller $R_2$, beneath the roller $R_2$, the angle $\alpha_2$ being formed by said roving(s) between the inlet of said compression roller $R_2$ and the vertical tangent to said compression roller $R_2$. In this case, the angle $\alpha_2=90°$.

Said pre-impregnation is therefore done at the angle $\alpha_1$ formed by said roving(s) between the inlet of said compression roller $R_1$ in the vertical tangent to said compression roller on a face of said roving and the angle $\alpha_2$ formed by said roving(s) between the inlet of said compression roller $R_2$ and the vertical tangent to said compression roller $R_2$ on the same face of said roving, but the spreading also makes it possible to impregnate the other face.

Advantageously, said roving in this embodiment is subject to spreading at each angle $\alpha_1$ and $\alpha_2$. FIG. 6 shows an exemplary embodiment with two compression rollers $R_1$ and $R_2$ at the same level with respect to one another.

According to another embodiment of the second variant, when two compression rollers are present, then the distance between the two compression rollers $R_1$ and $R_2$ is from 0.15 mm to the length equivalent to the maximum dimension of the tank, preferably from 10 mm to 50 mm, and the height difference between the two compression rollers $R_1$ and $R_2$ is from 0 to the height corresponding to the maximum height of the tank subtracted from the diameters of the two compression rollers, preferably from 0.15 mm to the height corresponding to the maximum height of the tank subtracted from the diameters of the two compression rollers, more preferably a height difference between 10 mm and 300 mm, $R_2$ being the upper compression roller.

Throughout the description, the height difference between two rollers and the distance between two rollers (whether they are located upstream from the tank, in the tank or at the heating system) is determined relative to the center of each roller.

Advantageously, when two compression rollers are present and at the same level relative to one another, the level of said powder in said fluidized bed is at least located at mid-height of said two compression rollers.

FIG. 7 describes, but is not limited to, an embodiment with two compression rollers $R_1$ and $R_2$, $R_1$ preceding $R_2$, with a tank (10) comprising a fluidized bed (12) in which the two cylindrical compression rollers at different levels are present and showing the angle $\alpha_1$ and $\alpha_2$.

The diameter of the compression rollers $R_1$ and $R_2$ is shown as identical in FIGS. 4, 5, 6 and 7, but the diameter of each cylindrical compression roller can be different, the diameter of the compression roller $R_1$ being able to be larger or smaller than that of the compression roller $R_2$ in the range as defined above.

Advantageously, the diameter of the two compression rollers is identical.

It would not be going beyond the scope of the invention if the compression roller $R_1$ was larger than the compression roller $R_2$.

According to a third variant, when two compression rollers are present and at different levels, then at least one third compression roller $R_3$ is also present and located between the compression rollers $R_1$ and $R_2$ in the height direction (FIG. 8).

Advantageously, said roving(s) is (are) in contact at the inlet with part or all of the surface of said compression roller $R_1$, then with part or all of the surface of said compression roller $R_3$, and come(s) out after having been in contact with part or all of the surface of said compression roller $R_2$. Advantageously, said pre-impregnation is done on a face of said roving(s) at the angle $\alpha_1$ formed by said roving(s) between the inlet of said at least one compression roller $R_1$ and the vertical tangent to said compression roller $R_1$ as well as at the angle $\alpha_3$ formed by said roving(s) and the vertical tangent to said compression roller $R_3$ and on the other face at the angle $\alpha_1$ formed by said roving(s) and the vertical tangent to said compression roller $R_2$.

Advantageously, when two compression rollers are present at different levels and at least one third compression roller $R_3$ is also present, then the angle $\alpha_2$ formed by said roving(s) between the inlet of said at least one compression roller $R_2$ and the vertical tangent to said compression roller $R_2$ is from 180° to 45°, in particular from 120° to 60°.

Advantageously, the angle $\alpha_3$ is from 0° to 180°, advantageously from 45° to 135°.

FIG. 8 describes an embodiment, without being limited thereto, with a tank (10) comprising a fluidized bed (12) with two compression rollers $R_1$ and $R_2$, $R_1$ preceding $R_2$, and a third compression roller $R_3$ and showing the angles $\alpha_1$, $\alpha_2$ and $\alpha_3$.

The diameter of the compression rollers $R_1$, $R_2$ and $R_3$ is shown as identical in FIG. 8, but the diameter of each cylindrical compression roller can be different, or two compression rollers can have the same diameter and the third can have a different, larger or smaller diameter, in the range as defined above.

Advantageously, the diameter of the three compression rollers is identical.

Advantageously, in this third variant, a second control of the spreading of said roving(s) is done at the compression roller $R_3$ and a third control of the spreading is done at the compression roller $R_3$. The residence time in this third variant is as defined above.

Advantageously, in this third variant, the level of said powder in said fluidized bed is at least located at mid-height of said compression roller $R_2$.

It would not be outside the scope of the invention if, in this third variant, said roving(s) is(are) in contact at the inlet with part or all of the surface of said compression roller $R_1$, then with part or all of the surface of said compression roller $R_2$, and come(s) out after having been in contact with part or all of the surface of said compression roller $R_3$.

According to one advantageous embodiment, the present invention relates to a method as defined above, characterized in that a single thermoplastic polymer matrix is used and the thermoplastic polymer powder is fluidizable.

The term "fluidizable" means that the air flow rate applied to the fluidized bed is between the minimum fluidization flow rate (Umf) and the minimum bubbling flow rate (Umf) as shown in FIG. 10.

Below the minimum fluidization flow rate, there is no fluidization, the polymer powder particles fall into the bed and are no longer in suspension, and the method according to the invention cannot operate. Above the minimum bubbling flow rate, the powder particles fly away and the composition of the fluidized bed can no longer be kept constant.

Advantageously, the volume diameter D90 of the particles of thermoplastic polymer powder is from 30 to 500 µm, advantageously from 80 to 300 µm.

Advantageously, the volume diameter D10 of the particles of thermoplastic polymer powder is from 5 to 200 µm, advantageously from 15 to 100 µm.

Advantageously, the volume diameter of the particles of thermoplastic polymer powder is in the ratio D90/D10, or from 1.5 to 50, advantageously from 2 to 10.

Advantageously, the average volume diameter D50 of the particles of thermoplastic polymer powder is from 10 to 300 µm, in particular from 30 to 200 µm, more particularly from 45 to 200 µm. The volume diameters of the particles of thermoplastic polymer powder (D10, D50 and D90) are defined according to standard ISO 9276:2014.

"D50" corresponds to the average diameter by volume, that is to say, the value of the particle size that divides the examined population of particles exactly in half.

"D90" corresponds to the value at 90% of the cumulative curve of the particle size distribution by volume.

"D10" corresponds to the corresponds to the size of 10% of the volume of the particles.

According to another embodiment of the method according to the invention, a creel is present before the tank comprising a fluidized bed to control the tension of the roving(s) at the inlet of the tank comprising a fluidized bed.

Optionally, in the method according to the invention, one or more supporters are present after the tank comprising the fluidized bed.

Optionally, a differential voltage is applied between the inlet and the outlet of the tank used for the pre-impregnation step using a brake at the outlet of said tank.

Step for Spraying by Gun:

The step for pre-impregnation of the fibrous material is done by passage of one or more roving(s) in a device for continuous pre-impregnation by spraying, comprising a tank (30), comprising one or more nozzle(s) or one or more gun(s) for spraying the polymer powder on the fibrous material at the roller inlet.

The polymer powder or polymer is sprayed in the tank using nozzle(s) or gun(s) at the supporting part (E') in particular of the compression roller (at the inlet) on said fibrous material. The roving(s) are circulated in this tank.

(E') or the compression roller are as defined for the fluidized bed.

The tank can have any shape, in particular cylindrical or parallelepiped, particularly a rectangular parallelepiped or a cube, advantageously a rectangular parallelepiped.

The tank can be an open or closed tank. Advantageously, it is open.

In the event the tank is closed, it is then equipped with a sealing system so that the polymer powder cannot leave said tank.

This pre-impregnation step is therefore done by a dry route, that is to say, the thermoplastic polymer matrix is in powder form, and sprayed in the air, but cannot be dispersed in a solvent or water.

Each roving to be pre-impregnated is unwound from a device with reels under the traction created by cylinders (not shown). Preferably, the device comprises a plurality of reels, each reel making it possible to unwind a roving to be pre-impregnated. Thus, it is possible to pre-impregnate several fiber rovings at once. Each reel is provided with a brake (not shown) so as to apply tension on each fiber roving. In this case, an alignment module makes it possible to position the fiber rovings parallel to one another. In this way, the fiber rovings cannot be in contact with one another, which makes it possible to avoid mechanical damage to the fibers by friction relative to one another.

The fiber roving or the parallel fiber rovings then enter a tank (30), provided with a supporting part that is a compression roller (33) in the case of FIG. 12. The fiber roving or the parallel fiber rovings next come(s) out of the tank after pre-impregnation after checking the spraying flow rate of said powder by said nozzle (or said nozzles) or said gun(s) on said fibrous material. "Supporting part" refers to any system on which the roving can pass in the tank. The supporting part can have any shape as long as the roving can pass above.

An example supporting part, without restricting the invention thereto, is described in detail in FIG. 11.

This pre-impregnation is done in order to allow the polymer powder to penetrate the fiber roving and to adhere to the fibers enough to support the transport of the powdered roving outside the tank.

The bath is provided with stationary or rotating supporters on which the roving passes, thus causing a spreading of said roving, allowing a pre-impregnation of said roving.

The inventive method as indicated above is carried out by the dry route.

The inventive method does not preclude the presence of electrostatic charges that may appear by friction of the fibrous material on the elements of the implementation unit before or at the tank but that are in any case involuntary charges.

Advantageously, the tank comprises at least one supporting part, said roving(s) being in contact with part or all of the surface of said at least one supporting part.

If the fibrous material, such as the glass fiber, has a sizing, an optional de-sizing step can be carried out before the passage of the fibrous material in the tank. The term "sizing" refers to the surface treatments applied to the reinforcing fibers leaving the nozzle (textile sizing) and on the fabrics (plastic sizing).

"Textile" sizing applied on the fibers leaving the nozzle consists of depositing a bonding agent ensuring the cohesion of the fibers relative to one another, decreasing abrasion and facilitating subsequent handling (weaving, draping, knitting) and preventing the formation of electrostatic charges.

"Plastic" sizing or "finish" applied on fabrics consists of depositing a bonding agent, the roles of which are to ensure a physicochemical bond between the fibers and the resin and to protect the fiber from its environment.

Advantageously, the spraying flow rate of the powder by the nozzle(s) or the gun(s) is from 10 g/min to 400 g/min, in particular from 20 to 150 g/min.

This flow rate is for each gun or nozzle and can be identical or different for each gun or nozzle.

The spraying flow rate of the powder on fibrous material is essential to the pre-impregnation of the fibrous material.

Below 10 g/min the air flow rate is not sufficient to convey the powder.

Beyond 400 g/min, the state is turbulent.

Advantageously, said pre-impregnation step is carried out with simultaneous spreading of said roving(s) between the inlet and the outlet of said tank.

The expression "inlet of said tank" corresponds to the vertical tangent to the edge of the tank that comprises the roller(s) with nozzle(s) or gun(s).

The expression "outlet of said tank" corresponds to the vertical tangent to the other edge of the tank that comprises the roller(s) with nozzle(s) or gun(s).

Based on the geometry of the tank, the distance between the inlet and the outlet thereof therefore corresponds to the diameter in the case of a cylinder, to the side in the case of a cube, or to the width or length in the case of a paralleliped. The spreading consists of singularizing each fiber as much as possible constituting said roving from the other fibers that surround it in its most immediate environment. It corresponds to the transverse spreading of the roving.

In other words, the transverse spreading or the width of the roving increases between the inlet of the tank and the outlet of the tank and thus allows an improved pre-impregnation of the fibrous material. The tank can be open or closed, in particular it is open.

Advantageously, the tank comprises at least one supporting part, said roving(s) being in contact with part or all of the surface of said at least one supporting part.

FIG. 11 describes a tank (20) comprising a supporting part, the height (22) of which is adjustable.

The roving (21a) corresponds to the roving before pre-impregnation that is in contact with part or all of the surface of said at least one supporting part and therefore passes at least partially or wholly over the surface of the supporting part (22), said system (22) being submerged in the tank where the pre-impregnation is done. Said roving leaves the tank (21b) after checking the spraying flow rate of the powder at the roller inlet.

Said roving (21a) may or may not be in contact with the edge of the tank (23a), which can be a rotating or stationary roller, or a parallelepiped edge.

Advantageously, said roving (21a) is in contact with the inlet edge of the tank (23a).

Advantageously, the outlet edge of the tank (23b) is a roller, in particular cylindrical and rotating. Said roving (21b) may or may not be in contact with the outlet edge of the tank (23b), which can be a roller, in particular cylindrical and rotating or stationary, or a parallelepiped edge.

Advantageously, said roving (21b) is in contact with the outlet edge of the tank (23b).

Advantageously, the outlet edge of the tank (23b) is a roller, in particular cylindrical and rotating.

Advantageously, said roving (21a) is in contact with the inlet edge of the tank (23a) and the outlet edge of the tank (23b) is a roller, in particular cylindrical and rotating, and said roving (21b) is in contact with the outlet edge of the tank (23b), and the inlet edge of the tank (23b) is a roller, in particular cylindrical and rotating.

Advantageously, said roving (21a) is in contact with the inlet edge of the tank (23a) and a roller, in particular cylindrical and rotating, and said roving (21b) does not touch the outlet edge of the tank (23b).

Advantageously, said supporting part is perpendicular to the direction of said roving(s).

Advantageously, said spreading of said roving(s) is done at least at said at least one supporting part. The spreading of the roving is therefore done primarily at the supporting part, but can also be done at the edge(s) of the tank if there is contact between the roving and said edge.

In another embodiment, said at least one supporting part is a compression roller with a convex, concave or cylindrical shape.

The convex shape is favorable to the spreading, while the concave shape is unfavorable to the spreading, although it nevertheless occurs.

The expression "compression roller" means that the roving that passes bears partially or wholly on the surface of said compression roller, which causes the spreading of said roving.

Advantageously, said at least one compression roller is cylindrical and the spreading percentage of said roving(s) between the inlet and the outlet of said tank is between 1% and 1000%, preferably from 100% to 800%, preferably from 200% to 800%, preferably from 400% to 800%.

The spreading depends on the fibrous material used. For example, the spreading of a material made from carbon fiber is much greater than that of a linen fiber.

The spreading also depends on the number of fibers in the roving, their average diameter and their cohesion due to the sizing.

The diameter of said at least one compression roller is from 3 mm to 500 mm, preferably from 10 mm to 100 mm, in particular from 20 mm to 60 mm.

Below 3 mm, the deformation of the fiber caused by the compression roller is too great.

Advantageously, the compression roller is cylindrical and not ribbed, and is in particular metallic.

When the supporting part is at least one compression roller, according to a first variant, a single compression roller is present in the tank and said pre-impregnation is done at the angle $\alpha''_1$ formed by said roving(s) between the inlet of said compression roller and the vertical tangent at said compression roller.

The angle $\alpha''_1$ formed by said roving(s) between the inlet of said compression roller and the vertical tangent to said compression roller allows the formation of an area in which the powder will concentrate, thus leading to a "corner effect" that, with the simultaneous spreading of the roving by said compression roller, allows a pre-impregnation over a greater roving width and therefore an improved pre-impregnation compared to the techniques of the improved background art.

Advantageously, the angle $\alpha''_1$ is from 0 to 89°, preferably from 5° to 85°, preferably from 5° to 45°, preferably from 5° to 30°.

Nevertheless, an angle $\alpha_1$ from 0 to 5° can cause risks of mechanical stress, which will lead to breaking of the fibers, and an angle $\alpha''_1$ from 85° to 89° will not create enough mechanical force to create the "corner effect".

A value of the angle $\alpha_1$ equal to 0° therefore corresponds to a vertical fiber. It is clear that the height of the cylindrical compression roller is adjustable, thus making it possible to position the fiber vertically. It would not be outside the scope of the invention if the wall of the tank was pierced so as to be allow the exit of the roving.

Advantageously, the inlet edge of the tank (23a) is equipped with a roller, in particular cylindrical and rotating, on which said roving(s) pass(es), thus leading to spreading prior to the pre-impregnation.

In one embodiment, the spreading is initiated at the inlet edge of the tank (23a) and continues at said supporter(s) (E') defined hereinabove.

In another embodiment, one or more supporters (E") are present upstream from the tank comprising the fluidized bed at which the spreading is initiated.

The supporters (E") are as defined for (E').

Advantageously, the spreading is initiated at the supporter(s) (E") defined hereinabove and optionally continues at the inlet edge of the tank, then at said supporter(s) (E') defined hereinabove. The spreading is then maximal after passage at the compression roller(s) (E').

Advantageously, the spreading percentage of said roving(s) between the inlet of the supporters (E") and the outlet of the tank is between 1% and 1000%, preferably from 100% to 800%, preferably from 200% to 800%, preferably from 400% to 800%.

FIG. 12 describes, but is not limited to, an embodiment with a single compression roller, with a tank (30) comprising a spray gun (31) for powder (32) and in which a single cylindrical compression roller (33) is present and showing the angle $\alpha''_1$.

The arrows at the fiber indicate the passage direction of the fiber.

Advantageously, the level of said powder in said tank is at least located at mid-height of said compression roller.

It is clear that the "corner effect" caused by the angle $\alpha''_1$ favors the pre-impregnation on one face, but the spreading of said roving obtained owing to the compression roller also makes it possible to have pre-impregnation on the other face of said roving. In other words, said pre-impregnation is favored on one face of said roving(s) at the angle $\alpha''_1$ formed by said roving(s) between the inlet of said at least one compression roller $R''_1$ (33) and the vertical tangent at said compression roller $R''_1$, but the spreading also makes it possible to pre-impregnate the other face.

The angle $\alpha''_1$ is as defined above.

The spreading of said roving allows a pre-impregnation of said roving.

According to a second variant, when the supporting part is at least one compression roller, then two compression rollers $R''_1$ and $R''_2$ are in said tank and said pre-impregnation is done at the angle $\alpha_1$ formed by said roving(s) between the inlet of said compression roller $R''_1$ and the vertical tangent to said compression roller $R''_1$ and/or at the angle $\alpha''_2$ formed by said roving(s) between the inlet of said compression roller $R''_2$ and the vertical tangent to said compression roller $R''_2$, said compression roller $R''_1$ preceding said compression roller $R''_2$ and said roving(s) being able to pass above (FIGS. 13 and 14) or below (FIGS. 15 and 16) the roller $R''_2$.

Advantageously, the two compression rollers have identical or different shapes and are chosen from among a convex, concave or cylindrical shape.

Advantageously, the two compression rollers are identical and cylindrical, non-ribbed, and in particular metallic.

The diameter of the two compression rollers can also be identical or different and is as defined above.

Advantageously, the diameter of the two compression rollers is identical.

The two compression rollers $R''_1$ and $R''_2$ can be at the same level relative to one another and relative to the bottom of the tank (FIGS. 14 and 15) or offset relative to one another and relative to the bottom of the tank, the height of the compression roller $R''_1$ being higher or lower than that of the compression roller $R''_2$ relative to the bottom of the tank (FIGS. 13 and 16).

Advantageously, when the two rollers are at different heights and the roving passes above the roller $R''_2$, $\alpha''_2$ is then from 0 to 90°.

Advantageously, said pre-impregnation is then done at the angle $\alpha_1$ formed by said roving(s) between the inlet of said compression roller $R'_1$ in the vertical tangent to said compression roller on a face of said roving and the angle $\alpha''_2$ formed by said roving(s) between the inlet of said compression roller $R''_2$ and the vertical tangent to said compression roller $R''_2$ on the opposite face of said roving, which is obtained by passing above the roller $R''_2$.

Advantageously, said roving in this embodiment is subject to spreading at each angle $\alpha''_1$ and $\alpha''_2$.

FIG. 14 describes, but is not limited to, an embodiment with two compression rollers $R''_1$ and $R''_2$, $R''_1$ preceding $R''_2$, with a tank (30) comprising a powder (32) spray gun (31) in which the two cylindrical compression rollers, at the same level and side by side, are present and showing the case where said roving(s) come out between said compression rollers $R''_1$ and $R''2$. In this case, the angle $\alpha''_2$ is equal to 0 and said roving(s) pass above the roller $R''2$.

The arrows at the fiber indicate the passage direction of the fiber.

Alternatively, said roving(s) pass(es) at the inlet between said compression rollers $R''_1$ and $R''_2$ and come(s) out after having been in contact with part or all of the surface of said compression roller $R''_2$. Advantageously, said roving(s) is (are) in contact at the inlet with part or all of the surface of said compression roller $R''_1$ and come(s) out outside the compression roller $R''_2$ after having been in contact with part or all of the surface of said compression roller $R''_2$, beneath the roller $R''_2$, the angle $\alpha''_2$ being formed by said roving(s) between the inlet of said compression roller $R''_2$ and the vertical tangent to said compression roller $R''_2$. In this case, the angle $\alpha''_2=90°$. Said pre-impregnation is therefore done at the angle $\alpha_1$ formed by said roving(s) between the inlet of said compression roller $R''_1$ in the vertical tangent to said compression roller on a face of said roving and the angle $\alpha''_2$ formed by said roving(s) between the inlet of said compression roller $R''_2$ and the vertical tangent to said compression roller $R''_2$ on the same face of said roving, but the spreading also makes it possible to pre-impregnate the other face.

Advantageously, said roving in this embodiment is subject to spreading at each angle $\alpha''_1$ and $\alpha''_2$.

FIG. 15 shows an exemplary embodiment with two compression rollers $R''_1$ and $R''_2$ at the same level with respect to one another.

According to another embodiment of the second variant, when two compression rollers are present, then the distance between the two compression rollers $R''_1$ and $R''_2$ is from 0.15 mm to the length equivalent to the maximum dimension of the tank, preferably from 10 mm to 50 mm, and the height difference between the two compression rollers $R''_1$ and $R''_2$ is from 0 to the height corresponding to the maximum height of the tank subtracted from the diameters of the two compression rollers, preferably from 0.15 mm to the height corresponding to the maximum height of the tank subtracted from the diameters of the two compression rollers, more preferably a height difference between 10 mm and 300 mm, $R''_2$ being the upper compression roller.

FIG. 16 describes, but is not limited to, an embodiment with two compression rollers $R''_1$ and $R''_2$, $R''_1$ preceding $R''_2$, with a tank (30) comprising a powder (32) spray gun (31) in which the two cylindrical compression rollers at different levels are present and showing the angle $\alpha''_1$ and $\alpha''_2$.

The spray flow rate of said powder by each gun on said fibrous material is identical or different, in particular identical.

The diameter of the compression rollers $R''_1$ and $R''_2$ is shown as identical in FIGS. 13, 14, 15 and 16, but the diameter of each cylindrical compression roller can be different, the diameter of the compression roller $R''_1$ being able to be larger or smaller than that of the compression roller $R''_2$ in the range as defined above.

Advantageously, the diameter of the two compression rollers is identical.

It would not be going beyond the scope of the invention if the compression roller $R''_1$ was larger than the compression roller $R''2$.

According to a third variant, when two compression rollers are present and at different levels, then at least one third compression roller $R''_3$ is also present and located between the compression rollers $R''_1$ and $R''_2$ in the height direction (FIG. 17). Each compression roller comprises a powder (32) spray gun (31) and the spray flow rate of said powder by each gun on said fibrous material of the roller inlet is identical or different, in particular identical.

Advantageously, said roving(s) is (are) in contact at the inlet with part or all of the surface of said compression roller $R''_1$, then with part or all of the surface of said compression roller $R''_3$, and come(s) out after having been in contact with part or all of the surface of said compression roller $R''_2$.

Advantageously, said pre-impregnation is done on a face of said roving(s) at the angle $\alpha_1$ formed by said roving(s) between the inlet of said at least one compression roller $R''_1$ and the vertical tangent to said compression roller $R''_1$ as well as at the angle $\alpha''_3$ formed by said roving(s) and the vertical tangent to said compression roller $R''_3$ and on the other face at the angle $\alpha_2$ formed by said roving(s) and the vertical tangent to said compression roller $R''_2$.

Advantageously, when two compression rollers are present at different levels and at least one third compression roller $R''_3$ is also present, then the angle $\alpha''_2$ formed by said roving(s) between the inlet of said at least one compression roller $R''_2$ and the vertical tangent to said compression roller $R''_2$ is from 180° to 45°, in particular from 120° to 60.

Advantageously, the angle $\alpha''_3$ is from 0° to 180°, advantageously from 45° to 135°.

FIG. 17 describes an embodiment, without being limited thereto, with a tank (30) comprising two compression rollers $R''_1$ and $R''_2$, $R''_1$ preceding $R''_2$, and a third compression roller $R''_3$ and showing the angles $\alpha''_1$, $\alpha''_2$ and $\alpha''_3$.

The diameter of the compression rollers $R''_1$, $R''_2$ and $R''_3$ is shown as identical in FIG. 17, but the diameter of each cylindrical compression roller can be different, or two compression rollers can have the same diameter and the third can have a different, larger or smaller diameter, in the range as defined above.

Advantageously, the diameter of the three compression rollers is identical.

Advantageously, in this third variant, a second control of the spreading of said roving(s) is done at the compression roller $R''_3$ and a third control of the spreading is done at the compression roller $R''_3$. The spraying flow rate in this third variant is as defined above.

It would not be outside the scope of the invention if, in this third variant, said roving(s) is(are) in contact at the inlet with part or all of the surface of said compression roller $R''_1$, then with part or all of the surface of said compression roller $R''_2$, and come(s) out after having been in contact with part or all of the surface of said compression roller $R''_3$.

Advantageously, in another variant, six to ten rollers are present and at the same level.

Advantageously, the spraying flow rate in the tank is from 10 g/min to 400 g/min, in particular from 20 to 150 g/min.

Advantageously, the volume diameter D90 of the particles of thermoplastic polymer powder is from 30 to 500 μm, advantageously from 80 to 300 μm.

Advantageously, the volume diameter D10 of the particles of thermoplastic polymer powder is from 5 to 200 μm, advantageously from 15 to 100 μm.

Advantageously, the volume diameter of the particles of thermoplastic polymer powder is in the ratio D90/D10, or from 1.5 to 50, advantageously from 2 to 10.

Advantageously, the average volume diameter D50 of the particles of thermoplastic polymer powder is from 10 to 300 μm, in particular from 30 to 200 μm, more particularly from 45 to 200 μm. The volume diameters of the particles (D10, D50 and D90) are defined according to standard ISO 9276: 2014.

"D50" corresponds to the average diameter by volume, that is to say, the value of the particle size that divides the examined population of particles exactly in half.

"D90" corresponds to the value at 90% of the cumulative curve of the particle size distribution by volume.

"D10" corresponds to the corresponds to the size of 10% of the volume of the particles.

According to another embodiment of the method according to the invention, a creel is present before the tank to control the tension of said roving(s) at the inlet of the tank.

Optionally, in the method according to the invention, one or more supporters are present after the tank.

Optionally, a differential voltage is applied between the inlet and the outlet of the tank used for the pre-impregnation step using a brake at the outlet of said tank.

Heating Step:

A first heating step can immediately follow the pre-impregnation step, or then other steps can take place between the pre-impregnation step and the heating step and irrespective of the system selected to perform the pre-impregnation step, and in particular with a system chosen from among a fluidized bed, a spray gun and the molten route, in particular at a high speed, in particular a fluidized bed.

Nevertheless, the first heating step implemented by a heating system provided with at least one supporting part (E) does not correspond to a heating calendar, and at least one heating system is always done before the calendaring step, which is necessary to smooth and shape the ribbon. Advantageously, said first heating step immediately follows the pre-impregnation step. The expression "immediately follows" means that there is no intermediate step between the pre-impregnation step and said heating step.

Advantageously, a single heating step is done, immediately following the pre-impregnation step.

Advantageously, said at least one heating system is chosen from an infrared bulb, a UV bulb and convection heating.

The fibrous material being in contact with the supporter(s) and the heating system, and the supporter being conductive, the heating system therefore also works by conduction.

Advantageously, said at least one heating system is chosen from an infrared bulb.

Advantageously, said at least one supporting part (E) is a compression roller $R'_i$ with a convex, concave or cylindrical shape.

It should be noted that the compression rollers corresponding to the supporting parts (E) and (E'') can be identical or different whether in terms of the material or shape and its characteristics (diameter, length, width, height, etc. as a function of the shape).

The convex shape is favorable to the spreading, while the concave shape is unfavorable to the spreading, although it nevertheless occurs.

The at least one supporting part (E) can also have an alternating convex and concave shape. In this case, the passage of the roving over a convex compression roller causes the spreading of said roving, then the passage of the roving over a concave compression roller causes the retraction of the roving, and so forth, making it possible, if needed, to improve the homogeneity of the impregnation, in particular to the core.

The expression "compression roller" means that the roving that passes bears partially or wholly on the surface of said compression roller, which causes the spreading of said roving.

The rollers can be free (rotating) or stationary.

They can be smooth, striated or grooved.

Advantageously, the rollers are cylindrical and striated. When the rollers are striated, two striations can be present in opposite directions from one another starting from the center of said roller, thus allowing the separation of the rovings toward the outside of the roller or in opposite directions from one another starting from the outside of said roller, thus making it possible to bring the rovings back toward the center of the roller.

Whatever the system used for the pre-impregnation step, a first spreading occurs during this step, in particular if the pre-impregnation step is done with the use of supporting parts (E'), such as in a fluidized bed with at least one supporter as described above.

A first spreading of the roving occurs at said compression rollers corresponding to the supporting parts (E') with "corner effect" due to the partial or complete passage of said roving over said supporting part(s) (E') and a second spreading occurs during the heating step, at said compression rollers corresponding to the supporting parts (E) due to the partial or complete passage of said roving over said supporting part(s) (E). This second spreading is preceded, during the passage of the roving in the heating system, before its partial or complete passage over said supporting part(s) (E), by a retraction of the roving due to the melting of the polymer on said roving.

This second spreading combined with the melting of said polymer matrix by the heating system and the retraction of the roving, make it possible to homogenize the pre-impregnation and thus to finalize the impregnation and to thus have an impregnation to the core and to have a high fiber rate by volume, in particular constant in at least 70% of the volume of the strip or ribbon, in particular in at least 80% of the volume of the strip or ribbon, in particular in at least 90% of the volume of the strip or ribbon, more particularly in at least 95% of the volume of the strip or ribbon, as well as to decrease the porosity.

The spreading depends on the fibrous material used. For example, the spreading of a material made from carbon fiber is much greater than that of a linen fiber.

The spreading also depends on the number of fibers in the roving, their average diameter and their cohesion due to the sizing.

The diameter of said at least one compression roller (supporter (E)) is from 3 mm to 100 mm, preferably from 3 mm to 20 mm, in particular from 5 mm to 10 mm.

Below 3 mm, the deformation of the fiber caused by the compression roller is too great.

Advantageously, the compression roller is cylindrical and not ribbed, and is in particular metallic. Advantageously, said at least one supporting part (E) is made up of at least 1 cylindrical compression roller.

Advantageously, said at least one supporting part (E) is made up of 1 to 15 cylindrical compression rollers ($R'_1$ to $R'_{15}$), preferably 3 to 15 compression rollers ($R'_3$ to $R'_{15}$), in particular 6 to 10 compression rollers ($R'_6$ to $R'_{10}$).

It is clear that irrespective of the number of supporting parts (E) present, they are all located or comprised in the environment of the heating system, that is to say, they are not outside the heating system.

According to a first variant, said at least one supporting part (E) is made up of a single compression roller, in particular cylindrical.

Advantageously, said roving(s) form(s) an angle $\alpha'_1$ of 0.1 to 89°, in particular of 5 to 75°, in particular of 10 to 45° with a first compression roller $R'_1$ and the horizontal tangent to said compression roller $R'_1$, said roving(s) expanding in contact with said compression roller $R'_1$.

It would not be outside the scope of the invention if the roving were to form an angle with said horizontal tangent to said compression roller $R'_1$ of more than 89° to 360° (modulo 360°).

In the event the roving forms an angle of at least 360° with said horizontal tangent to said compression roller $R'_1$, this means that the roving has performed at least one complete revolution of said roller.

According to a second variant, said at least one supporting part (E) is made up of two compression rollers, in particular cylindrical.

Advantageously, said roving(s) form(s) an angle $\alpha'_1$ of 0 to 180°, in particular of 5 to 75°, in particular of 10 to 45° with a first compression roller $R'_1$ and the horizontal tangent to said compression roller $R'_1$, said roving(s) expanding in contact with said compression roller $R'_1$.

It would not be outside the scope of the invention if the roving were to form an angle with said horizontal tangent to said compression roller $R'_1$ of more than 180° to 360° (modulo 360°).

In the event the roving forms an angle of at least 360° with said horizontal tangent to said compression roller $R'_1$, this means that the roving has performed at least one complete revolution of said roller.

Advantageously, a second compression roller $R'_2$ is present after said first compression roller $R'_1$, said roving(s) forming an angle $\alpha'_2$ of 0 to 180°, in particular of 5 to 75°, in particular of 10 to 45° with said second compression roller $R'_2$ and the horizontal tangent to said compression roller $R'_2$, said roving(s) expanding in contact with said compression roller.

It would not be outside the scope of the invention if the roving were to form an angle with said horizontal tangent to said compression roller $R'_2$ of more than 180° to 360° (modulo 360°).

In the event the roving forms an angle of at least 360° with said horizontal tangent to said compression roller $R'_2$, this means that the roving has performed at least one complete revolution of said roller.

The roving passes below the roller $R'_1$, then above the roller $R'_2$. It is clear that the passage of the roving above the roller $R'_1$, then below the roller $R'_2$ is also an embodiment of the invention. The roller $R'_2$ can be located above the roller $R'_1$, said roller $R'_1$ preceding said roller $R'_2$.

It is likewise obvious that the roller $R'_2$ can be located below the roller $R'_1$.

The height difference between the roller $R'_1$ and the roller $R'_2$ is greater than or equal to 0.

Advantageously, the height difference between the roller $R'_1$ and the roller $R'_2$ is between 1 and 20 cm, preferably from 2 to 15 cm, and in particular from 3 to 10 cm.

Advantageously, the two rollers are at the same level and have the same diameter, and the height difference is then nil.

The distance between the two rollers is between 1 and 20 cm, preferably from 2 to 15 cm, in particular from 3 to 10 cm.

According to a third variant, said at least one supporting part (E) is made up of 3 compression rollers, in particular cylindrical.

Advantageously, said roving(s) form(s) an angle $\alpha'_1$ of 0.1 to 89°, in particular of 5 to 75°, in particular of 10 to 45° with a first compression roller $R'_1$ and the horizontal tangent to said compression roller $R'_1$, said roving(s) expanding in contact with said first compression roller.

It would not be outside the scope of the invention if the roving were to form an angle with said horizontal tangent to said compression roller $R'_1$ of more than 89° to 360° (modulo 360°).

In the event the roving forms an angle of at least 360° with said horizontal tangent to said compression roller $R'_1$, this means that the roving has performed at least one complete revolution of said roller.

Advantageously, the second roller is present after said first roller, said roving(s) forming an angle $\alpha'_2$ of 0 to 180°, in particular of 5 to 75°, in particular of 10 to 45° with the second compression roller $R'_2$ and the horizontal tangent to said compression roller $R'_2$, said roving(s) expanding in contact with said compression roller.

It would not be outside the scope of the invention if the roving were to form an angle with said horizontal tangent to said compression roller $R'_2$ of more than 180° to 360° (modulo 360°).

In the event the roving forms an angle of at least 360° with said horizontal tangent to said compression roller $R'_2$, this means that the roving has performed at least one complete revolution of said roller.

Advantageously, the third compression roller $R'_3$ is present after said second compression roller $R'_2$, said roving(s) forming an angle $\alpha'_3$ of 0 to 180°, in particular of 5 to 75°, in particular of 10 to 45° with said third compression roller $R'_3$ and the horizontal tangent to said compression roller $R'_3$, said roving(s) expanding in contact with said compression roller $R'_3$.

It would not be outside the scope of the invention if the roving were to form an angle with said horizontal tangent to said compression roller $R'_3$ of more than 180° to 360° (modulo 360°).

In the event the roving forms an angle of at least 360° with said horizontal tangent to said compression roller $R'_3$, this means that the roving has performed at least one complete revolution of said roller.

The roving passes below the roller $R'_1$, then above the roller $R'_2$, and next below the roller $R'_3$.

It is clear that the passage of the roving above the roller $R'_1$, then below the roller $R'_2$ and next above the roller $R'_3$ is also an embodiment of the invention.

The three rollers can be at the same level, but advantageously, the roller $R'_2$ is located above the roller $R'_1$, and the roller $R'_3$ is located below the roller $R'_2$, said roller $R'_1$ preceding said roller $R'_2$, which in turn precedes $R'_3$.

All relative geometric positions between the three rollers are possible.

The height difference between the lowest roller and the highest roller is greater than or equal to 0.

Advantageously, the height difference between each of the three rollers is between 1 and 20 cm, preferably from 2 to 15 cm, in particular from 3 to 10 cm.

The distance between each of the three rollers is from 1 to 20 cm, preferably from 2 to 15 cm, in particular from 3 to 10 cm.

Advantageously, the roller $R'_1$ precedes the roller $R'_3$ and are at the same level and the roller $R'_2$ is located between the roller $R'_1$ and the roller $R'_3$ and is located above the other two rollers. FIG. 1 shows an exemplary heating system having three compression rollers.

The length l between the inlet of the heating system and the first roller $R'_1$ is variable as a function of the polymer used and the passage speed of the strip.

l therefore represents the length sufficient for the polymer to melt, at least partially, particularly completely, at the inlet of the first roller.

In one embodiment, four (4) to fifteen (15) rollers can be present.

In general, the angle(s) $\alpha'_{4-i}$ (i being from 4 to 15) formed by said roving(s) with the rollers $R'_{4-i}$ is(are) from 0 to 180°, in particular from 5 to 75°, particularly from 10 to 45°.

In general, the height difference between each roller $R'_i$ and between the lowest roller and the highest roller is greater than or equal to 0.

Advantageously, the height difference between each of the rollers $R'_i$ is between 1 and 20 cm, preferably from 2 to 15 cm, in particular from 3 to 10 cm.

In general, the distance between each of the rollers $R'_i$ is from 1 to 20 cm, preferably from 2 to 15 cm, in particular from 3 to 10 cm.

Advantageously, the spreading percentage during the heating step between the inlet of the first compression roller $R'_1$ and the outlet of the last compression roller $R'_i$ is about 0 to 300%, in particular 0 to 50%.

Advantageously, the spreading percentage during the heating step between the inlet of the first compression roller $R'_1$ and the outlet of the last compression roller $R'_i$ is about 1 to 50%.

Advantageously, said thermoplastic polymer is a nonreactive thermoplastic polymer. The heating system therefore allows the melting of said thermoplastic polymer after pre-impregnation, as described hereinabove.

Advantageously, said thermoplastic polymer is a reactive pre-polymer capable of reacting with itself or with another pre-polymer, based on the chain ends of said pre-polymer, or with another chain extender, said reactive polymer optionally being polymerized during the heating step.

Depending on the temperature and/or the passage speed of the roving, the heating system allows the melting of said thermoplastic pre-polymer after pre-impregnation as described hereinabove without polymerization of said pre-polymer with itself or with a chain extender or of said pre-polymers amongst themselves.

The fiber level in the impregnated fibrous material is set during the heating step and advantageously it is from 45 to 65% by volume, preferably from 50 to 60% by volume, in particular from 54 to 60%.

Below 45% fibers, the reinforcement is not of interest regarding the mechanical properties.

Above 65%, the limitations of the method are reached and the mechanical properties are lost again.

Advantageously, the porosity level in said impregnated fibrous material is less than 10%, in particular less than 5%, particularly less than 2%.

A second heating step can be carried out after the calendaring step below.

This second heating step makes it possible to correct any defects, in particular in homogeneity, that may remain after the first heating step.

It is done with the same system as for the first step.

Advantageously, the heating system of this second step is made up of two rollers.

Optionally, said pre-impregnation and impregnation steps are completed by a step for molding in a nozzle regulated at a constant temperature, said molding step being done before said calendaring step. Optionally, this nozzle is a crosshead-die extrusion nozzle and makes it possible to cover said single roving or said plurality of parallel rovings after impregnation by the powder, said covering step being done before said calendaring step, with a molten thermoplastic polymer, which may be identical to or different from said pre-impregnation polymer, said molten polymer preferably being of the same nature as said pre-impregnation polymer.

To that end, a covering device is connected to the outlet of the heating system that may include a covering crosshead-die head, as is also described in patent EP0406067. The covering polymer may be identical to or different from the polymer powder in the tank. Preferably, it is of the same nature. Such covering makes it possible not only to complete the impregnation step of the fibers in order to obtain a final volume rate of polymer in the desired range and to prevent the presence, on the surface of the impregnated roving, of a fiber level that is locally too high, which would be detrimental to the welding of the tapes during the manufacturing of the composite part, in particular to obtain "ready to use" fibrous materials of good quality, but also to improve the performance of the obtained composite material.

Shaping Step

Optionally, a step for shaping of the roving or parallel rovings of said impregnated fibrous material is done.

A calendaring system as described in WO 2015/121583 can be used.

Advantageously, it is done by calendaring using at least one heating calendar in the form of a single unidirectional ribbon or a plurality of parallel unidirectional ribbons with, in the latter case, said heating calendar including a plurality of calendaring grooves, preferably up to 200 calendaring grooves, in accordance with the number of said ribbons and with a pressure and/or separation between the rollers of said calendar regulated by a governing system.

This step is always done after the heating step if there is only one or between the first heating step and the second heating step when the two coexist.

Advantageously, the calendaring step is done using a plurality of heating calendars, mounted in parallel and/or in series relative to the passage direction of the fiber rovings.

Advantageously, said heating calendar(s) comprise(s) an integrated induction or microwave heating system, preferably microwave, coupled with the presence of carbon fillers in said thermoplastic polymer or mixture of thermoplastic polymers.

According to another embodiment, a belt press is present between the heating system and the calendar.

According to still another embodiment, a heating nozzle is present between the heating system and the calendar.

According to another embodiment, a belt press is present between the heating system and the calendar and a heating nozzle is present between the belt press and the calendar.

According to another aspect, the present invention relates to a unidirectional ribbon of impregnated fibrous material, in particular a ribbon wound on a spool, characterized in that it is obtained using a method as defined hereinabove.

Advantageously, said ribbon has a width (l) and thickness (ep) suitable for robot application in the manufacture of three-dimensional workpieces, without the need for slitting, and preferably has a width (l) of at least 5 mm and up to 400 mm, preferably between 5 and 50 mm, and even more preferably between 5 and 15 mm.

Advantageously, the thermoplastic polymer of said ribbon is a polyamide as defined hereinabove. Advantageously, it is in particular selected from an aliphatic polyamide such as PA 6, PA 11, PA 12, PA 66, PA 46, PA 610, PA 612, PA 1010, PA 1012, PA 11/1010 or PA 12/1010 or a semi-aromatic polyamide such as PA MXD6 and PA MXD10 or chosen from PA 6/6T, PA 61/6T, PA 66/6T, PA 11/10T, PA 11/6T/10T, PA MXDT/10T, PA MPMDT/10T, PA BACT/6T, PA BACT/10T and PA BACT/10T/6T, PVDF, PEEK, PEKK and PEI or a mixture thereof.

According to another aspect, the present invention relates to the use of a method as defined hereinabove, for the manufacture of calibrated ribbons suitable for the manufacture of three-dimensional composite parts, by the automatic laying of the said ribbons by means of a robot.

According to still another aspect, the present invention relates to the use of a ribbon of impregnated fibrous material, as defined hereinabove, in the manufacture of three-dimensional composite parts.

Advantageously, said manufacturer of said composite parts relates to the fields of transportation, in particular automotive, oil and gas, in particular offshore, gas storage, aeronautics, naval, railways; renewable energies, in particular wind energy, hydro turbines, energy storage devices, solar panels; thermal protection panels; sports and leisure, health and medical and electronics. According to another aspect, the present invention relates to a three-dimensional composite part, characterized in that it results from the use of at least one unidirectional ribbon of impregnated fibrous material as defined hereinabove.

Advantageous Embodiments of the Inventive Method

Fluidized Bed Combined with One or Two Heating Steps

Advantageously, the fibrous material is selected from carbon fiber and glass fiber.

Advantageously, the thermoplastic pre-polymer used to impregnate the carbon fiber is selected from a polyamide, in particular an aliphatic polyamide such as PA 11, PA 12, PA 11/1010 and PA 12/1010, a semi-aromatic polyamide, in particular PA 11/10T, PA 11/6T/10T, PA MXDT/10T, PA MPMDT/10T, PA BACT/10T, PA BACT/6T, PA BACT/10T/6T, PA MXD6 and PA MXD10, PEEK, PEKK and PEI or a mixture thereof.

Advantageously, the thermoplastic pre-polymer used to impregnate the glass fiber is selected from a polyamide, in particular an aliphatic polyamide such as PA 11, PA 12, PA 11/1010 and PA 12/1010, a semi-aromatic polyamide, in particular PA 11/10T, PA 11/6T/10T, PA MXDT/10T, PA MPMDT/10T, PA BACT/10T, PA BACT/6T, PA BACT/10T/6T, PA MXD6 and PA MXD10, PEEK, PEKK and PEI or a mixture thereof.

Table 1 below shows advantageous embodiments according to the inventive method in which the pre-impregnation step is done in a tank comprising, for a carbon fiber or glass fiber roving with one or more non-ribbed cylindrical compression roller(s):

TABLE I

| Embodiment no. | Fibrous material (fiber type) | Polymer | Number of compression rollers | Residence time (s) | Angle $\alpha_1$ (°) |
| --- | --- | --- | --- | --- | --- |
| 1 | Carbon | Polyamide | 1 | 0.1 to 5 | 5 to 85 |
| 2 | Carbon | Polyamide | 1 | 0.1 to 5 | 5 to 45 |
| 3 | Carbon | Polyamide | 1 | 0.1 to 5 | 5 to 30 |
| 4 | Carbon | Polyamide | 1 | 0.1 to 3 | 5 to 85 |
| 5 | Carbon | Polyamide | 1 | 0.1 to 3 | 5 to 45 |
| 6 | Carbon | Polyamide | 1 | 0.1 to 3 | 5 to 30 |
| 7 | Carbon | Polyamide | 2 | 0.1 to 5 | 5 to 85 |
| 8 | Carbon | Polyamide | 2 | 0.1 to 5 | 5 to 45 |
| 9 | Carbon | Polyamide | 2 | 0.1 to 5 | 5 to 30 |
| 10 | Carbon | Polyamide | 2 | 0.1 to 3 | 5 to 85 |
| 11 | Carbon | Polyamide | 2 | 0.1 to 3 | 5 to 45 |
| 12 | Carbon | Polyamide | 2 | 0.1 to 3 | 5 to 30 |
| 13 | Carbon | Polyamide | 3 | 0.1 to 5 | 5 to 85 |

TABLE I-continued

| Embodiment no. | Fibrous material (fiber type) | Polymer | Number of compression rollers | Residence time (s) | Angle $\alpha_1$ (°) |
|---|---|---|---|---|---|
| 14 | Carbon | Polyamide | 3 | 0.1 to 5 | 5 to 45 |
| 15 | Carbon | Polyamide | 3 | 0.1 to 5 | 5 to 30 |
| 16 | Carbon | Polyamide | 3 | 0.1 to 3 | 5 to 85 |
| 17 | Carbon | Polyamide | 3 | 0.1 to 3 | 5 to 45 |
| 18 | Carbon | Polyamide | 3 | 0.1 to 3 | 5 to 30 |
| 19 | Carbon | PEKK | 1 | 0.1 to 5 | 5 to 85 |
| 20 | Carbon | PEKK | 1 | 0.1 to 5 | 5 to 45 |
| 21 | Carbon | PEKK | 1 | 0.1 to 5 | 5 to 30 |
| 22 | Carbon | PEKK | 1 | 0.1 to 3 | 5 to 85 |
| 23 | Carbon | PEKK | 1 | 0.1 to 3 | 5 to 45 |
| 24 | Carbon | PEKK | 1 | 0.1 to 3 | 5 to 30 |
| 25 | Carbon | PEKK | 2 | 0.1 to 5 | 5 to 85 |
| 26 | Carbon | PEKK | 2 | 0.1 to 5 | 5 to 45 |
| 27 | Carbon | PEKK | 2 | 0.1 to 5 | 5 to 30 |
| 28 | Carbon | PEKK | 2 | 0.1 to 3 | 5 to 85 |
| 29 | Carbon | PEKK | 2 | 0.1 to 3 | 5 to 45 |
| 30 | Carbon | PEKK | 2 | 0.1 to 3 | 5 to 30 |
| 31 | Carbon | PEKK | 3 | 0.1 to 5 | 5 to 85 |
| 32 | Carbon | PEKK | 3 | 0.1 to 5 | 5 to 45 |
| 33 | Carbon | PEKK | 3 | 0.1 to 5 | 5 to 30 |
| 34 | Carbon | PEKK | 3 | 0.1 to 3 | 5 to 85 |
| 35 | Carbon | PEKK | 3 | 0.1 to 3 | 5 to 45 |
| 36 | Carbon | PEKK | 3 | 0.1 to 3 | 5 to 30 |
| 37 | Carbon | PEI | 1 | 0.1 to 5 | 5 to 85 |
| 38 | Carbon | PEI | 1 | 0.1 to 5 | 5 to 45 |
| 39 | Carbon | PEI | 1 | 0.1 to 5 | 5 to 30 |
| 40 | Carbon | PEI | 1 | 0.1 to 3 | 5 to 85 |
| 41 | Carbon | PEI | 1 | 0.1 to 3 | 5 to 45 |
| 42 | Carbon | PEI | 1 | 0.1 to 3 | 5 to 30 |
| 43 | Carbon | PEI | 2 | 0.1 to 5 | 5 to 85 |
| 44 | Carbon | PEI | 2 | 0.1 to 5 | 5 to 45 |
| 45 | Carbon | PEI | 2 | 0.1 to 5 | 5 to 30 |
| 46 | Carbon | PEI | 2 | 0.1 to 3 | 5 to 85 |
| 47 | Carbon | PEI | 2 | 0.1 to 3 | 5 to 45 |
| 48 | Carbon | PEI | 2 | 0.1 to 3 | 5 to 30 |
| 49 | Carbon | PEI | 3 | 0.1 to 5 | 5 to 85 |
| 50 | Carbon | PEI | 3 | 0.1 to 5 | 5 to 45 |
| 51 | Carbon | PEI | 3 | 0.1 to 5 | 5 to 30 |
| 52 | Carbon | PEI | 3 | 0.1 to 3 | 5 to 85 |
| 53 | Carbon | PEI | 3 | 0.1 to 3 | 5 to 45 |
| 54 | Carbon | PEI | 3 | 0.1 to 3 | 5 to 30 |
| 55 | Carbon | PEI | 1 | 0.1 to 5 | 5 to 85 |
| 56 | Carbon | PEI | 1 | 0.1 to 5 | 5 to 45 |
| 57 | Carbon | PEI | 1 | 0.1 to 5 | 5 to 30 |
| 58 | Carbon | PEI | 1 | 0.1 to 3 | 5 to 85 |
| 59 | Carbon | PEI | 1 | 0.1 to 3 | 5 to 45 |
| 60 | Carbon | PEI | 1 | 0.1 to 3 | 5 to 30 |
| 61 | Carbon | PEI | 2 | 0.1 to 5 | 5 to 85 |
| 62 | Carbon | PEI | 2 | 0.1 to 5 | 5 to 45 |
| 63 | Carbon | PEI | 2 | 0.1 to 5 | 5 to 30 |
| 64 | Carbon | PEI | 2 | 0.1 to 3 | 5 to 85 |
| 65 | Carbon | PEI | 2 | 0.1 to 3 | 5 to 45 |
| 66 | Carbon | PEI | 2 | 0.1 to 3 | 5 to 30 |
| 67 | Carbon | PEI | 3 | 0.1 to 5 | 5 to 85 |
| 68 | Carbon | PEI | 3 | 0.1 to 5 | 5 to 45 |
| 69 | Carbon | PEI | 3 | 0.1 to 5 | 5 to 30 |
| 70 | Carbon | PEI | 3 | 0.1 to 3 | 5 to 85 |
| 71 | Carbon | PEI | 3 | 0.1 to 3 | 5 to 45 |
| 72 | Carbon | PEI | 3 | 0.1 to 3 | 5 to 30 |
| 73 | Glass | Polyamide | 1 | 0.1 to 5 | 5 to 85 |
| 74 | Glass | Polyamide | 1 | 0.1 to 5 | 5 to 45 |
| 75 | Glass | Polyamide | 1 | 0.1 to 5 | 5 to 30 |
| 76 | Glass | Polyamide | 1 | 0.1 to 3 | 5 to 85 |
| 77 | Glass | Polyamide | 1 | 0.1 to 3 | 5 to 45 |
| 78 | Glass | Polyamide | 1 | 0.1 to 3 | 5 to 30 |
| 79 | Glass | Polyamide | 2 | 0.1 to 5 | 5 to 85 |
| 80 | Glass | Polyamide | 2 | 0.1 to 5 | 5 to 45 |
| 81 | Glass | Polyamide | 2 | 0.1 to 5 | 5 to 30 |
| 82 | Glass | Polyamide | 2 | 0.1 to 3 | 5 to 85 |
| 83 | Glass | Polyamide | 2 | 0.1 to 3 | 5 to 45 |
| 84 | Glass | Polyamide | 2 | 0.1 to 3 | 5 to 30 |
| 85 | Glass | Polyamide | 3 | 0.1 to 5 | 5 to 85 |
| 86 | Glass | Polyamide | 3 | 0.1 to 5 | 5 to 45 |
| 87 | Glass | Polyamide | 3 | 0.1 to 5 | 5 to 30 |
| 88 | Glass | Polyamide | 3 | 0.1 to 3 | 5 to 85 |
| 89 | Glass | Polyamide | 3 | 0.1 to 3 | 5 to 45 |
| 90 | Glass | Polyamide | 3 | 0.1 to 3 | 5 to 30 |
| 91 | Glass | PEKK | 1 | 0.1 to 5 | 5 to 85 |
| 92 | Glass | PEKK | 1 | 0.1 to 5 | 5 to 45 |
| 93 | Glass | PEKK | 1 | 0.1 to 5 | 5 to 30 |
| 94 | Glass | PEKK | 1 | 0.1 to 3 | 5 to 85 |
| 95 | Glass | PEKK | 1 | 0.1 to 3 | 5 to 45 |
| 96 | Glass | PEKK | 1 | 0.1 to 3 | 5 to 30 |
| 97 | Glass | PEKK | 2 | 0.1 to 5 | 5 to 85 |
| 98 | Glass | PEKK | 2 | 0.1 to 5 | 5 to 45 |
| 99 | Glass | PEKK | 2 | 0.1 to 5 | 5 to 30 |
| 100 | Glass | PEKK | 2 | 0.1 to 3 | 5 to 85 |
| 101 | Glass | PEKK | 2 | 0.1 to 3 | 5 to 45 |
| 102 | Glass | PEKK | 2 | 0.1 to 3 | 5 to 30 |
| 103 | Glass | PEKK | 3 | 0.1 to 5 | 5 to 85 |
| 104 | Glass | PEKK | 3 | 0.1 to 5 | 5 to 45 |
| 105 | Glass | PEKK | 3 | 0.1 to 5 | 5 to 30 |
| 106 | Glass | PEKK | 3 | 0.1 to 3 | 5 to 85 |
| 107 | Glass | PEKK | 3 | 0.1 to 3 | 5 to 45 |
| 108 | Glass | PEKK | 3 | 0.1 to 3 | 5 to 30 |
| 109 | Glass | PEI | 1 | 0.1 to 5 | 5 to 85 |
| 110 | Glass | PEI | 1 | 0.1 to 5 | 5 to 45 |
| 111 | Glass | PEI | 1 | 0.1 to 5 | 5 to 30 |
| 112 | Glass | PEI | 1 | 0.1 to 3 | 5 to 85 |
| 113 | Glass | PEI | 1 | 0.1 to 3 | 5 to 45 |
| 114 | Glass | PEI | 1 | 0.1 to 3 | 5 to 30 |
| 115 | Glass | PEI | 2 | 0.1 to 5 | 5 to 85 |
| 116 | Glass | PEI | 2 | 0.1 to 5 | 5 to 45 |
| 117 | Glass | PEI | 2 | 0.1 to 5 | 5 to 30 |
| 118 | Glass | PEI | 2 | 0.1 to 3 | 5 to 85 |
| 119 | Glass | PEI | 2 | 0.1 to 3 | 5 to 45 |
| 120 | Glass | PEI | 2 | 0.1 to 3 | 5 to 30 |
| 121 | Glass | PEI | 3 | 0.1 to 5 | 5 to 85 |
| 122 | Glass | PEI | 3 | 0.1 to 5 | 5 to 45 |
| 123 | Glass | PEI | 3 | 0.1 to 5 | 5 to 30 |
| 124 | Glass | PEI | 3 | 0.1 to 3 | 5 to 85 |
| 125 | Glass | PEI | 3 | 0.1 to 3 | 5 to 45 |
| 126 | Glass | PEI | 3 | 0.1 to 3 | 5 to 30 |
| 127 | Glass | PEI | 1 | 0.1 to 5 | 5 to 85 |
| 128 | Glass | PEI | 1 | 0.1 to 5 | 5 to 45 |
| 129 | Glass | PEI | 1 | 0.1 to 5 | 5 to 30 |
| 130 | Glass | PEI | 1 | 0.1 to 3 | 5 to 85 |
| 131 | Glass | PEI | 1 | 0.1 to 3 | 5 to 45 |
| 132 | Glass | PEI | 1 | 0.1 to 3 | 5 to 30 |
| 133 | Glass | PEI | 2 | 0.1 to 5 | 5 to 85 |
| 134 | Glass | PEI | 2 | 0.1 to 5 | 5 to 45 |
| 135 | Glass | PEI | 2 | 0.1 to 5 | 5 to 30 |
| 136 | Glass | PEI | 2 | 0.1 to 3 | 5 to 85 |
| 137 | Glass | PEI | 2 | 0.1 to 3 | 5 to 45 |
| 138 | Glass | PEI | 2 | 0.1 to 3 | 5 to 30 |
| 139 | Glass | PEI | 3 | 0.1 to 5 | 5 to 85 |
| 140 | Glass | PEI | 3 | 0.1 to 5 | 5 to 45 |
| 141 | Glass | PEI | 3 | 0.1 to 5 | 5 to 30 |
| 142 | Glass | PEI | 3 | 0.1 to 3 | 5 to 85 |
| 143 | Glass | PEI | 3 | 0.1 to 3 | 5 to 45 |
| 144 | Glass | PEI | 3 | 0.1 to 3 | 5 to 30 |

In the embodiments comprising PEKK or PEI, the PEKK can be mixed with PEI and the PEI can be mixed with PEKK in the proportions defined hereinabove.

Advantageously, in the compositions of table I defined hereinabove in which two compression rollers are present in the fluidized bed, the roller $R_2$ is above the roller $R_1$ with respect to the bottom of the tank, in particular $H_2$-$H_1$ is from 1 cm to 30 cm, preferably from 1 to 10 cm, in particular from 1 cm to 3 cm, particularly about 2 cm and the angle $\alpha_2$ is from 0 to 90°, in particular from 25 to 45° C., particularly from 25 to 35° and the roving passes over $R_2$.

These embodiments correspond to FIG. 5.

Advantageously, in the compositions of table I defined hereinabove in which two compression rollers are present in the fluidized bed, the roller $R_2$ is above the roller $R_1$ with respect to the bottom of the tank, in particular $H_2$-$H_1$ is from 1 cm to 30 cm, particularly about 2 cm and the angle $\alpha_2$ is from 90 to 180°, in particular from 115 to 135° C., particularly from 115 to 125°, and the roving passes below $R_2$.

Advantageously, the different fibrous materials obtained with the embodiments by pre-impregnation in a fluidized bed of table I next undergo a heating step directly after the pre-impregnation step with an IR heating system with one, two or three rollers as described in table II.

TABLE II

| Embodiment no. | Fluidized bed embodiment | Number of compression rollers | Angle $\alpha'_1$ (°) | Angle $\alpha'_2$ (°) | Angle $\alpha'_3$ (°) |
|---|---|---|---|---|---|
| 145 | 1 to 144 | 1 | 0.1-89 | — | — |
| 146 | 1 to 144 | 1 | 5-75 | — | — |
| 147 | 1 to 144 | 1 | 10-45 | — | — |
| 148 | 1 to 144 | 2 | 0.1-89 | 0-180 | — |
| 149 | 1 to 144 | 2 | 0.1-89 | 5-75 | — |
| 150 | 1 to 144 | 2 | 0.1-89 | 10-45 | — |
| 151 | 1 to 144 | 2 | 5-75 | 0-180 | — |
| 152 | 1 to 144 | 2 | 5-75 | 5-75 | — |
| 153 | 1 to 144 | 2 | 5-75 | 10-45 | — |
| 154 | 1 to 144 | 2 | 10-45 | 0-180 | — |
| 155 | 1 to 144 | 2 | 10-45 | 5-75 | — |
| 156 | 1 to 144 | 2 | 10-45 | 10-45 | — |
| 157 | 1 to 144 | 3 | 0.1-89 | 0-180 | 0-180 |
| 158 | 1 to 144 | 3 | 0.1-89 | 0-180 | 5-75 |
| 159 | 1 to 144 | 3 | 0.1-89 | 0-180 | 10-45 |
| 160 | 1 to 144 | 3 | 5-75 | 0-180 | 0-180 |
| 161 | 1 to 144 | 3 | 5-75 | 0-180 | 5-75 |
| 162 | 1 to 144 | 3 | 5-75 | 0-180 | 10-45 |
| 163 | 1 to 144 | 3 | 10-45 | 0-180 | 0-180 |
| 164 | 1 to 144 | 3 | 10-45 | 0-180 | 5-75 |
| 165 | 1 to 144 | 3 | 10-45 | 0-180 | 10-45 |
| 166 | 1 to 144 | 3 | 0.1-89 | 5-75 | 0-180 |
| 167 | 1 to 144 | 3 | 0.1-89 | 5-75 | 5-75 |
| 168 | 1 to 144 | 3 | 0.1-89 | 5-75 | 10-45 |
| 169 | 1 to 144 | 3 | 5-75 | 5-75 | 0-180 |
| 170 | 1 to 144 | 3 | 5-75 | 5-75 | 5-75 |
| 171 | 1 to 144 | 3 | 5-75 | 5-75 | 10-45 |
| 172 | 1 to 144 | 3 | 10-45 | 5-75 | 0-180 |
| 173 | 1 to 144 | 3 | 10-45 | 5-75 | 5-75 |
| 174 | 1 to 144 | 3 | 10-45 | 5-75 | 10-45 |
| 175 | 1 to 144 | 3 | 0.1-89 | 10-45 | 0-180 |
| 176 | 1 to 144 | 3 | 0.1-89 | 10-45 | 5-75 |
| 177 | 1 to 144 | 3 | 0.1-89 | 10-45 | 10-45 |
| 178 | 1 to 144 | 3 | 5-75 | 10-45 | 0-180 |
| 179 | 1 to 144 | 3 | 5-75 | 10-45 | 5-75 |
| 180 | 1 to 144 | 3 | 5-75 | 10-45 | 10-45 |
| 181 | 1 to 144 | 3 | 10-45 | 10-45 | 0-180 |
| 182 | 1 to 144 | 3 | 10-45 | 10-45 | 5-75 |
| 183 | 1 to 144 | 3 | 10-45 | 10-45 | 10-45 |

Optionally, a second heating step with an IR heating system with one or two rollers is done according to table III.

TABLE III

| Embodiment no. | Fluidized bed embodiment directly followed by the heating step | Number of compression rollers | Angle $\alpha'_1$ (°) | Angle $\alpha'_2$ (°) |
|---|---|---|---|---|
| 184 | 145 to 183 | 1 | 0.1-89 | — |
| 185 | 145 to 183 | 1 | 5-75 | — |
| 186 | 145 to 183 | 1 | 10-45 | — |
| 187 | 145 to 183 | 2 | 0.1-89 | 0-180 |
| 188 | 145 to 183 | 2 | 0.1-89 | 5-75 |
| 189 | 145 to 183 | 2 | 0.1-89 | 10-45 |
| 190 | 145 to 183 | 2 | 5-75 | 0-180 |
| 191 | 145 to 183 | 2 | 5-75 | 5-75 |
| 192 | 145 to 183 | 2 | 5-75 | 10-45 |
| 193 | 145 to 183 | 2 | 10-45 | 0-180 |
| 194 | 145 to 183 | 2 | 10-45 | 5-75 |
| 195 | 145 to 183 | 2 | 10-45 | 10-45 |

Spraying of the Powder by One (or More) Nozzle(s) or One (or More) Gun(s) by Dry Route in a Tank Combined with One or Two Heating Steps Advantageously, the fibrous material is selected from carbon fiber and glass fiber.

Advantageously, the thermoplastic polymer used to impregnate the carbon fiber is selected from a polyamide, in particular an aliphatic polyamide such as PA 11, PA 12, PA 11/1010 or PA 12/1010, or a semi-aromatic polyamide, in particular PA MXD6 and PA MXD10, PA 11/10T, PA 11/6T/10T, PA MXDT/10T or PA MPMDT/10T, PA BACT/10T, PA BACT/6T, PA BACT/10T/6T, PEEK, PEKK and PEI or a mixture thereof.

Advantageously, the thermoplastic polymer used to impregnate the glass fiber is selected from a polyamide, in particular an aliphatic polyamide such as PA 11, PA 12, PA 11/1010 or PA 12/1010, or a semi-aromatic polyamide, in particular PA MXD6 and PA MXD10, PA 11/10T, PA 11/6T/10T, PA MXDT/10T or PA MPMDT/10T, PA BACT/10T, PA BACT/6T, PA BACT/10T/6T, PEEK, PEKK and PEI or a mixture thereof.

The following table IV shows advantageous embodiments according to the inventive method in which the pre-impregnation step is done by spraying said powder by one (or several) nozzle(s) or one (or several) gun(s) by dry route in a tank comprising, for a carbon fiber or glass fiber roving with one or more non-ribbed cylindrical compression roller(s):

TABLE IV

| Embodiment no. | Fibrous material (fiber type) | Polymer | Number of compression rollers | Spraying flow rate (g/min) | Angle $\alpha''_1$ (°) |
|---|---|---|---|---|---|
| 196 | Carbon | Polyamide | 1 | 10 to 400 | 5 to 85 |
| 197 | Carbon | Polyamide | 1 | 10 to 400 | 5 to 45 |
| 198 | Carbon | Polyamide | 1 | 10 to 400 | 5 to 30 |
| 199 | Carbon | Polyamide | 1 | 25 to 150 | 5 to 85 |
| 200 | Carbon | Polyamide | 1 | 25 to 150 | 5 to 45 |
| 201 | Carbon | Polyamide | 1 | 25 to 150 | 5 to 30 |
| 202 | Carbon | Polyamide | 2 | 10 to 400 | 5 to 85 |
| 203 | Carbon | Polyamide | 2 | 10 to 400 | 5 to 45 |
| 204 | Carbon | Polyamide | 2 | 10 to 400 | 5 to 30 |
| 205 | Carbon | Polyamide | 2 | 25 to 150 | 5 to 85 |
| 206 | Carbon | Polyamide | 2 | 25 to 150 | 5 to 45 |
| 207 | Carbon | Polyamide | 2 | 25 to 150 | 5 to 30 |
| 208 | Carbon | Polyamide | 3 | 10 to 400 | 5 to 85 |
| 209 | Carbon | Polyamide | 3 | 10 to 400 | 5 to 45 |
| 201 | Carbon | Polyamide | 3 | 10 to 400 | 5 to 30 |
| 211 | Carbon | Polyamide | 3 | 25 to 150 | 5 to 85 |
| 212 | Carbon | Polyamide | 3 | 25 to 150 | 5 to 45 |
| 213 | Carbon | Polyamide | 3 | 25 to 150 | 5 to 30 |
| 214 | Carbon | PEKK | 1 | 10 to 400 | 5 to 85 |
| 215 | Carbon | PEKK | 1 | 10 to 400 | 5 to 45 |
| 216 | Carbon | PEKK | 1 | 10 to 400 | 5 to 30 |
| 217 | Carbon | PEKK | 1 | 25 to 150 | 5 to 85 |
| 218 | Carbon | PEKK | 1 | 25 to 150 | 5 to 45 |
| 219 | Carbon | PEKK | 1 | 25 to 150 | 5 to 30 |
| 220 | Carbon | PEKK | 2 | 10 to 400 | 5 to 85 |
| 221 | Carbon | PEKK | 2 | 10 to 400 | 5 to 45 |
| 222 | Carbon | PEKK | 2 | 10 to 400 | 5 to 30 |
| 223 | Carbon | PEKK | 2 | 25 to 150 | 5 to 85 |
| 224 | Carbon | PEKK | 2 | 25 to 150 | 5 to 45 |
| 225 | Carbon | PEKK | 2 | 25 to 150 | 5 to 30 |
| 226 | Carbon | PEKK | 3 | 10 to 400 | 5 to 85 |
| 227 | Carbon | PEKK | 3 | 10 to 400 | 5 to 45 |
| 228 | Carbon | PEKK | 3 | 10 to 400 | 5 to 30 |
| 229 | Carbon | PEKK | 3 | 25 to 150 | 5 to 85 |
| 230 | Carbon | PEKK | 3 | 25 to 150 | 5 to 45 |
| 231 | Carbon | PEKK | 3 | 25 to 150 | 5 to 30 |
| 232 | Carbon | PEI | 1 | 10 to 400 | 5 to 85 |
| 233 | Carbon | PEI | 1 | 10 to 400 | 5 to 45 |
| 234 | Carbon | PEI | 1 | 10 to 400 | 5 to 30 |
| 235 | Carbon | PEI | 1 | 25 to 150 | 5 to 85 |

TABLE IV-continued

| Embodiment no. | Fibrous material (fiber type) | Polymer | Number of compression rollers | Spraying flow rate (g/min) | Angle $\alpha''_1$ (°) |
|---|---|---|---|---|---|
| 236 | Carbon | PEI | 1 | 25 to 150 | 5 to 45 |
| 237 | Carbon | PEI | 1 | 25 to 150 | 5 to 30 |
| 238 | Carbon | PEI | 2 | 10 to 400 | 5 to 85 |
| 239 | Carbon | PEI | 2 | 10 to 400 | 5 to 45 |
| 240 | Carbon | PEI | 2 | 10 to 400 | 5 to 30 |
| 241 | Carbon | PEI | 2 | 25 to 150 | 5 to 85 |
| 242 | Carbon | PEI | 2 | 25 to 150 | 5 to 45 |
| 243 | Carbon | PEI | 2 | 25 to 150 | 5 to 30 |
| 244 | Carbon | PEI | 3 | 10 to 400 | 5 to 85 |
| 245 | Carbon | PEI | 3 | 10 to 400 | 5 to 45 |
| 246 | Carbon | PEI | 3 | 10 to 400 | 5 to 30 |
| 247 | Carbon | PEI | 3 | 25 to 150 | 5 to 85 |
| 248 | Carbon | PEI | 3 | 25 to 150 | 5 to 45 |
| 249 | Carbon | PEI | 3 | 25 to 150 | 5 to 30 |
| 250 | Carbon | PEI | 1 | 10 to 400 | 5 to 85 |
| 251 | Carbon | PEI | 1 | 10 to 400 | 5 to 45 |
| 252 | Carbon | PEI | 1 | 10 to 400 | 5 to 30 |
| 253 | Carbon | PEI | 1 | 25 to 150 | 5 to 85 |
| 254 | Carbon | PEI | 1 | 25 to 150 | 5 to 45 |
| 255 | Carbon | PEI | 1 | 25 to 150 | 5 to 30 |
| 256 | Carbon | PEI | 2 | 10 to 400 | 5 to 85 |
| 257 | Carbon | PEI | 2 | 10 to 400 | 5 to 45 |
| 258 | Carbon | PEI | 2 | 10 to 400 | 5 to 30 |
| 259 | Carbon | PEI | 2 | 25 to 150 | 5 to 85 |
| 260 | Carbon | PEI | 2 | 25 to 150 | 5 to 45 |
| 261 | Carbon | PEI | 2 | 25 to 150 | 5 to 30 |
| 262 | Carbon | PEI | 3 | 10 to 400 | 5 to 85 |
| 263 | Carbon | PEI | 3 | 10 to 400 | 5 to 45 |
| 264 | Carbon | PEI | 3 | 10 to 400 | 5 to 30 |
| 265 | Carbon | PEI | 3 | 25 to 150 | 5 to 85 |
| 266 | Carbon | PEI | 3 | 25 to 150 | 5 to 45 |
| 267 | Carbon | PEI | 3 | 25 to 150 | 5 to 30 |
| 268 | Glass | Polyamide | 1 | 10 to 400 | 5 to 85 |
| 269 | Glass | Polyamide | 1 | 10 to 400 | 5 to 45 |
| 270 | Glass | Polyamide | 1 | 10 to 400 | 5 to 30 |
| 271 | Glass | Polyamide | 1 | 25 to 150 | 5 to 85 |
| 272 | Glass | Polyamide | 1 | 25 to 150 | 5 to 45 |
| 273 | Glass | Polyamide | 1 | 25 to 150 | 5 to 30 |
| 274 | Glass | Polyamide | 2 | 10 to 400 | 5 to 85 |
| 275 | Glass | Polyamide | 2 | 10 to 400 | 5 to 45 |
| 276 | Glass | Polyamide | 2 | 10 to 400 | 5 to 30 |
| 277 | Glass | Polyamide | 2 | 25 to 150 | 5 to 85 |
| 278 | Glass | Polyamide | 2 | 25 to 150 | 5 to 45 |
| 279 | Glass | Polyamide | 2 | 25 to 150 | 5 to 30 |
| 280 | Glass | Polyamide | 3 | 10 to 400 | 5 to 85 |
| 281 | Glass | Polyamide | 3 | 10 to 400 | 5 to 45 |
| 282 | Glass | Polyamide | 3 | 10 to 400 | 5 to 30 |
| 283 | Glass | Polyamide | 3 | 25 to 150 | 5 to 85 |
| 284 | Glass | Polyamide | 3 | 25 to 150 | 5 to 45 |
| 285 | Glass | Polyamide | 3 | 25 to 150 | 5 to 30 |
| 286 | Glass | PEKK | 1 | 10 to 400 | 5 to 85 |
| 287 | Glass | PEKK | 1 | 10 to 400 | 5 to 45 |
| 288 | Glass | PEKK | 1 | 10 to 400 | 5 to 30 |
| 289 | Glass | PEKK | 1 | 25 to 150 | 5 to 85 |
| 290 | Glass | PEKK | 1 | 25 to 150 | 5 to 45 |
| 291 | Glass | PEKK | 1 | 25 to 150 | 5 to 30 |
| 292 | Glass | PEKK | 2 | 10 to 400 | 5 to 85 |
| 293 | Glass | PEKK | 2 | 10 to 400 | 5 to 45 |
| 294 | Glass | PEKK | 2 | 10 to 400 | 5 to 30 |
| 295 | Glass | PEKK | 2 | 25 to 150 | 5 to 85 |
| 296 | Glass | PEKK | 2 | 25 to 150 | 5 to 45 |
| 297 | Glass | PEKK | 2 | 25 to 150 | 5 to 30 |
| 298 | Glass | PEKK | 3 | 10 to 400 | 5 to 85 |
| 299 | Glass | PEKK | 3 | 10 to 400 | 5 to 45 |
| 300 | Glass | PEKK | 3 | 10 to 400 | 5 to 30 |
| 301 | Glass | PEKK | 3 | 25 to 150 | 5 to 85 |
| 302 | Glass | PEKK | 3 | 25 to 150 | 5 to 45 |
| 303 | Glass | PEKK | 3 | 25 to 150 | 5 to 30 |
| 304 | Glass | PEI | 1 | 10 to 400 | 5 to 85 |
| 305 | Glass | PEI | 1 | 10 to 400 | 5 to 45 |
| 306 | Glass | PEI | 1 | 10 to 400 | 5 to 30 |
| 307 | Glass | PEI | 1 | 25 to 150 | 5 to 85 |
| 308 | Glass | PEI | 1 | 25 to 150 | 5 to 45 |
| 309 | Glass | PEI | 1 | 25 to 150 | 5 to 30 |
| 310 | Glass | PEI | 2 | 10 to 400 | 5 to 85 |
| 311 | Glass | PEI | 2 | 10 to 400 | 5 to 45 |
| 312 | Glass | PEI | 2 | 10 to 400 | 5 to 30 |
| 313 | Glass | PEI | 2 | 25 to 150 | 5 to 85 |
| 314 | Glass | PEI | 2 | 25 to 150 | 5 to 45 |
| 315 | Glass | PEI | 2 | 25 to 150 | 5 to 30 |
| 316 | Glass | PEI | 3 | 10 to 400 | 5 to 85 |
| 317 | Glass | PEI | 3 | 10 to 400 | 5 to 45 |
| 318 | Glass | PEI | 3 | 10 to 400 | 5 to 30 |
| 319 | Glass | PEI | 3 | 25 to 150 | 5 to 85 |
| 320 | Glass | PEI | 3 | 25 to 150 | 5 to 45 |
| 321 | Glass | PEI | 3 | 25 to 150 | 5 to 30 |
| 322 | Glass | PEI | 1 | 10 to 400 | 5 to 85 |
| 323 | Glass | PEI | 1 | 10 to 400 | 5 to 45 |
| 324 | Glass | PEI | 1 | 10 to 400 | 5 to 30 |
| 325 | Glass | PEI | 1 | 25 to 150 | 5 to 85 |
| 326 | Glass | PEI | 1 | 25 to 150 | 5 to 45 |
| 327 | Glass | PEI | 1 | 25 to 150 | 5 to 30 |
| 328 | Glass | PEI | 2 | 10 to 400 | 5 to 85 |
| 329 | Glass | PEI | 2 | 10 to 400 | 5 to 45 |
| 330 | Glass | PEI | 2 | 10 to 400 | 5 to 30 |
| 331 | Glass | PEI | 2 | 25 to 150 | 5 to 85 |
| 332 | Glass | PEI | 2 | 25 to 150 | 5 to 45 |
| 333 | Glass | PEI | 2 | 25 to 150 | 5 to 30 |
| 334 | Glass | PEI | 3 | 10 to 400 | 5 to 85 |
| 335 | Glass | PEI | 3 | 10 to 400 | 5 to 45 |
| 336 | Glass | PEI | 3 | 10 to 400 | 5 to 30 |
| 337 | Glass | PEI | 3 | 25 to 150 | 5 to 85 |
| 338 | Glass | PEI | 3 | 25 to 150 | 5 to 45 |
| 339 | Glass | PEI | 3 | 25 to 150 | 5 to 30 |

In the embodiments comprising PEKK or PEI, the PEKK can be mixed with PEI and the PEI can be mixed with PEKK in the proportions defined hereinabove.

Advantageously, in the compositions of table IV defined hereinabove in which two compression rollers are present in the tank, the roller $R''_2$ is above the roller $R''_1$ with respect to the bottom of the tank, in particular $H_2$-$H_1$ is from 1 cm to 30 cm, preferably from 1 to 10 cm, in particular from 1 cm to 3 cm, particularly about 2 cm and the angle $\alpha''_2$ is from 0 to 90°, in particular from 25 to 45° C., particularly from 25 to 35° and the roving passes over $R''_2$.

These embodiments correspond to FIG. 13.

Advantageously, in the compositions of table IV defined hereinabove in which two compression rollers are present in the fluidized bed, the roller $R''_2$ is above the roller $R''_1$ with respect to the bottom of the tank, in particular $H_2$-$H_1$ is from 1 cm to 30 cm, particularly about 2 cm and the angle $\alpha''_2$ is from 90 to 180°, in particular from 115 to 135° C., particularly from 115 to 125°, and the roving passes below $R''_2$.

Advantageously, the different fibrous materials obtained with the embodiments by pre-impregnation by spraying said powder by one (or more) nozzle(s) or one (or more) gun(s) by dry route in a tank of table IV next undergo a heating step directly after the step for impregnation with an IR heating system with one, two or three rollers as described in table V.

TABLE V

| Embodiment no. | Spraying embodiment | Number of compression rollers | Angle $\alpha'_1$ (°) | Angle $\alpha'_2$ (°) | Angle $\alpha'_3$ (°) |
|---|---|---|---|---|---|
| 340 | 1 to 339 | 1 | 0.1-89 | — | — |
| 341 | 1 to 339 | 1 | 5-75 | — | — |
| 342 | 1 to 339 | 1 | 10-45 | — | — |
| 343 | 1 to 339 | 2 | 0.1-89 | 0-180 | — |
| 344 | 1 to 339 | 2 | 0.1-89 | 5-75 | — |
| 345 | 1 to 339 | 2 | 0.1-89 | 10-45 | — |
| 346 | 1 to 339 | 2 | 5-75 | 0-180 | — |

TABLE V-continued

| Embodiment no. | Spraying embodiment | Number of compression rollers | Angle $\alpha'_1$ (°) | Angle $\alpha'_2$ (°) | Angle $\alpha'_3$ (°) |
|---|---|---|---|---|---|
| 347 | 1 to 339 | 2 | 5-75 | 5-75 | — |
| 348 | 1 to 339 | 2 | 5-75 | 10-45 | — |
| 349 | 1 to 339 | 2 | 10-45 | 0-180 | — |
| 350 | 1 to 339 | 2 | 10-45 | 5-75 | — |
| 351 | 1 to 339 | 2 | 10-45 | 10-45 | — |
| 352 | 1 to 339 | 3 | 0.1-89 | 0-180 | 0-180 |
| 353 | 1 to 339 | 3 | 0.1-89 | 0-180 | 5-75 |
| 354 | 1 to 339 | 3 | 0.1-89 | 0-180 | 10-45 |
| 355 | 1 to 339 | 3 | 5-75 | 0-180 | 0-180 |
| 356 | 1 to 339 | 3 | 5-75 | 0-180 | 5-75 |
| 357 | 1 to 339 | 3 | 5-75 | 0-180 | 10-45 |
| 358 | 1 to 339 | 3 | 10-45 | 0-180 | 0-180 |
| 359 | 1 to 339 | 3 | 10-45 | 0-180 | 5-75 |
| 360 | 1 to 339 | 3 | 10-45 | 0-180 | 10-45 |
| 361 | 1 to 339 | 3 | 0.1-89 | 5-75 | 0-180 |
| 362 | 1 to 339 | 3 | 0.1-89 | 5-75 | 5-75 |
| 363 | 1 to 339 | 3 | 0.1-89 | 5-75 | 10-45 |
| 364 | 1 to 339 | 3 | 5-75 | 5-75 | 0-180 |
| 365 | 1 to 339 | 3 | 5-75 | 5-75 | 5-75 |
| 366 | 1 to 339 | 3 | 5-75 | 5-75 | 10-45 |
| 367 | 1 to 339 | 3 | 10-45 | 5-75 | 0-180 |
| 368 | 1 to 339 | 3 | 10-45 | 5-75 | 5-75 |
| 369 | 1 to 339 | 3 | 10-45 | 5-75 | 10-45 |
| 370 | 1 to 339 | 3 | 0.1-89 | 10-45 | 0-180 |
| 371 | 1 to 339 | 3 | 0.1-89 | 10-45 | 5-75 |
| 372 | 1 to 339 | 3 | 0.1-89 | 10-45 | 10-45 |
| 373 | 1 to 339 | 3 | 5-75 | 10-45 | 0-180 |
| 374 | 1 to 339 | 3 | 5-75 | 10-45 | 5-75 |
| 375 | 1 to 339 | 3 | 5-75 | 10-45 | 10-45 |
| 376 | 1 to 339 | 3 | 10-45 | 10-45 | 0-180 |
| 377 | 1 to 339 | 3 | 10-45 | 10-45 | 5-75 |
| 378 | 1 to 339 | 3 | 10-45 | 10-45 | 10-45 |

Optionally, a second heating step with an IR heating system with one or two rollers is done according to table VI.

TABLE VI

| Embodiment no. | Spraying embodiment followed directly by the heating step | Number of compression rollers | Angle $\alpha'_1$ (°) | Angle $\alpha'_2$ (°) |
|---|---|---|---|---|
| 379 | 340 to 378 | 1 | 0.1-89 | — |
| 380 | 340 to 378 | 1 | 5-75 | — |
| 381 | 340 to 378 | 1 | 10-45 | — |
| 382 | 340 to 378 | 2 | 0.1-89 | 0-180 |
| 383 | 340 to 378 | 2 | 0.1-89 | 5-75 |
| 384 | 340 to 378 | 2 | 0.1-89 | 10-45 |
| 385 | 340 to 378 | 2 | 5-75 | 0-180 |
| 386 | 340 to 378 | 2 | 5-75 | 5-75 |
| 387 | 340 to 378 | 2 | 5-75 | 10-45 |
| 388 | 340 to 378 | 2 | 10-45 | 0-180 |
| 389 | 340 to 378 | 2 | 10-45 | 5-75 |
| 390 | 340 to 378 | 2 | 10-45 | 10-45 |

The arrows at the fiber indicate the passage direction of the fiber.

Figure 4:
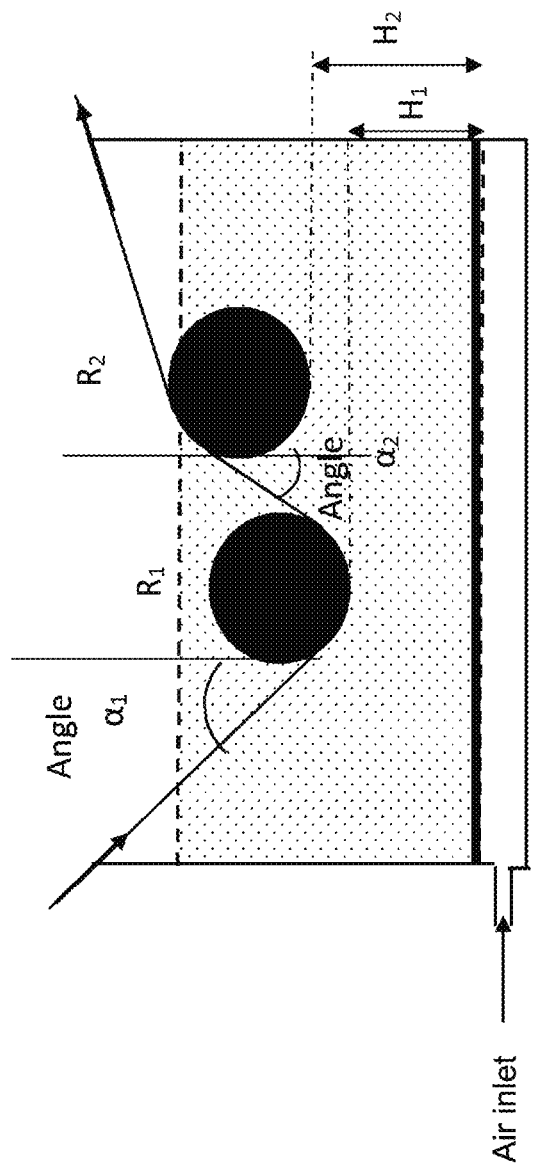

FIG. 4 shows, but is not limited to, an embodiment with two compression rollers $R_1$ and $R_2$, $R_1$ preceding $R_2$, with a tank (10) comprising a fluidized bed (12) in which the two cylindrical compression rollers are at different heights relative to the bottom of the tank ($R_2$ at a height $H_2$ above $R_1$ at a height $H_1$) are present and showing the angle $\alpha_1$ and $\alpha_2$.

The arrows at the fiber roving indicate the passage direction of the fiber.

Figure 5:
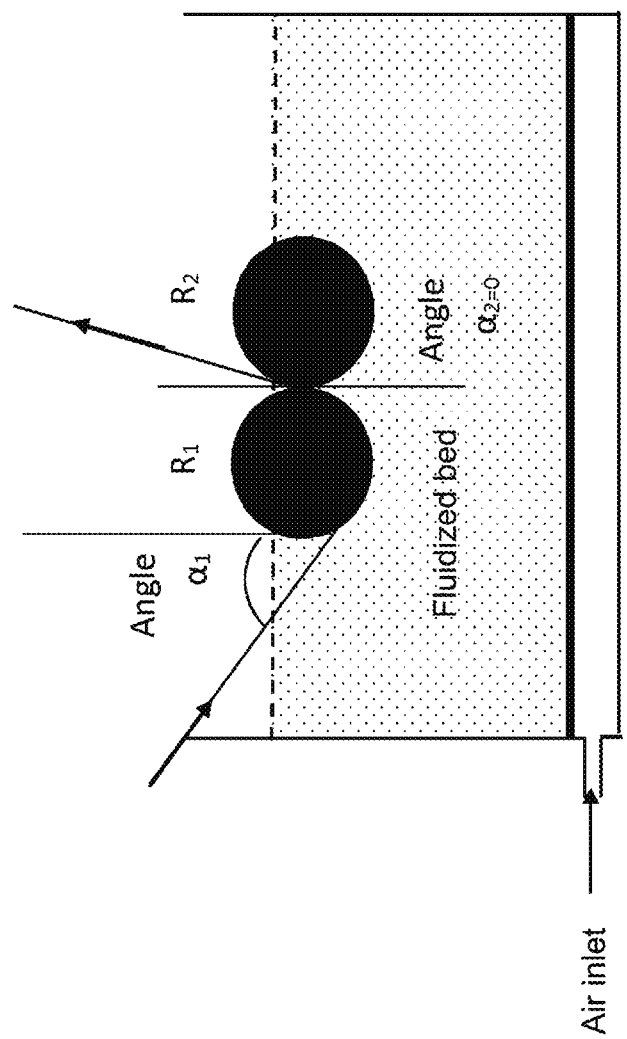

FIG. 5 shows an exemplary embodiment with the tank (10) comprising a fluidized bed (12) in which the two compression rollers $R_1$ and $R_2$ are cylindrical, at the same level relative to one another and side by side and showing the angle $\alpha_1$, and the angle $\alpha_2=0°$ and the roving passing between the 2 rollers.

Figure 6:
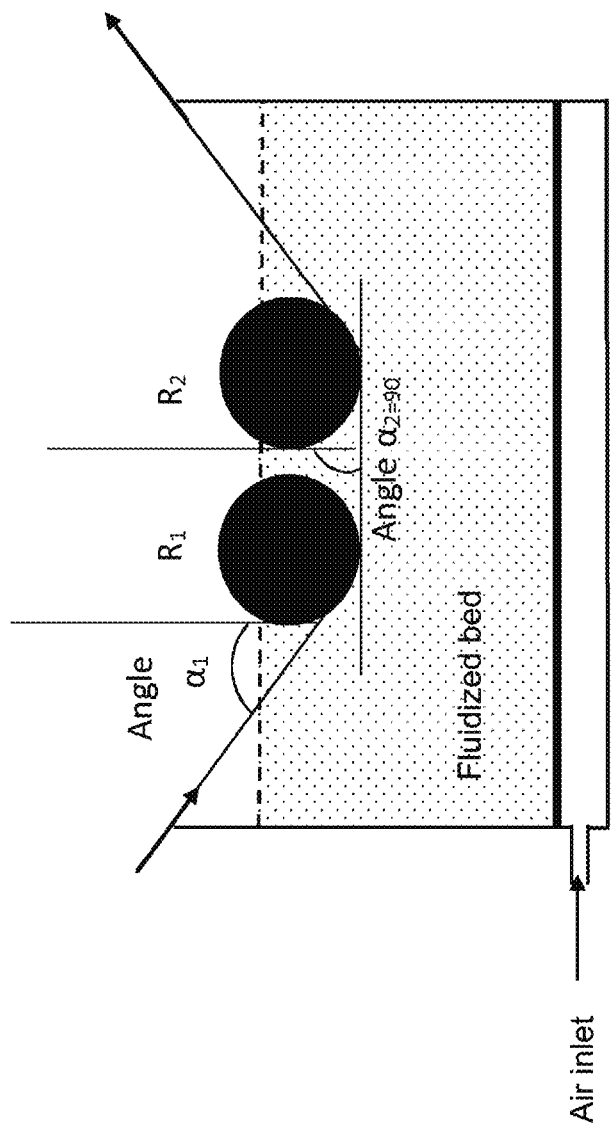

FIG. 6 shows an exemplary embodiment with the tank (10) comprising a fluidized bed (12) in which the two compression rollers $R_1$ and $R_2$ are cylindrical, at the same level relative to one another and side by side and showing the angle $\alpha_1$, and the angle $\alpha_2=90°$ and the roving passing below $R_2$.

Figure 7:
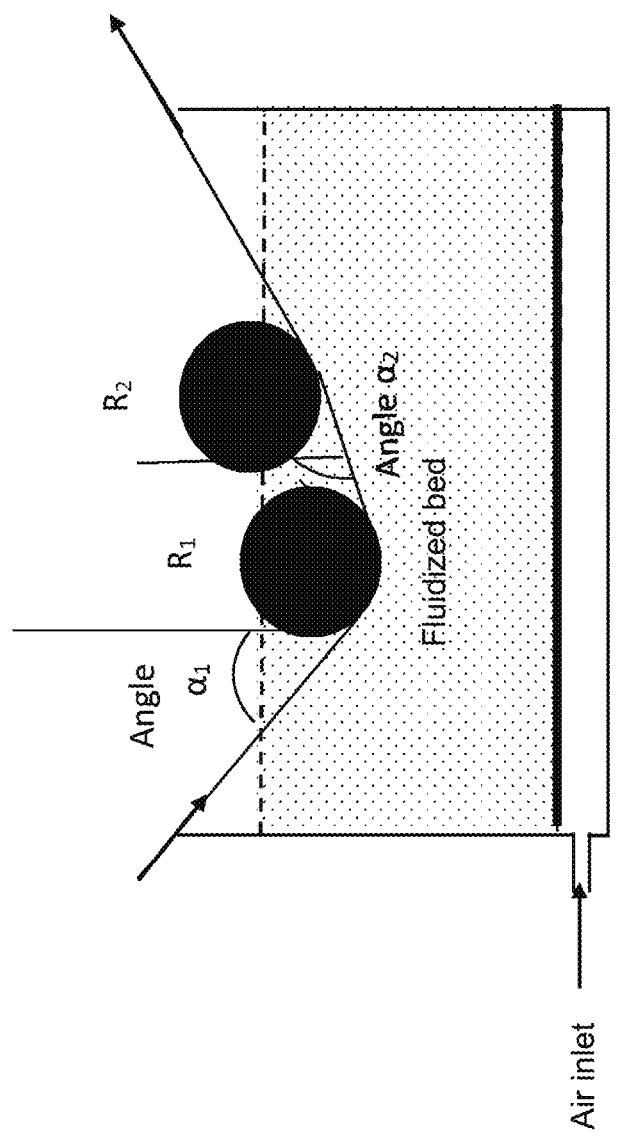

FIG. 7 shows an exemplary embodiment with the tank (20) comprising a fluidized bed (12) in which two compression rollers $R_1$ and $R_2$, $R_1$ preceding $R_2$, at different levels are present and showing the angle $\alpha_1$ and $\alpha_2$ and the roving passing below the roller R2.

Figure 8:
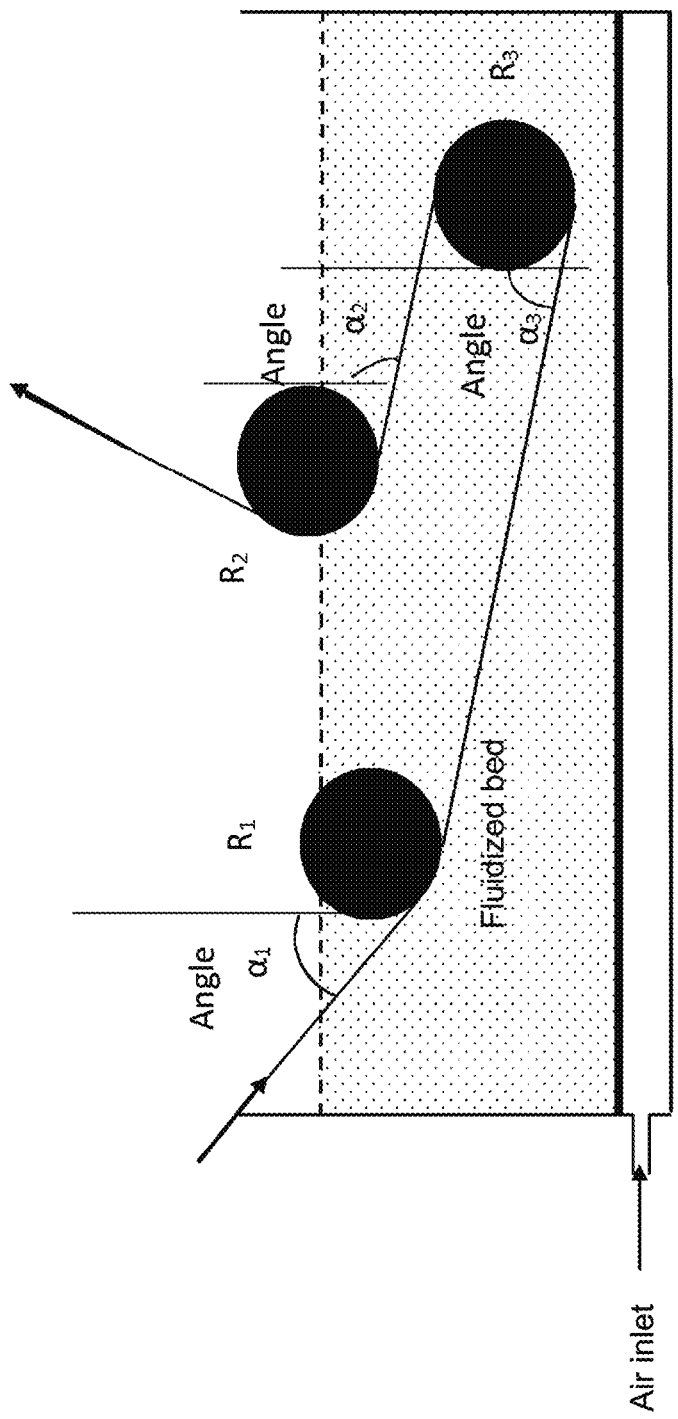

FIG. 8 shows an embodiment with a tank (10) comprising a fluidized bed (12) with two compression rollers $R_1$ and $R_2$, $R_1$ preceding $R_2$, and a compression roller $R_3$ and showing the angles $\alpha_1$, $\alpha_2$ and $\alpha_3$.

Figure 9:
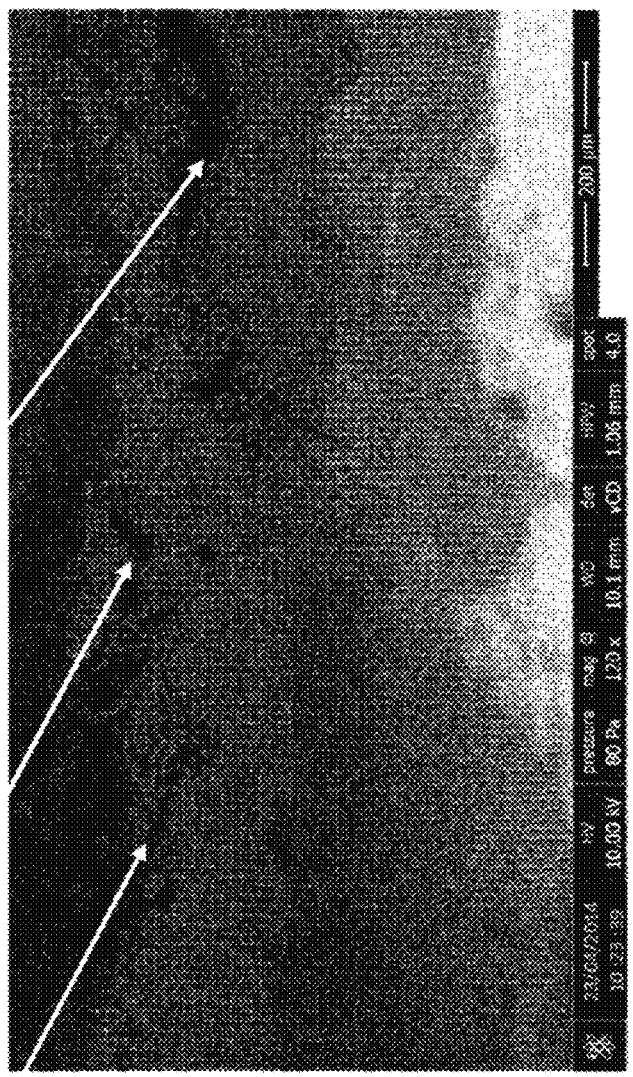

FIG. 9 shows a photo taken with scanning electron microscopy of a cross-sectional view of a ¼" Toray carbon fiber roving, 12K T700S M0E impregnated by a PA11/6T/10T D50=100 μm polyamide powder according to the method described in WO 2015/121583 (after calendaring).

The method according to WO 2015/121583 shows a lack of homogeneity in several locations of the impregnated roving diagrammed by the white arrows.

Figure 10:
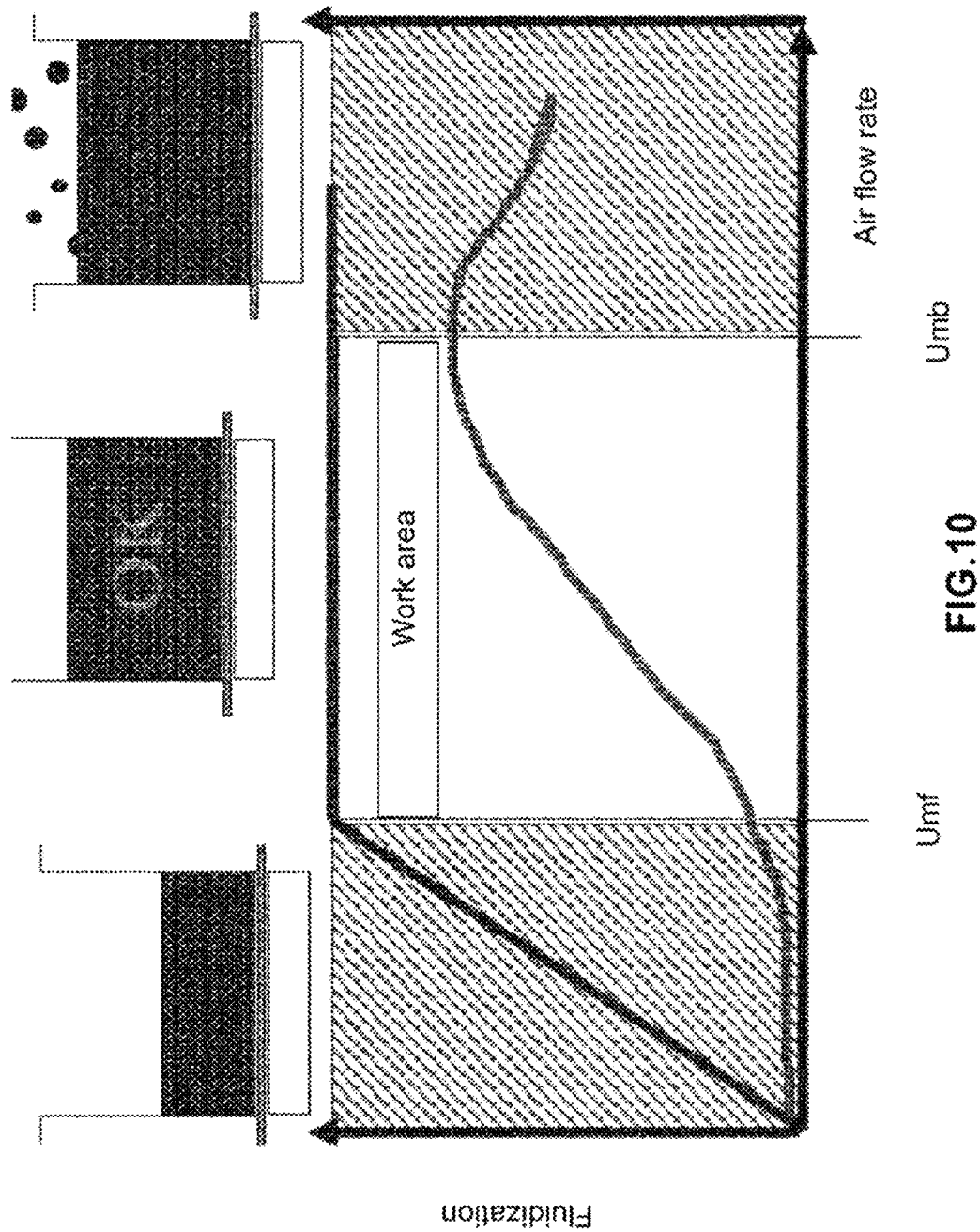

FIG. 10 shows the fluidization as a function of the air flow rate. The air flow rate applied to the fluidized bed must be between the minimum fluidization flow rate (Umf) and the minimum bubbling flow rate (Umf).

Figure 11:
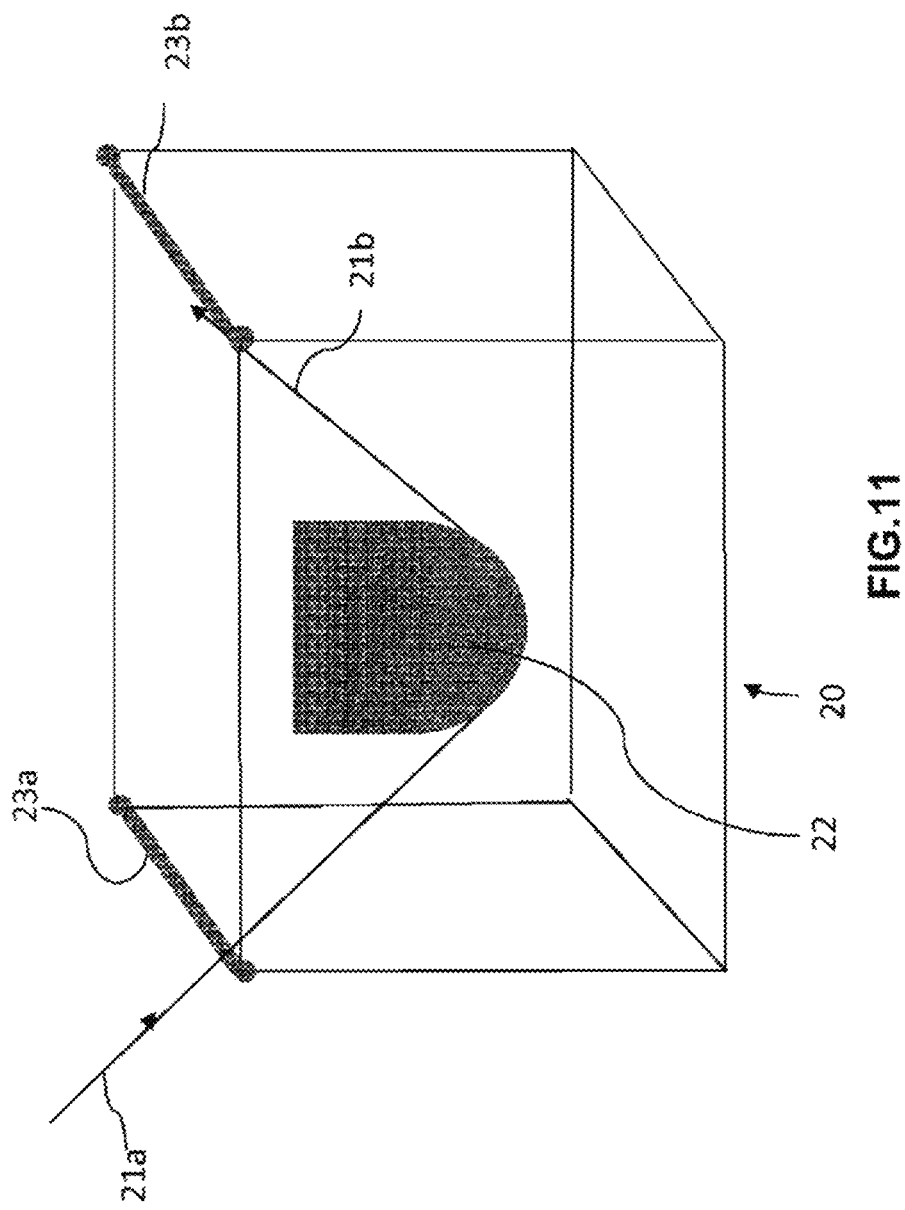

FIG. 11 describes a tank (20) with a supporting part, the height (22) of which is adjustable. The edge of the inlet of the tank is equipped with a rotating roller 23a over which the roving 21a passes and the edge of the tank outlet is equipped with a rotating roller 23b over which the roving 21b passes.

Figure 12:
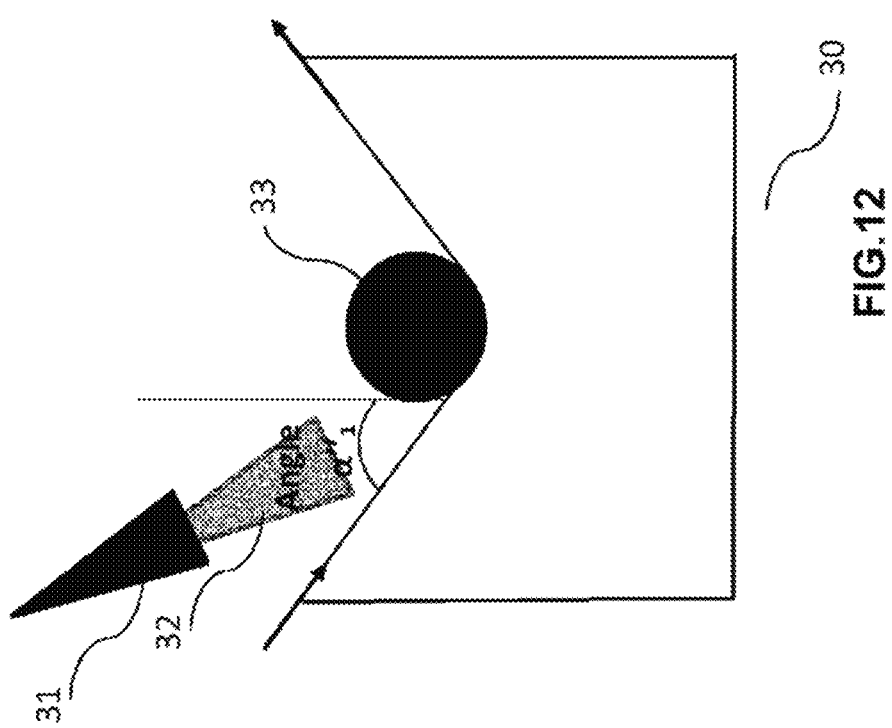

FIG. 12 shows an embodiment with a single compression roller, with a tank (30) comprising a spray gun (31) for powder (32) in which a single cylindrical compression roller (33) is present and showing the angle $\alpha''_1$.

The arrows at the fiber indicate the passage direction of the fiber.

Figure 13:
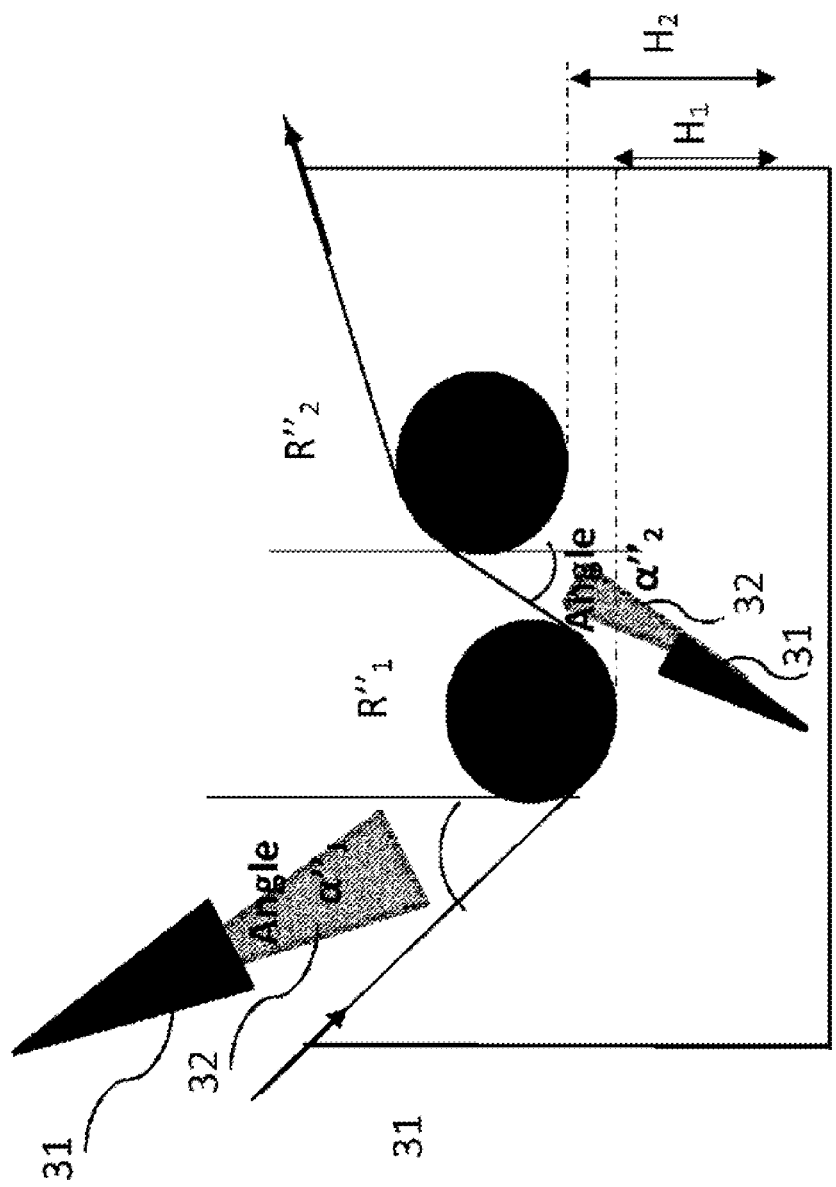

FIG. 13 shows, but is not limited to, an embodiment with two compression rollers $R''_1$ and $R''_2$, $R''_1$ preceding $R''_2$, with a tank (30) each comprising a spray gun (31) for spraying powder (32) and in which the two cylindrical compression rollers are at different heights relative to the bottom of the tank ($R''_2$ at a height $H_2$ above $R''_1$ at a height $H_1$) are present and showing the angle $\alpha''_1$ and $\alpha''_2$.

The arrows at the fiber roving indicate the passage direction of the fiber.

Figure 14:
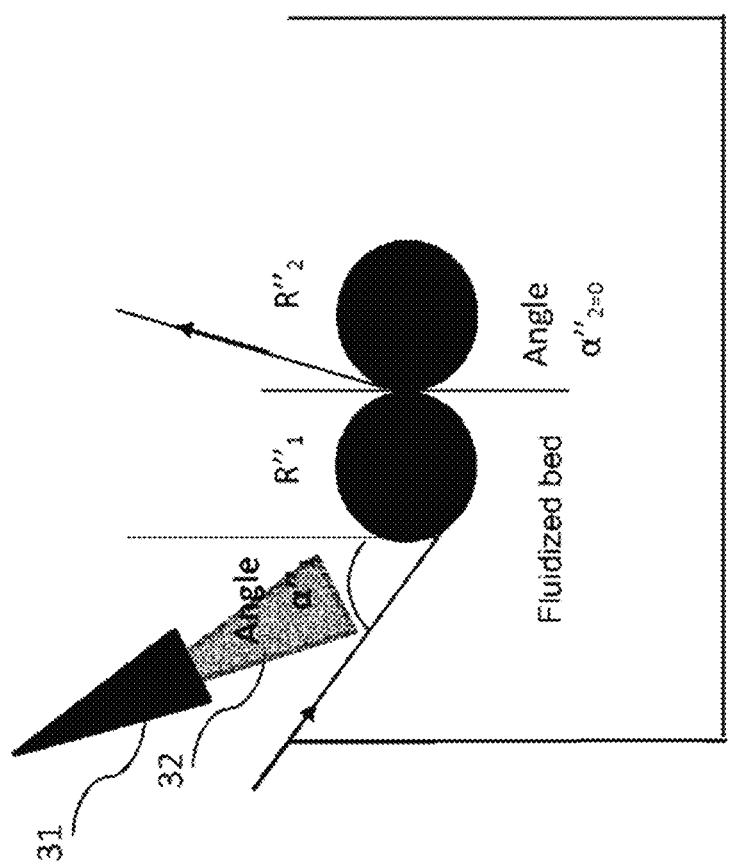

FIG. 14 shows an exemplary embodiment with the tank (30) comprising a spray gun (31) for spraying powder (32) in which the two compression rollers $R''_1$ and $R''_2$ are cylindrical, at the same level relative to one another and side by side and showing the angle $\alpha''_1$, and the angle $\alpha''_2=0°$ and the roving passing between the 2 rollers.

Figure 15:
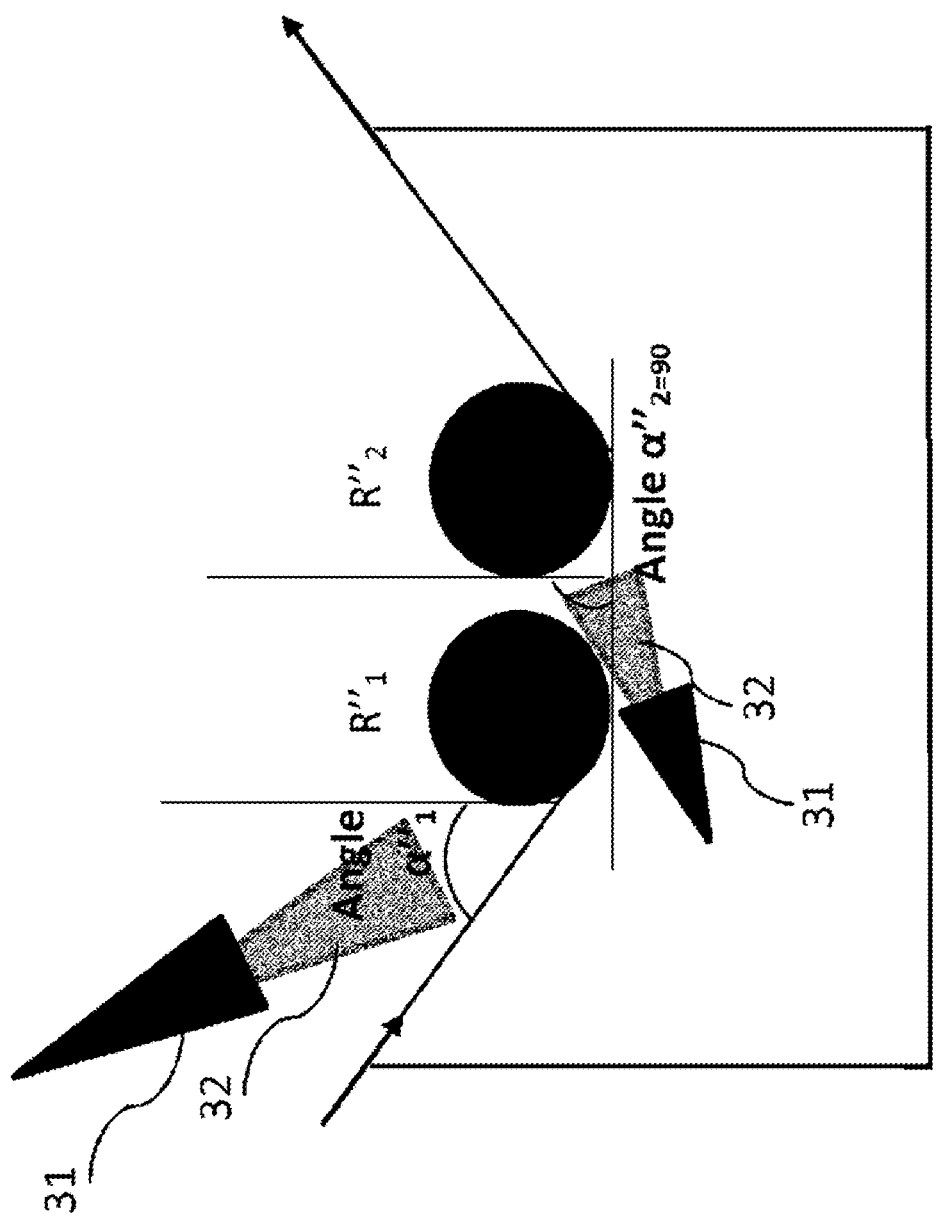

FIG. 15 shows an exemplary embodiment with the tank (30) each comprising a spray gun (31) for spraying powder (32) and in which the two compression rollers $R''_1$ and $R''_2$ are cylindrical, at the same level relative to one another and side by side and showing the angle $\alpha''_1$, and the angle $\alpha''_2=90°$ and the roving passing below $R''_2$.

Figure 16:
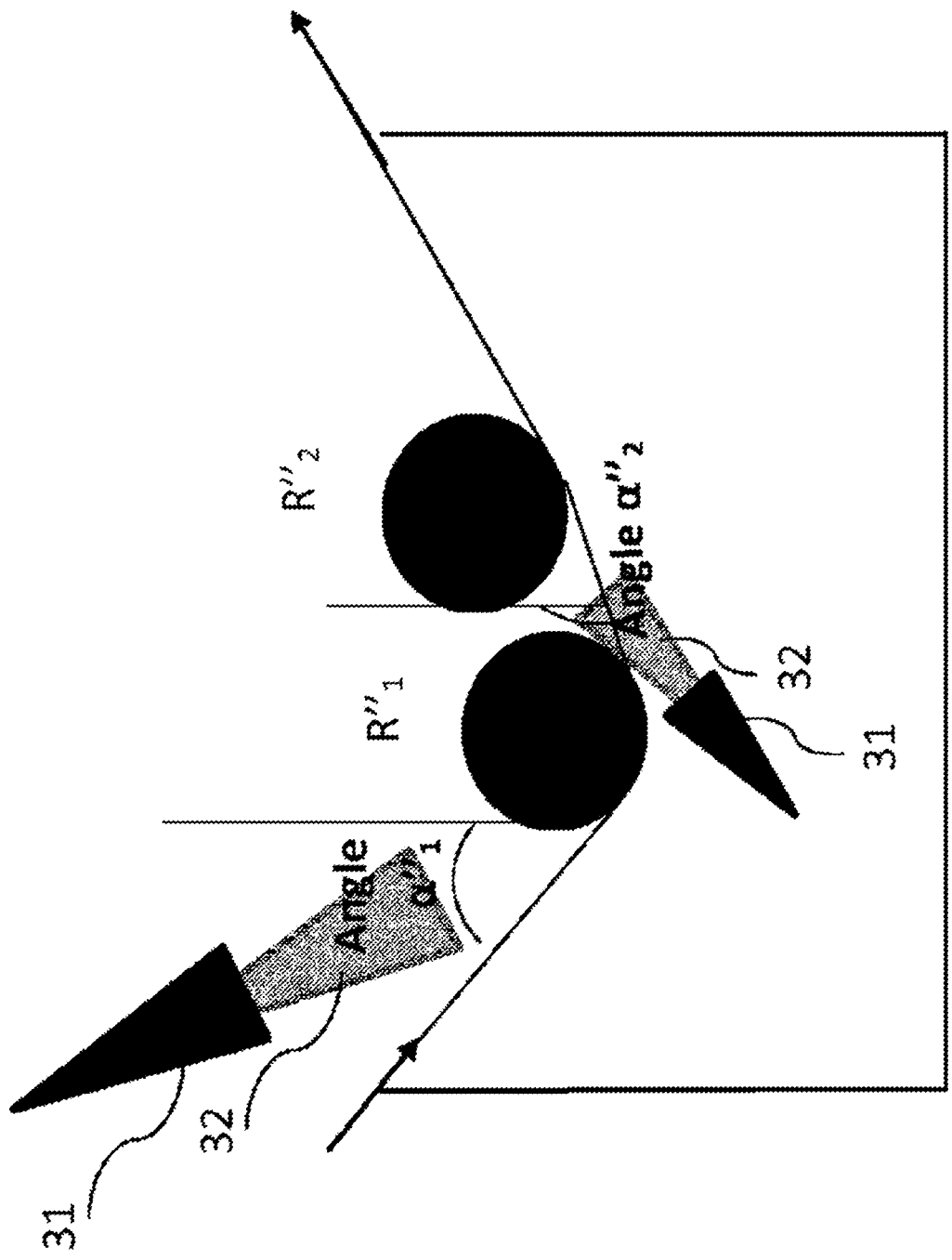

FIG. 16 shows an exemplary embodiment with a tank (30) each comprising a spray gun (31) for spraying powder (32) and in which two compression rollers $R''_1$ and $R''_2$, $R''_1$ preceding $R''_2$, at different levels are present and showing the angle $\alpha''_1$ and $\alpha''_2$ and the roving passing below the roller $''_2$.

Figure 17:
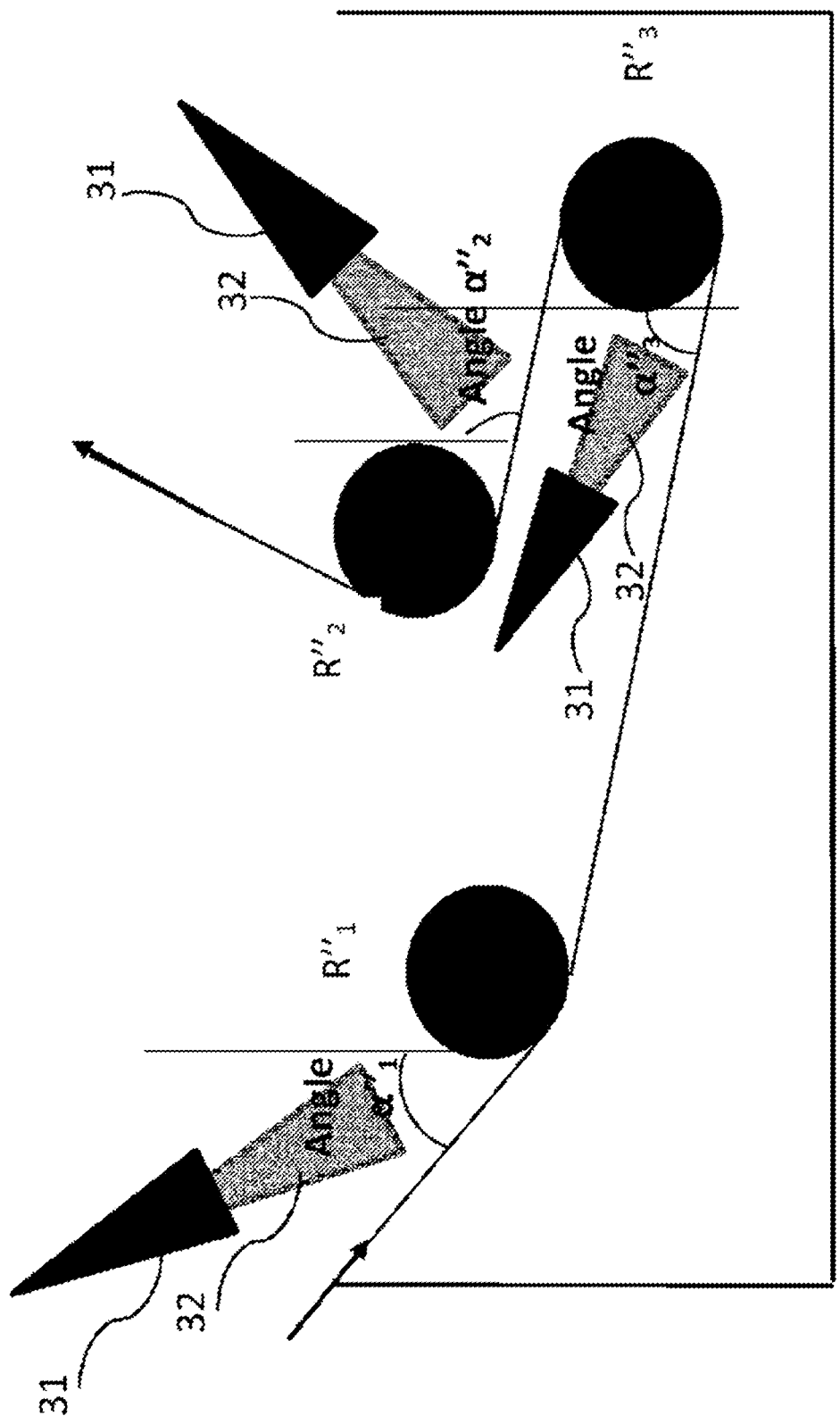

FIG. 17 shows an embodiment with a tank (30) with two compression rollers $R''_1$ and $R''_2$, $R''_1$ preceding $R''_2$, each comprising a spray gun (31) for spraying powder (32) and a compression roller $R''_3$ comprising a spray gun (31) for spraying powder (32) and showing the angles $\alpha''_1$, $\alpha''_2$ and $\alpha''_3$.

Figure 18:
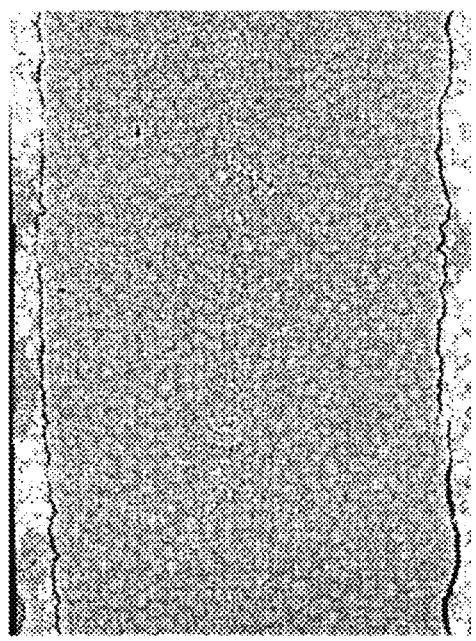

FIG. 18 shows a photo taken with scanning electron microscopy of a cross-sectional view of a ¼" Toray carbon fiber roving, 12K T700S 31E impregnated by a D50=51 μm PEKK powder according to the inventive method described in example 2.

The diameter of a fiber represents 7 μm.

Figure 19:
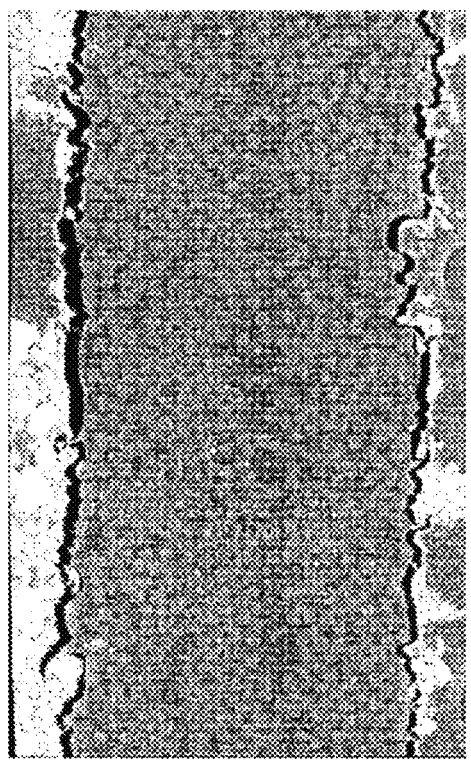

FIG. 19 shows a photo taken with scanning electron microscopy of a cross-sectional view of a ¼" Toray carbon fiber roving, 12K T700S 31E impregnated by a D50=115 μm PA MPMDT/10T polyamide powder according to the inventive method described in example 3.

The diameter of a fiber represents 7 μm.

The following examples provide a non-limiting illustration of the scope of the invention.

Example 1 (Comparison)

A 12K carbon fiber roving was impregnated with PA 11/6T/10T, as described in WO 2015/121583. D50=100 μM.
Results:
The results are shown in FIG. 9 and show a lack of homogeneity in several locations of the impregnated roving diagrammed by the white arrows.

Example 2: General Procedure Comprising a Step for the Pre-Impregnation of a Fibrous Material (Carbon Fiber) with a PEKK Powder in a Tank Comprising a Fluidized Bed Provided with a Single Roller and a Step for Infrared Heating The following procedure was carried out:
Pre-Impregnation Step
A cylindrical compression roller $R_1$ in the tank (L=500 mm, I=500 mm, H=600 mm), diameter 25 mm.
Residence time of 0.3 s in the powder
Angle $\alpha_1$ of 25°
Expansion about 100% (or a width multiplied by 2) for a carbon fiber roving of Toray ¼" carbon, 12K T700S 31E
D50=51 μm, (D10=21 μm, D90=97 μm) for the PEKK powder.
edge of the tank equipped with a stationary roller.
The fibrous material (¼" carbon fiber roving) was pre-impregnated with a polymer (PEKK with particle size defined hereinabove) according to this procedure.

Figure 1:
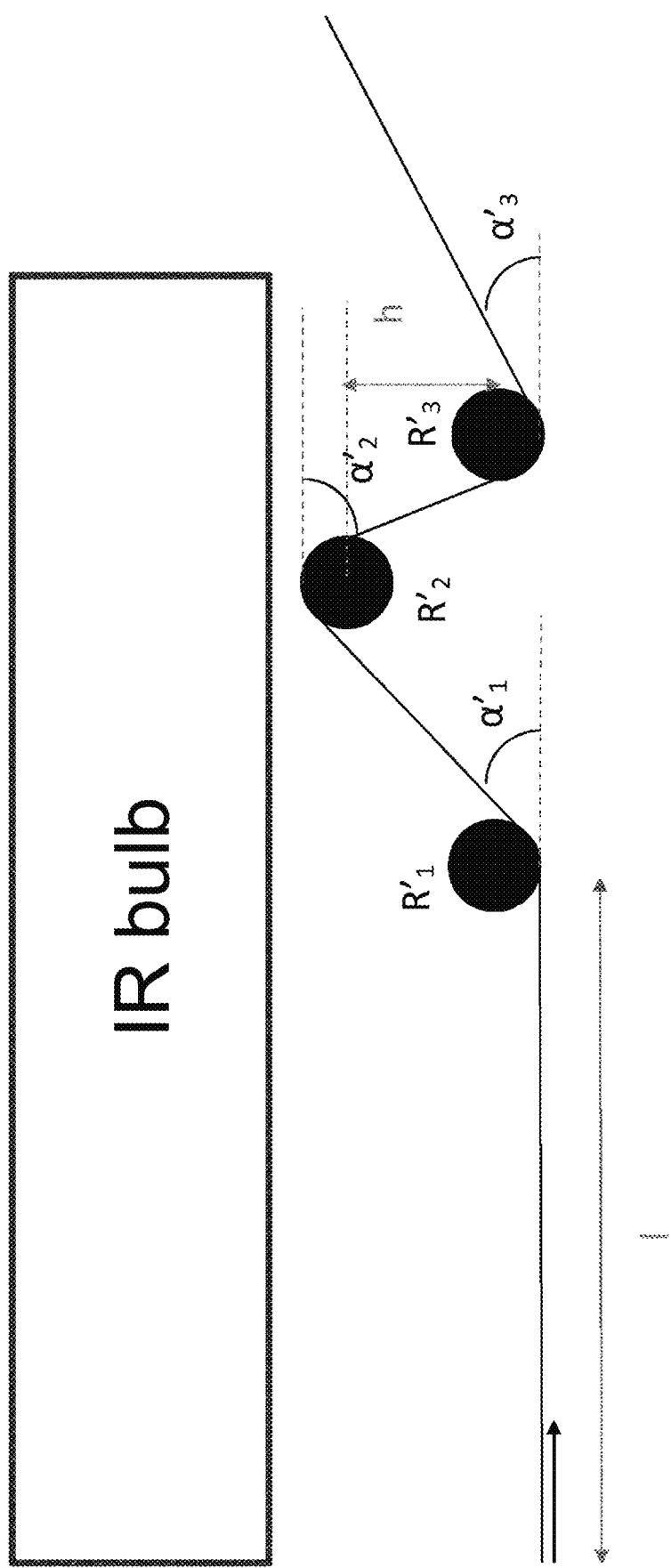
FIG. 1 shows a diagram of a heating system according to the invention with three rollers.
Figure 2:
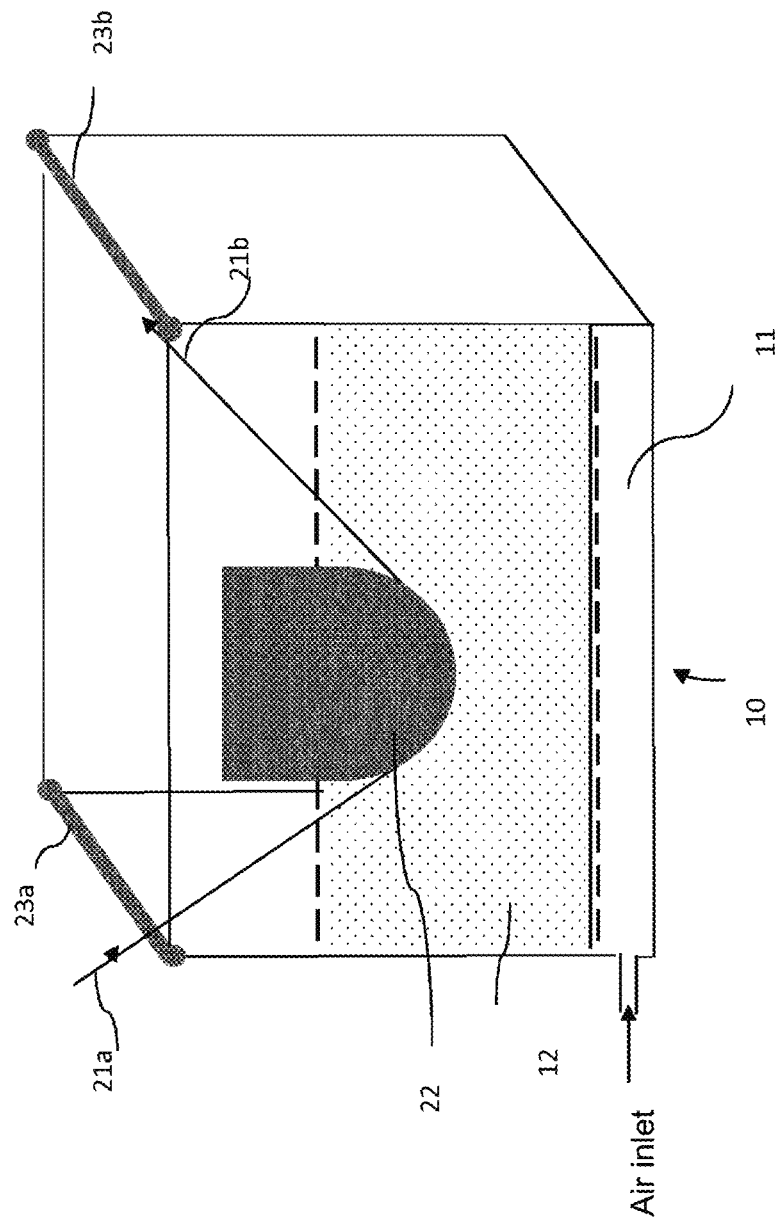
FIG. 2 describes a tank (10) comprising a fluidized bed (12) with a supporting part, the height (22) of which is adjustable. The edge of the inlet of the tank is equipped with a rotating roller 23a over which the roving 21a passes and the edge of the tank outlet is equipped with a rotating roller 23b over which the roving 21b passes.
Figure 3:
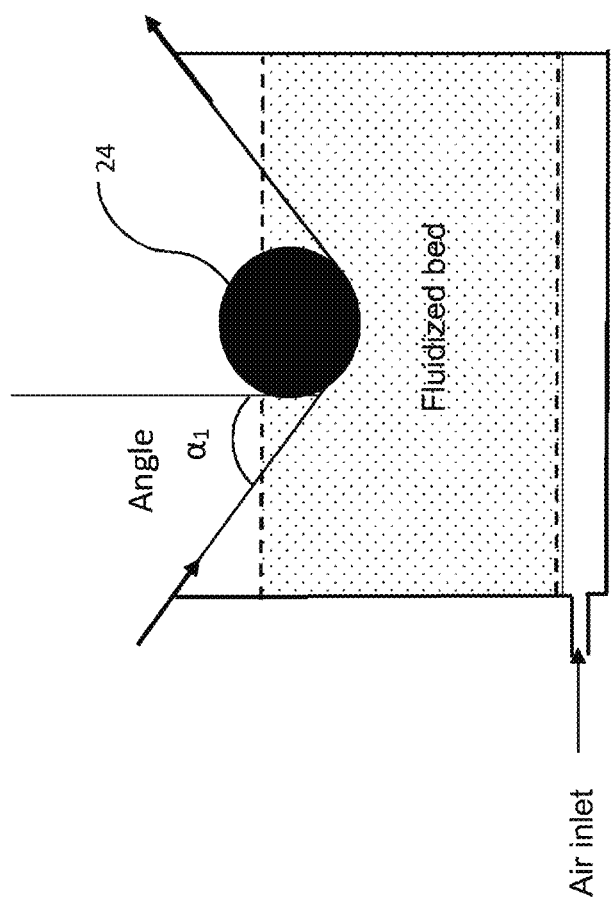
FIG. 3 describes an embodiment with a single compression roller, with a tank (10) comprising a fluidized bed (12) in which a single cylindrical compression roller (24) is present and showing the angle $\alpha_1$.

Heating Step
The heating system used is that described in FIG. 1, but with eight stationary cylindrical rollers $R'_1$ to $R'_8$ with diameter 8 mm.
The speed of advance of the roving is 10 m/min.
The infrared used has a power of 25 kW, the height between the infrared and the upper roller is 4 cm and the height between the infrared and the lower rollers is 9 cm.
The angles $\alpha'_1$ to $\alpha'_8$ are identical and 25°.
The height h is 20 mm.
The length l is 1000 mm.
These eight rollers are each separated by 43 mm.
Calendaring using two calendars mounted in series equipped with an IR of 1 kW each after the heating step.

FIG. 18 shows the impregnated fibrous material obtained with PEKK.

This demonstrates the effectiveness of the impregnation method by a dry powder in fluidized bed with a compression roller and controls the residence time in the powder combined with a heating step.

Example 3: General Procedure Comprising a Step for the Preimpregnation of a Fibrous Material (Carbon Fiber) by a Polyamide Powder (MPMDT/10T) in a Tank Comprising a Fluidized Bed and Provided with a Single Roller and a Step for Infrared Heating, Four Rollers Preceding the Tank (Upstream Supporters)

The four rollers preceding the tank are cylindrical and stationary with a diameter of 8 cm.
The rollers are 54 cm apart (distance between the first and last roller).
Pre-Impregnation and Heating Step
The pre-impregnation step and the heating step are identical to example 2, but the polymer used is as follows:
D50=115 μm, (D10=49 μm, D90=207 μm) for the MPMDT/10T powder.
Calendaring using two calendars mounted in series equipped with an IR of 1 kW each after the heating step.
The Results Obtained are Similar to Those of Example 2.

Example 4: Determination of the Porosity Level by Image Analysis

The porosity was determined by image analysis on a ¼" carbon fiber roving impregnated by MPMDT/10T in fluidized bed with upstream supporters followed by a heating step as defined hereinabove.
It is less than 5%.

Example 5: Determination of the Porosity Level the Relative Deviation Between Theoretical Density and Experimental Density (General Method)

a) The required data are:
The density of the thermoplastic matrix
The density of the fibers
The grammage of the reinforcement:
linear mass (g/m) for example for a ¼ inch tape (coming from a single roving)
surface density (g/m²) for example for a wider tape or a fabric b) Measurements to be done:

The number of samples must be at least 30 in order for the result to be representative of the studied material:

The measurements to be done are:

The size of the samples taken:
  Length (if linear mass is known).
  Length and width (if surface density is known).

The experimental density of the samples taken:
  Mass measurements in the air and in water.

The measurement of the fiber level is determined according to ISO 1172:1999 or by thermogravimetric analysis (TGA) as determined for example in the document B. Benzler, Applikationslabor, Mettler Toledo, Giesen, UserCom 1/2001.

The measurement of the carbon fiber level can be determined according to ISO 14127:2008.

Determination of the Theoretical Mass Fiber Level:

a) Determination of the theoretical mass fiber level:

$$\% \, Mf_{th} = \frac{m_l \cdot L}{Me_{air}}$$

With $m_l$ the linear mass of the tape,

L the length of the sample, and $Me_{air}$ the mass of the sample measured in the air.

The variation of the mass fiber level is presumed to be directly related to a variation of the matrix level without taking account of the variation of the quantity of fibers in the reinforcement.

b) Determination of the theoretical density:

$$d_{th} = \frac{1}{\frac{1 - \% \, Mf_{th}}{d_m} + \frac{\% \, Mf_{th}}{d_f}}$$

With $d_m$ and $d_f$ the respective densities of the matrix and the fibers.

The theoretical density thus calculated is the accessible density if there is no porosity in the samples.

c) Evaluation of the Porosity:

The porosity is then the relative deviation between theoretical density and experimental density.

The invention claimed is:

1. A method of manufacturing an impregnated fibrous material comprising a fibrous material made of continuous fibers and at least one thermoplastic polymer matrix, wherein said impregnated fibrous material is produced as a single unidirectional ribbon or a plurality of unidirectional parallel ribbons and wherein said method comprises:
   a step of pre-impregnating said fibrous material while it is in the form of a roving or several parallel rovings with a thermoplastic polymer powder, the pre-impregnating being done with a pre-impregnation system chosen from among a fluidized bed or a spray gun; and
   at least one step of heating the thermoplastic polymer powder after the thermoplastic polymer powder has pre-impregnated the fibrous material, the at least one step of heating including melting the thermoplastic polymer powder to impregnate the fibrous material and form the at least one thermoplastic polymer matrix, the at least one heating step being carried out by means of at least one heat-conducting supporting part (E) and at least one heating system, with the exception of a heated calender, wherein said at least one heating system is chosen from an infrared bulb, a UV bulb or an equipment employing convection heating,
   the roving or rovings being partially or wholly in contact with a surface of the at least one supporting part (E) and partially or wholly passing over the surface of the at least one supporting part (E) at a level of the at least one heating system,
   wherein the method excludes any electrostatic impregnation method where the continuous fibers gain a deliberate charge, and
   wherein the impregnated fibrous material possesses a porosity of less than 10%.

2. The method according to claim 1, wherein said impregnated fibrous material is not flexible.

3. The method according to claim 1, wherein one or more supports are present upstream from the pre-impregnation system.

4. The method according to claim 1, wherein said at least one heating step immediately follows the pre-impregnation step.

5. The method according to claim 1, wherein said at least one supporting part (E) is a first compression roller with either a convex, concave or cylindrical shape.

6. The method according to claim 5, wherein said roving or rovings of fibrous material form an angle $\alpha'_1$ of 0.1 to 89° with the first compression roller and a horizontal tangent to said first compression roller, said roving or rovings expanding in contact with said first compression roller.

7. The method according to claim 5, wherein a second compression roller is present after said first compression roller, said roving or rovings of fibrous material forming an angle $\alpha'_2$ of 0 to 180° with said second compression roller and a horizontal tangent to said second compression roller, said roving or rovings of fibrous material expanding in contact with said second compression roller.

8. The method according to claim 7, wherein at least one third compression roller is present after said second compression roller, said roving or rovings of fibrous material forming an angle $\alpha'_3$ of 0 to 180° with said third compression roller and a horizontal tangent to said third compression roller, said roving or rovings of fibrous material expanding in contact with said third compression roller.

9. The method according to claim 1, wherein said at least one supporting part is made up of 1 to 15 cylindrical compression rollers.

10. The method according to claim 9, wherein said at least one supporting part is made up of six to ten cylindrical compression rollers, all at the same level.

11. The method according to claim 1, wherein during the at least one heating step the roving or rovings of fibrous material possess a spreading percentage at an outlet of a last compression roller of about 0 to 300% relative to that of said roving or rovings of fibrous material at an inlet of a first compression roller.

12. The method according to claim 1, wherein said thermoplastic polymer powder contains a nonreactive thermoplastic polymer.

13. The method according to claim 1, wherein said thermoplastic polymer powder contains a reactive pre-polymer capable of reacting with itself or with a second pre-polymer, based on chain ends of said second pre-polymer, or with another chain extender, said reactive pre-polymer optionally being polymerized during the at least one heating step.

14. The method according to claim 1, wherein said at least one thermoplastic polymer powder contains a polymer or copolymer selected from a group consisting of polyaryl ether ketones (PAEK); polyaryl ether ketone ketone (PAEKK); aromatic polyether imides (PEI); polyaryl sulfones; polyarylsulfides; polyamides (PA); PEBAs; polyolefins; and mixtures thereof.

15. The method according to claim 1, wherein said at least one thermoplastic polymer matrix contains a polymer whose glass transition temperature is such that Tg≥80° C., or a semi-crystalline polymer whose melting temperature Tm≥150° C.

16. The method according to claim 1, wherein said at least one thermoplastic polymer matrix contains polyamides.

17. The method according to claim 1, wherein the impregnated fibrous material possesses a fiber level between 45 to 65% by volume.

18. The method according to claim 1, wherein the porosity of said impregnated fibrous material is less than 5%.

19. The method according to claim 1, wherein the method further comprises a step for shaping the impregnated roving or impregnated parallel rovings of fibrous material into a single unidirectional ribbon or a plurality of parallel unidirectional ribbons by calendering using at least one heating calender, said at least one heating calender including a plurality of calendering grooves in accordance with the number of said ribbons, wherein the shaping occurs with a pressure and/or separation between rollers of said calender.

20. The method according to claim 19, wherein the shaping step is done using a plurality of heating calenders, mounted in parallel and/or in series relative to a passage direction of the fiber roving or rovings.

21. The method according to claim 19, wherein said at least one heating calender comprises an integrated induction or microwave heating system, coupled with the presence of carbon fillers in said thermoplastic polymer matrix.

22. The method according to claim 19, wherein a belt press is present between the at least one heating system and the at least one heating calender.

23. The method according to claim 19, wherein a heating nozzle is present between the at least one heating system and the at least one heating calender.

24. The method according to claim 23, wherein said heating nozzle covers said single roving or said plurality of parallel rovings after impregnation with a polymer powder, wherein the polymer powder is either identical to or different from said thermoplastic polymer powder.

25. The method according to claim 19, wherein a belt press is present between the at least one heating system and the at least one heating calender and a heating nozzle is present between the belt press and the at least one heating calender.

26. The method according to claim 1, wherein said thermoplastic polymer matrix further comprises carbonaceous fillers.

27. The method according to claim 1, wherein said fibrous material comprises continuous fibers selected from carbon, glass, silicon carbide, basalt, silica, flax, hemp, lignin, bamboo, sisal, silk, cellulose, amorphous thermoplastic fibers having a glass transition temperature Tg higher than the Tg of said thermoplastic polymer powder when the thermoplastic polymer in the powder is amorphous, amorphous thermoplastic fibers having a higher Tm of said thermoplastic polymer powder when the thermoplastic polymer in the powder is semi-crystalline, semi-crystalline thermoplastic fibers having a melting temperature Tm higher than the Tg of said thermoplastic polymer powder when the thermoplastic polymer in the powder is amorphous, semi-crystalline thermoplastic fibers having a higher Tm than the Tm of said thermoplastic polymer powder when the thermoplastic polymer in the powder is semi-crystalline, or a mixture thereof.

* * * * *